United States Patent
Chu et al.

(10) Patent No.: US 10,470,185 B2
(45) Date of Patent: Nov. 5, 2019

(54) ACKNOWLEDGEMENT FOR MULTIPLE USER COMMUNICATION IN A WLAN

(71) Applicant: Marvell World Trade Ltd., St. Michael (BB)

(72) Inventors: Liwen Chu, San Ramon, CA (US); Hongyuan Zhang, Fremont, CA (US); Lei Wang, San Diego, CA (US); Hui-Ling Lou, Sunnyvale, CA (US); Jinjing Jiang, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/997,033

(22) Filed: Jun. 4, 2018

(65) Prior Publication Data
US 2018/0288769 A1 Oct. 4, 2018

Related U.S. Application Data

(63) Continuation of application No. 14/938,680, filed on Nov. 11, 2015, now Pat. No. 9,992,774.
(Continued)

(51) Int. Cl.
*H04W 72/04* (2009.01)
*H04L 5/00* (2006.01)
(Continued)

(52) U.S. Cl.
CPC ...... *H04W 72/0453* (2013.01); *H04B 7/0452* (2013.01); *H04L 5/0007* (2013.01);
(Continued)

(58) Field of Classification Search
None
See application file for complete search history.

(56) References Cited

U.S. PATENT DOCUMENTS 8,155,138 B2    4/2012  van Nee
8,472,383 B1    6/2013  Banerjea et al.
(Continued)

OTHER PUBLICATIONS

U.S. Appl. No. 16/154,582, Chu et al., "Acknowledgement for Multiple User Communication in a WLAN," filed Oct. 8, 2018.
(Continued)

*Primary Examiner* — Otis L Thompson, Jr.

(57) ABSTRACT

A first communication device generates respective media access control (MAC) protocol data units (MPDUs) that include respective data for a respective second communication devices, and determines respective resource units (RUs) via which at least some of the second communication devices are to transmit as part of an uplink (UL) orthogonal frequency division multiple access (OFDMA) physical layer (PHY) transmission to respectively acknowledge receipt of the respective MPDUs. The first communication device generates respective control frames that are configured to prompt the at least some of the second communication devices to transmit the UL OFDMA PHY transmission, and that include indicators of the RUs via which the at least some of the second communication devices are to transmit as part of the UL OFDMA PHY transmission. The first communication device generates and transmits a single multi user (MU) PHY data unit that includes i) the MPDUs, and ii) the control frames.

26 Claims, 24 Drawing Sheets

Related U.S. Application Data

(60) Provisional application No. 62/204,169, filed on Aug. 12, 2015, provisional application No. 62/156,047, filed on May 1, 2015, provisional application No. 62/148,659, filed on Apr. 16, 2015, provisional application No. 62/089,029, filed on Dec. 8, 2014, provisional application No. 62/078,169, filed on Nov. 11, 2014.

(51) Int. Cl.
  *H04B 7/0452* (2017.01)
  *H04L 27/26* (2006.01)
  *H04W 84/12* (2009.01)

(52) U.S. Cl.
  CPC .......... *H04L 5/0037* (2013.01); *H04L 5/0055* (2013.01); *H04L 5/0094* (2013.01); *H04L 27/2608* (2013.01); *H04W 84/12* (2013.01)

(56) References Cited

U.S. PATENT DOCUMENTS

| | | | |
|---|---|---|---|
| 8,526,351 | B2 | 9/2013 | Fischer et al. |
| 8,571,010 | B1 | 10/2013 | Zhang et al. |
| 8,665,491 | B2 | 3/2014 | Walp et al. |
| 8,724,720 | B2 | 5/2014 | Srinivasa et al. |
| 9,992,774 | B2 | 6/2018 | Chu et al. |
| 10,181,930 | B2* | 1/2019 | Hedayat ............ H04W 72/1289 |
| 2009/0196163 | A1 | 8/2009 | Du |
| 2010/0309848 | A1 | 12/2010 | Erceg et al. |
| 2010/0316150 | A1 | 12/2010 | Amini et al. |
| 2011/0002219 | A1 | 1/2011 | Kim et al. |
| 2011/0090855 | A1 | 4/2011 | Kim |
| 2011/0150004 | A1 | 6/2011 | Denteneer et al. |
| 2011/0261708 | A1 | 10/2011 | Grandhi |
| 2011/0268076 | A1 | 11/2011 | Lee et al. |
| 2012/0051310 | A1 | 3/2012 | Cho et al. |
| 2012/0087436 | A1 | 4/2012 | Srinivasa et al. |
| 2012/0106371 | A1 | 5/2012 | Abraham et al. |
| 2012/0230242 | A1 | 9/2012 | Kim |
| 2012/0314697 | A1 | 12/2012 | Noh et al. |
| 2013/0229996 | A1 | 9/2013 | Wang et al. |
| 2014/0307653 | A1 | 10/2014 | Liu et al. |
| 2015/0028452 | A1 | 1/2015 | Zhu et al. |
| 2015/0131517 | A1 | 5/2015 | Chu et al. |
| 2015/0146654 | A1 | 5/2015 | Chu et al. |
| 2015/0146808 | A1 | 5/2015 | Chu et al. |
| 2015/0319747 | A1 | 11/2015 | Chu et al. |
| 2015/0365940 | A1 | 12/2015 | Chu et al. |
| 2016/0014763 | A1 | 1/2016 | Jauh |
| 2016/0028452 | A1 | 1/2016 | Chu et al. |
| 2016/0029373 | A1 | 1/2016 | Seok |
| 2016/0037484 | A1 | 2/2016 | Kwon |
| 2016/0087775 | A1* | 3/2016 | Hedayat .................... H04L 1/12 370/329 |
| 2016/0088602 | A1 | 3/2016 | Seok |
| 2016/0134406 | A1 | 5/2016 | Chu et al. |
| 2016/0142122 | A1 | 5/2016 | Merlin |
| 2016/0143010 | A1* | 5/2016 | Kenney ................ H04B 7/0452 370/330 |
| 2016/0285608 | A1* | 9/2016 | Kwon .................... H04L 5/0055 |
| 2016/0323879 | A1 | 11/2016 | Ghosh et al. |
| 2016/0330714 | A1* | 11/2016 | Hedayat ............ H04W 72/1289 |
| 2016/0337100 | A1 | 11/2016 | Yang |
| 2017/0048866 | A1 | 2/2017 | Chu et al. |
| 2017/0187435 | A1 | 6/2017 | Cariou et al. |
| 2017/0202026 | A1 | 7/2017 | Ahn et al. |
| 2017/0279864 | A1 | 9/2017 | Chun et al. |
| 2017/0310386 | A1* | 10/2017 | Liu ..................... H04W 74/006 |
| 2019/0052407 | A1* | 2/2019 | Son ...................... H04L 1/0003 |

OTHER PUBLICATIONS

Notice of Allowance in U.S. Appl. No. 15/337,668, dated Mar. 27, 2018 (10 pages).

Notice of Allowance in U.S. Appl. No. 15/337,668, dated May 18, 2018 (9 pages).

Merlin et al., "Trigger Frame Format," IEEE Draft, doc. IEEE 802.11-15/0877r1, vol. 802.11ax, No. 1, 16 pages (Jul. 13, 2015).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.11ac/D2.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

Chun et al. "Legacy Support on HEW frame structure," doc: IEEE 11-13/1057r0, *The Institute of Electrical and Electronics Engineers, Inc.*, pp. 1-8 (Sep. 2013).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

(56) References Cited

OTHER PUBLICATIONS

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

International Search Report and Written Opinion in International Application No. PCT/US2015/060211, dated Feb. 8, 2016 (12 pages).

U.S. Appl. No. 12/730,651, Zhang et al., "OFDMA with Block Tone Assignment for WLAN," filed Mar. 24, 2010.

International Preliminary Report on Patentability in International Patent Application No. PCT/US2015/060211, dated May 26, 2017 (8 pages).

U.S. Appl. No. 15/337,668, Chu et al., "Acknowledgement for Multiple User Communication in a WLAN," filed Oct. 28, 2016.

Office Action in U.S. Appl. No. 15/337,668, dated Aug. 18, 2017 (19 pages).

\* cited by examiner

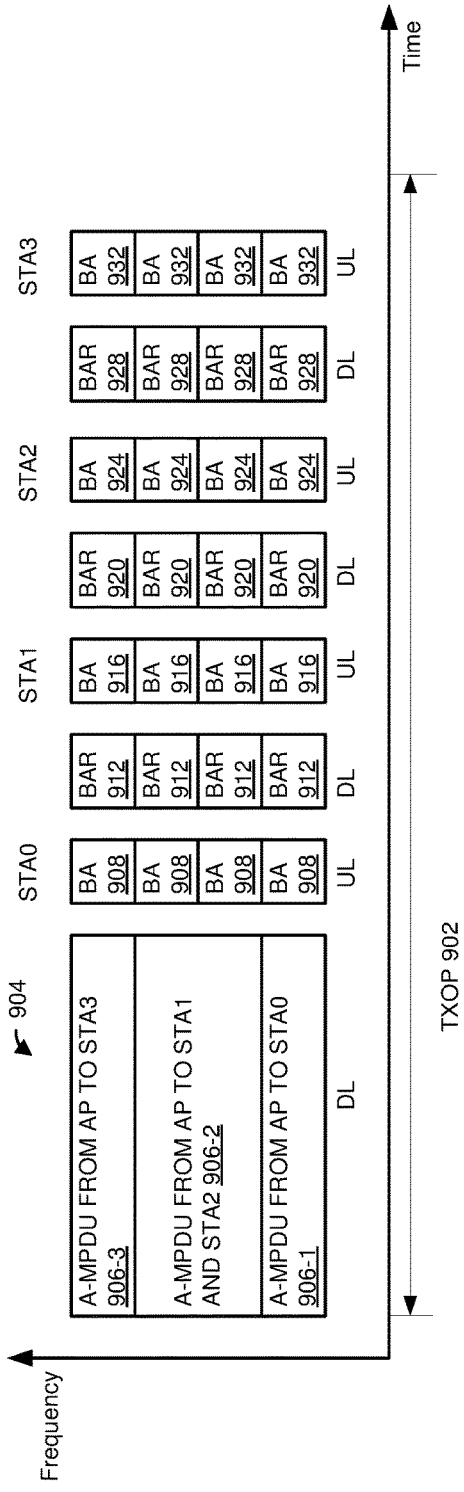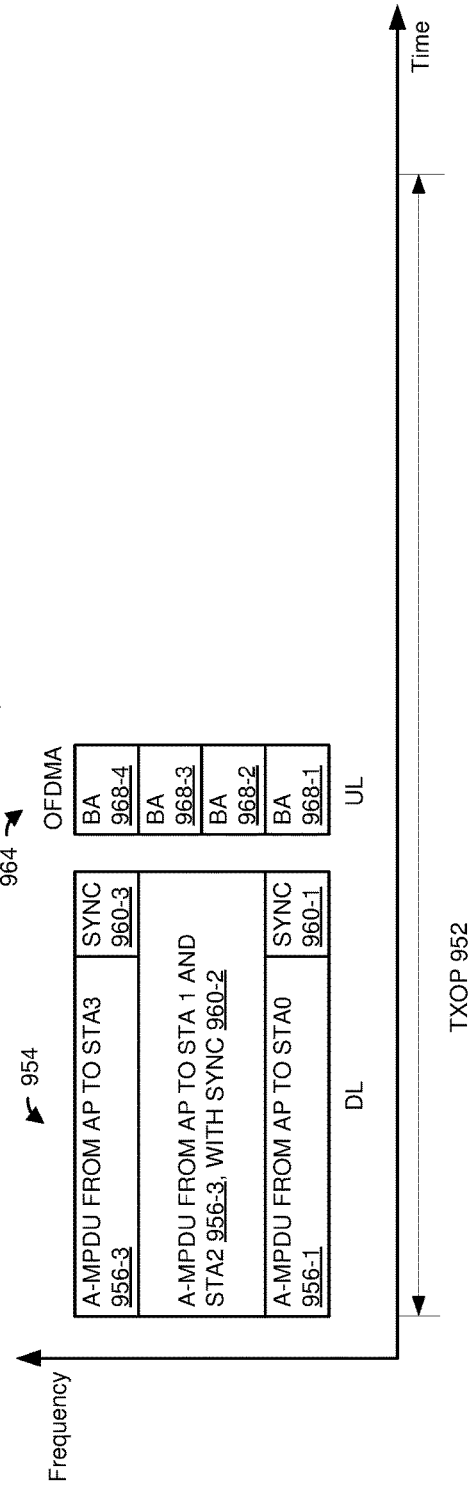

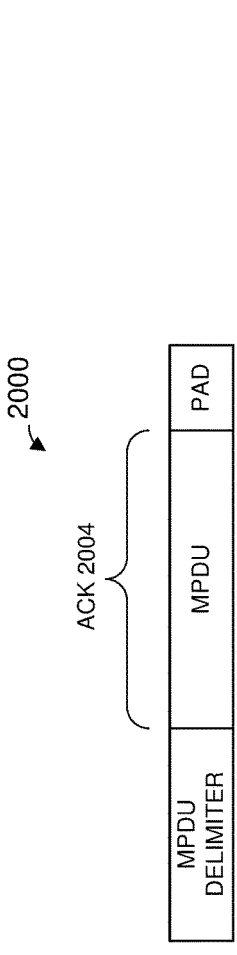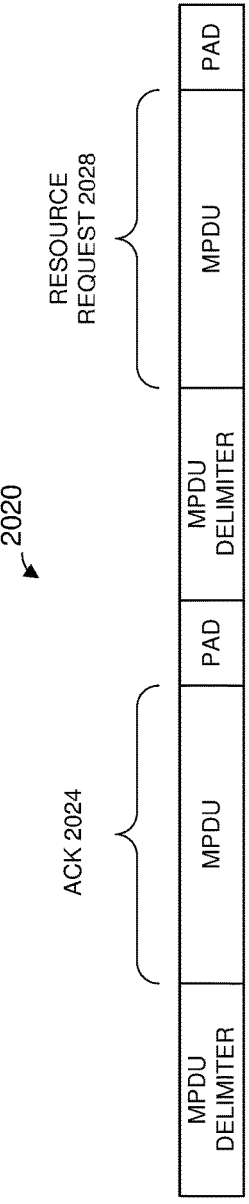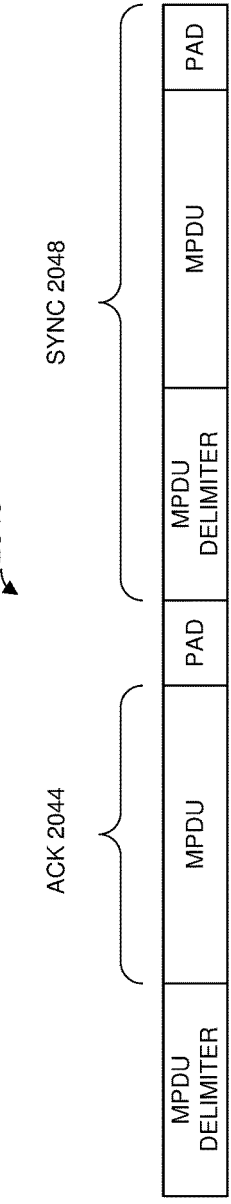

ACKNOWLEDGEMENT FOR MULTIPLE USER COMMUNICATION IN A WLAN

CROSS-REFERENCE TO RELATED APPLICATIONS

This application is a continuation of U.S. patent application Ser. No. 14/938,680 (now U.S. Pat. No. 9,992,774), entitled "Acknowledgment for Multiple User Communication in a WLAN," filed on Nov. 11, 2015, which claims the benefit of the following U.S. Provisional Patent Applications:

U.S. Provisional Patent Application No. 62/078,169, entitled "MU Acknowledge for DL MU MIMO/OFDMA," filed on Nov. 11, 2014;

U.S. Provisional Patent Application No. 62/089,029, entitled "Acknowledge for DL MU MIMO/OFDMA," filed on Dec. 8, 2014;

U.S. Provisional Patent Application No. 62/148,659, entitled "Acknowledge for DL MU MIMO/OFDMA," filed on Apr. 16, 2015;

U.S. Provisional Patent Application No. 62/156,047, entitled "Acknowledge for DL MU MIMO/OFDMA," filed on May 1, 2015; and U.S. Provisional Patent Application No. 62/204,169, entitled "Acknowledge for DL MU MIMO/OFDMA," filed on Aug. 12, 2015.

The disclosures of all of the patent applications referenced above are hereby incorporated by reference herein in their entireties.

Additionally, this application is related to U.S. patent application Ser. No. 15/337,668, entitled "Acknowledgment for Multiple User Communication in a WLAN," filed on Oct. 28, 2016, which is hereby incorporated by reference herein in its entirety.

FIELD OF THE DISCLOSURE

The present disclosure relates generally to communication networks and, more particularly, to wireless local area networks that utilize orthogonal frequency division multiplexing (OFDM).

BACKGROUND

WLANs have evolved rapidly over the past decade. Development of wireless local area network (WLAN) standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to support both downlink (DL) and uplink (UL) multi-user (MU) transmissions, such as orthogonal frequency division multiple access (OFDMA) transmissions and multi-user multiple input multiple output (MU-MIMO) transmissions, and to provide even greater throughputs, such as throughputs in the tens of Gbps range.

SUMMARY

In an embodiment, a method for communicating in a wireless communication network includes: generating, at a first communication device, respective media access control (MAC) protocol data units (MPDUs), each MPDU including respective data for a respective second communication device among a plurality of second communication devices; determining, at the first communication device, respective resource units (RUs) via which at least some of the second communication devices are to transmit as part of an uplink (UL) orthogonal frequency division multiple access (OFDMA) physical layer (PHY) transmission to respectively acknowledge receipt of the respective MPDUs, wherein the respective RUs correspond to respective frequency portions of a communication channel; generating, at the first communication device, respective control frames corresponding to at least some of the second communication devices, wherein the respective control frames are configured to prompt the at least some of the second communication devices to transmit the UL OFDMA PHY transmission, and wherein the control frames include indicators of the RUs via which the at least some of the second communication devices are to transmit as part of the UL OFDMA PHY transmission; generating, at the first communication device, a single multi user (MU) PHY data unit that includes i) the MPDUs, and ii) the control frames; transmitting, by the first communication device and to the plurality of second communication devices, the single MU PHY data unit; receiving, at the first communication device, the UL OFDMA PHY transmission from the at least some of the second communication devices, the UL OFDMA PHY transmission corresponding to an acknowledgment of at least some of the MPDUs by the at least some of the second communication devices, wherein the UL OFDMA PHY transmission includes respective transmissions from respective second communication devices via respective RUs indicated by the control frames in the single MU PHY data unit; and processing, at the first communication device, the UL OFDMA PHY data unit to determine whether the at least some of the second communication devices received the respective MPDUs.

In another embodiment, an apparatus comprises: a network interface device associated with a first communication device. The network interface device comprises one or more integrated circuit (IC) devices configured to: generate respective media access control (MAC) protocol data units (MPDUs), each MPDU including respective data for a respective second communication device among a plurality of second communication devices; determine respective resource units (RUs) via which at least some of the second communication devices are to transmit as part of an uplink (UL) orthogonal frequency division multiple access (OFDMA) physical layer (PHY) transmission to respectively acknowledge receipt of the respective MPDUs, wherein the respective RUs correspond to respective frequency portions of a communication channel; generate respective control frames corresponding to at least some of the second communication devices, wherein the respective control frames are configured to prompt the at least some of the second communication devices to transmit the UL OFDMA PHY transmission, and wherein the control frames include indicators of the RUs via which the at least some of the second communication devices are to transmit as part of the UL OFDMA PHY transmission; generate a single multi user (MU) PHY data unit that includes i) the MPDUs, and ii) the control frames; transmit, to the plurality of second communication devices, the single MU PHY data unit; receive the UL OFDMA PHY transmission from the at least some of the second communication devices, the UL OFDMA PHY transmission corresponding to an acknowledgment of at least some of the MPDUs by the at least some of the second communication devices, wherein the UL OFDMA PHY transmission includes respective transmissions from respective second communication devices via respective RUs indicated by the control frames in the single MU PHY data unit; and process the UL OFDMA PHY data unit to determine whether the at least some of the second communication devices received the respective MPDUs.

In yet another embodiment, a method includes: receiving, at a first communication device and from a second communication device, i) a media access control (MAC) protocol data unit (MPDU) and ii) a control frame, wherein the MPDU and the control frame are included in a single downlink (DL) multi-user (MU) physical layer (PHY) data unit, wherein the control frame is configured to prompt the first communication devices to transmit as part of an uplink (UL) orthogonal frequency division multiple access (OFDMA) physical layer (PHY) transmission by the first communication device and one or more third communication devices, wherein the control frame includes an indicator of a resource unit (RU) via which the first communication device is to transmit as part of the UL OFDMA PHY transmission, and wherein the RU corresponds to a frequency portion of a communication channel; determining, at the first communication device, a frequency subband in which the first communication device is to transmit an acknowledgment frame as part of the UL OFDMA PHY transmission, the acknowledgment frame for acknowledging the MPDU from the second communication device, wherein determining the frequency subband is performed using the indicator of the RU in the control frame; generating, at the first communication device, a UL PHY data unit that includes the acknowledgment frame; and transmitting, by the first communication device, the UL PHY data unit as part of the UL OFDMA PHY transmission.

In still another embodiment, an apparatus comprises: a network interface device associated with a first communication device. The network interface device include one or more integrate circuit (IC) devices configured to: receive, from a second communication device, i) a media access control (MAC) protocol data unit (MPDU) and ii) a control frame, wherein the MPDU and the control frame are included in a single downlink (DL) multi-user (MU) physical layer (PHY) data unit, wherein the control frame is configured to prompt the first communication devices to transmit as part of an uplink (UL) orthogonal frequency division multiple access (OFDMA) physical layer (PHY) transmission by the first communication device and one or more third communication devices, wherein the control frame includes an indicator of a resource unit (RU) via which the first communication device is to transmit as part of the UL OFDMA PHY transmission, and wherein the RU corresponds to a frequency portion of a communication channel; determine a frequency subband in which the first communication device is to transmit an acknowledgment frame as part of the UL OFDMA PHY transmission, the acknowledgment frame for acknowledging the MPDU from the second communication device, wherein determining the frequency subband is performed using the indicator of the RU in the control frame; generate a UL PHY data unit that includes the acknowledgment frame; and transmit the UL PHY data unit as part of the UL OFDMA PHY transmission.

BRIEF DESCRIPTION OF THE DRAWINGS

FIG. 9A is a diagram of another example transmission sequence in a WLAN, according to an embodiment.

FIG. 9B is a diagram of another example transmission sequence in a WLAN, according to an embodiment.

FIG. 20A is a diagram of an example A-MPDU including an ACK, according to an embodiment.

FIG. 20B is a diagram of an example A-MPDU including an ACK and a resource request, according to an embodiment.

FIG. 20C is a diagram of an example A-MPDU including an ACK and a SYNC, according to an embodiment.

DETAILED DESCRIPTION

Figure 1:
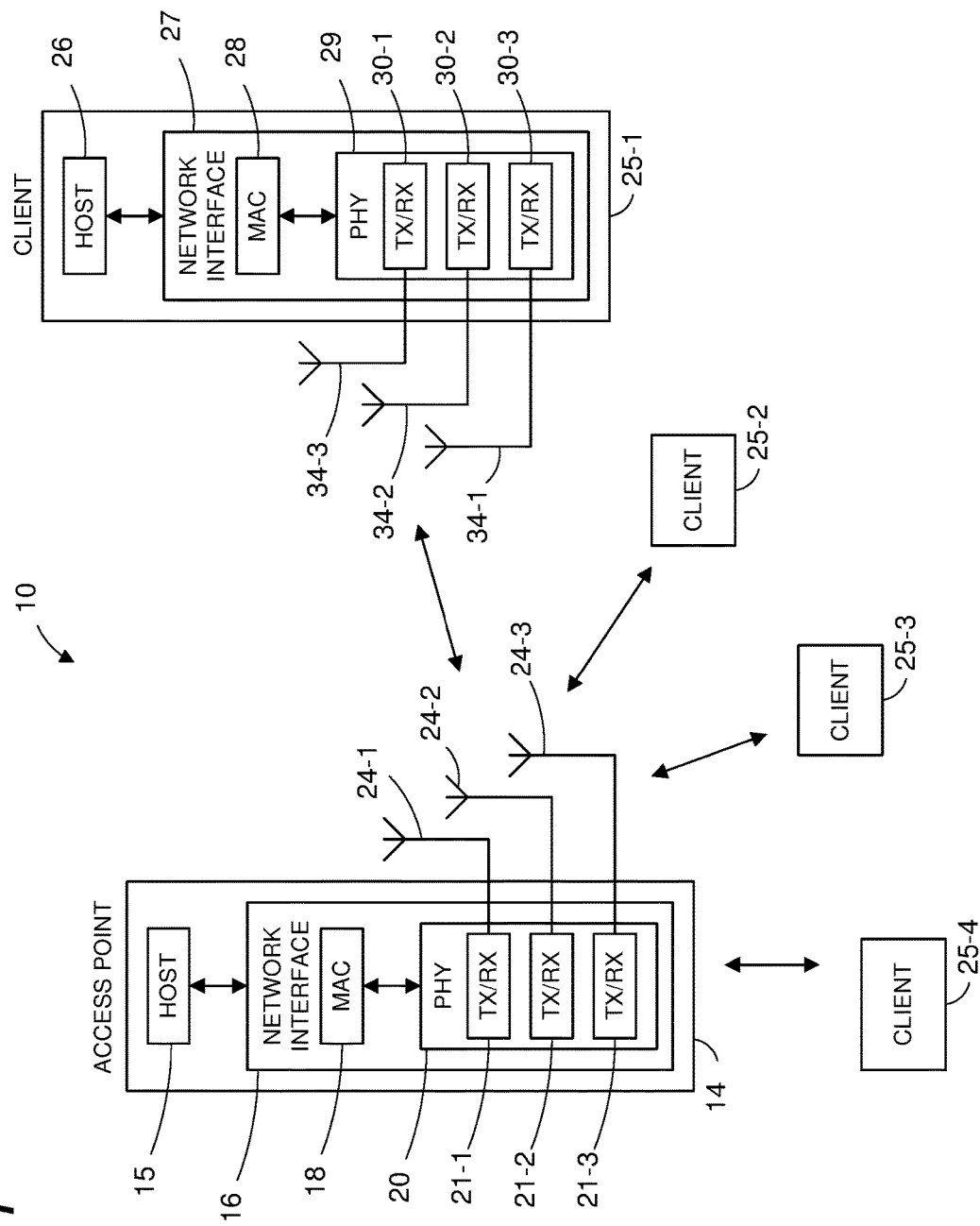
FIG. 1 is a block diagram of an example wireless local area network (WLAN), according to an embodiment.

In embodiments described below, a wireless network device such as an access point (AP) of a wireless local area network (WLAN) simultaneously transmits independent data streams to multiple client stations (sometimes referred to herein as multi-user downlink (MU DL)) and/or receives independent data streams simultaneously transmitted by multiple client stations (sometimes referred to herein as multi-user uplink (MU UL)). For example, the AP transmits data for the multiple clients in different orthogonal frequency division multiplexing (OFDM) sub-channels of an orthogonal frequency division multiple access (OFDMA) transmission, in an embodiment. Similarly, multiple client stations transmit data to the AP simultaneously, in particular, each client station transmits data in a different OFDM sub-channel of an OFDMA transmission, in an embodiment. In another embodiment, the AP transmits data for multiple client stations using different spatial streams of a multi-user multiple input multiple output (MU-MIMO) transmission. Similarly, multiple client stations transmit data to the AP simultaneously using different spatial streams within an MU-MIMO transmission to the AP, in an embodiment. In some embodiments, OFDMA and MU-MIMO are both utilized in a single MU DL or MU UL transmission.

In an embodiment, after receiving a MU DL from the AP, each client device acknowledges receipt of the MU DL by transmitting an acknowledgement frames to the AP. For example, in an embodiment, each client device transmits an acknowledgment via a respective subchannel block, where the transmissions from the multiple client devices form an OFDMA acknowledgement frame that includes respective acknowledgements from the different client stations in different blocks of OFDM sub-channels, in an embodiment. In another embodiment, each client device transmits an acknowledgment via a respective set of one or more spatial streams, where the transmissions from the multiple client devices form a MU-MIMO acknowledgment frame that includes respective acknowledgements from different client stations transmitted in different spatial streams.

The AP is configured to operate with client stations according to at least a first communication protocol. The first communication protocol is sometimes referred to herein as "high efficiency WiFi," "high efficiency WLAN," "HEW" communication protocol, or IEEE 802.11ax Standard. The first communication protocol supports OFDMA communication between the AP and the client stations, in some embodiments. The first communication protocol supports MU-MIMO communication between the AP and the client stations, in some embodiments. In some embodiments, different client stations in the vicinity of the AP are configured to operate according to one or more other communication protocols that define operation in the same frequency band as the HEW communication protocol but with generally lower data throughputs. The lower data throughput communication protocols (e.g., IEEE 802.11a, IEEE 802.11g, IEEE 802.11n, and/or IEEE 802.11ac) are collectively referred herein as "legacy" communication protocols. The legacy communication protocols do not support OFDMA communication and/or MU-MIMO communication, in some embodiments. The legacy communication protocols support DL OFDMA communication and/or DL MU-MIMO communication, bud do not support UL OFDMA and/or UL MU-MIMO, in some embodiments.

FIG. 1 is a block diagram of an example wireless local area network (WLAN) 10, according to an embodiment. An AP 14 includes a host processor 15 coupled to a network interface 16. The network interface device 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes different numbers (e.g., 1, 2, 4, 5, etc.) of transceivers 21 and antennas 24 in other embodiments. In an embodiment, the network interface device 16 includes one or more integrated circuit (IC) devices. For example, at least some of the functionality of the MAC processing unit 18 and at least some of the functionality of the PHY processing unit 20 are implemented on a single IC device, according to an embodiment. As another example, at least some of the functionality of the MAC processing unit 18 is implemented on a first IC device, and at least some of the functionality of the PHY processing unit 20 is implemented on a second IC device, according to an embodiment.

The WLAN 10 includes a plurality of client stations 25. Although four client stations 25 are illustrated in FIG. 1, the WLAN 10 includes different numbers (e.g., 1, 2, 3, 5, 6, etc.) of client stations 25 in various scenarios and embodiments. Two or more of the client stations 25 are configured to receive corresponding data streams that are transmitted simultaneously by the AP 14. Additionally, two or more of the client stations 25 are configured to transmit corresponding data streams to the AP 14 such that the AP 14 receives the data streams simultaneously.

A client station 25-1 includes a host processor 26 coupled to a network interface 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments. In an embodiment, the network interface device 27 includes one or more IC devices. For example, at least some of the functionality of the MAC processing unit 28 and at least some of the functionality of the PHY processing unit 29 are implemented on a single IC device, according to an embodiment. As another example, at least some of the functionality of the MAC processing unit 28 is implemented on a first IC device, and at least some of the functionality of the PHY processing unit 29 is implemented on a second IC device, according to an embodiment.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

According to an embodiment, the client station 25-4 is a legacy client station that is not enabled to receive a data stream that is transmitted by the AP 14 simultaneously with other independent data streams as part of an OFDMA transmission to multiple client stations 25. Similarly, according to an embodiment, the legacy client station 25-4 is not enabled to transmit a data stream to the AP 14 as part of UL OFDMA transmission from multiple client stations 25. According to an embodiment, the legacy client station 25-4 includes a PHY processing unit that is generally capable of receiving a data stream that is transmitted by the AP 14 simultaneously with other independent data streams that are intended for other client stations 25. But the legacy client station 25-4 includes a MAC processing unit that is not enabled with MAC layer functions that support receiving the data stream that is transmitted by the AP 14 simultaneously with other independent data streams that are intended for other client stations 25. According to an embodiment, the legacy client station 25-4 includes a PHY processing unit that is generally capable of transmitting a data stream to the AP 14 at the same time that other client stations 25 transmit data to the AP 14. But the legacy client station 25-4 includes a MAC processing unit that is not enabled with MAC layer functions that support transmitting a data stream to the AP 14 at the same time that other client stations 25 transmit data to the AP 14.

Figure 2:
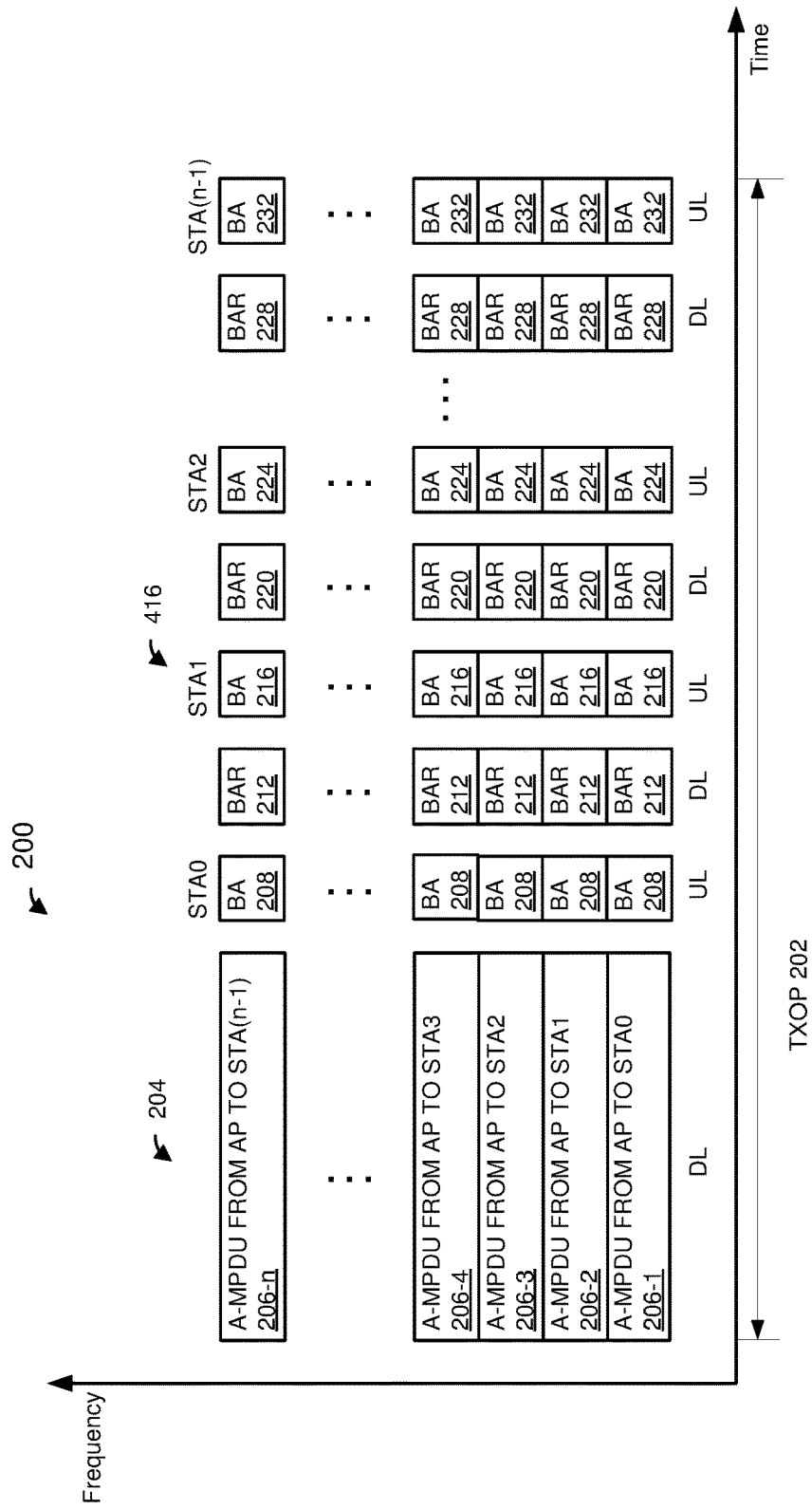
FIG. 2 is a diagram of an example transmission sequence in a WLAN, according to an embodiment.

In some embodiments, when an AP transmits a DL OFDMA communication frame (e.g., a physical layer (PHY) protocol data unit (PPDU)), the AP then polls multiple client devices prompting the client devices to transmit acknowledgements of the DL OFDMA communication frame. FIG. 2 is a diagram of an example transmission sequence 200 in a WLAN, such as the WLAN 10 of FIG. 1, according to an embodiment, in which an AP, such as the AP 14, transmits a DL OFDMA communication frame to multiple client stations, such as multiple ones of the client stations 25, during a transmission opportunity period (TXOP) 202.

The AP 14 generates and transmits a DL OFDMA communication frame 204, in an embodiment. In an embodiment, the communication frame 204 comprises respective data 206 for multiple client devices. In an illustrative embodiment, the data 206 comprise respective aggregate media access control (MAC) protocol data units (A-MPDUs) 206. In an embodiment, the communication frame 204 spans a bandwidth of a primary channel (e.g., a primary 20 MHz channel) of the WLAN 10 and multiple other secondary channels (e.g., 20 MHz channels) of the WLAN 10, i.e., the communication frame 204 spans a bandwidth of a composite channel comprising the primary channel and one or more secondary channels.

In an embodiment, the different data 206 correspond to different positions (in terms of frequency) within the communication frame 204, where each position is indicated by an index. For example, in an embodiment, the index starts at the lowest (in frequency) portion of the aggregate channel and increases as frequency increases. In another embodiment, the index starts at the highest (in frequency) portion of the aggregate channel and decreases as frequency decreases. Referring to the example illustrated in FIG. 2, in an embodiment, A-MPDU 206-1 corresponds to a first position, A-MPDU 206-2 corresponds to a second position, etc. In some embodiments and/or scenarios, each position corresponds to a 20 MHz channel. In other embodiments and/or scenarios, each position may correspond to a single 20 MHz channel or a composite of multiple 20 MHz channels. In other embodiments and/or scenarios, each position may correspond to a single 20 MHz channel, a composite of multiple 20 MHz channels, or different portions of a single 20 MHz channel.

In an embodiment, the client device corresponding to the data transmission in the first position (e.g., STA0 corresponding to A-MPDU 206-1) generates and transmits an acknowledgment (ACK) frame or block acknowledgment (BA) frame to the AP via an uplink (UL) channel responsive to the communication frame 204. For example, in an embodiment, the client device corresponding to the data transmission in the first position generates and transmits an ACK frame or BA frame a defined time period (e.g., a short interframe space (SIFS) or another suitable time period) after the end of the communication frame 204. In an embodiment, the client device corresponding to the data transmission in the first position generates an ACK frame or BA frame that spans a 20 MHz channel, duplicates the ACK/BA frame in one or more other 20 MHz channels, and simultaneously transmits the ACK/BA and the duplicates of the ACK/BA. For instance, in the example of FIG. 2, STA0 transmits multiple instances of a BA frame 208 in multiple 20 MHz channels corresponding to the bandwidth of the communication frame 204. In some embodiments, the ACK/BA is formatted according to the HEW protocol. In some embodiments, the ACK/BA is formatted according to a legacy protocol.

After receiving the ACK/BA 208, the AP generates and transmits a BA request (BAR) frame to prompt another client device (e.g., STA1) to transmit a BA to acknowledge the DL transmission 204. In an embodiment, the AP generates an BAR frame that spans a 20 MHz channel, duplicates the BAR frame in one or more other 20 MHz channels, and simultaneously transmits the BAR frame and the duplicates of the BAR frame. For instance, in the example of FIG. 2, the AP transmits multiple instances of a BAR frame 212 in multiple 20 MHz channels corresponding to the bandwidth of the communication frame 204. In response to the BAR frame 212, the corresponding client device (e.g., STA1) generates an ACK frame or BA frame that spans a 20 MHz channel, duplicates the ACK/BA frame in one or more other 20 MHz channels, and simultaneously transmits the ACK/BA and the duplicates of the ACK/BA. For instance, in the example of FIG. 2, STA1 transmits multiple instances of a BA frame 216 in multiple 20 MHz channels corresponding to the bandwidth of the communication frame 204.

After receiving the ACK/BA 216, the AP generates and transmits a BAR frame to prompt another client device (e.g., STA2) to transmit a BA to acknowledge the DL transmission 204. In an embodiment, the AP generates a BAR frame that spans a 20 MHz channel, duplicates the BAR frame in one or more other 20 MHz channels, and simultaneously transmits the BAR frame and the duplicates of the BAR frame. For instance, in the example of FIG. 2, the AP transmits multiple instances of a BAR frame 220 in multiple 20 MHz channels corresponding to the bandwidth of the communication frame 204. In response to the BAR frame 220, the corresponding client device (e.g., STA2) generates an ACK frame or BA frame that spans a 20 MHz channel, duplicates the ACK/BA frame in one or more other 20 MHz channels, and simultaneously transmits the ACK/BA and the duplicates of the ACK/BA. For instance, in the example of FIG. 2, STA2 transmits multiple instances of a BA frame 224 in multiple 20 MHz channels corresponding to the bandwidth of the communication frame 204.

The process continues with the AP prompting ACKs/BAs from client devices until the AP generates and transmits a BAR frame to prompt a final client device (e.g., STA(n-1)) to transmit a BA to acknowledge the DL transmission 204. In an embodiment, the AP generates a BAR frame that spans a 20 MHz channel, duplicates the BAR frame in one or more other 20 MHz channels, and simultaneously transmits the BAR frame and the duplicates of the BAR frame. For instance, in the example of FIG. 2, the AP transmits multiple instances of a BAR frame 228 in multiple 20 MHz channels corresponding to the bandwidth of the communication frame 204. In response to the BAR frame 228, the corresponding client device (e.g., STA(n-1)) generates an ACK frame or BA frame that spans a 20 MHz channel, duplicates the ACK/BA frame in one or more other 20 MHz channels, and simultaneously transmits the ACK/BA and the duplicates of the ACK/BA. For instance, in the example of FIG. 2, STA(n-1) transmits multiple instances of a BA frame 232 in multiple 20 MHz channels corresponding to the bandwidth of the communication frame 204.

As can be seen in FIG. 2, the process of the AP sequentially (in time) prompting multiple client stations to acknowledge a MU DL transmission adds to channel overhead. Thus, in some embodiments, client stations simultaneously acknowledge a MU DL transmission using orthogonal frequency division multiple access (OFDMA) or multi-user, multiple input, multiple output (MU-MIMO) techniques.

Figure 3:
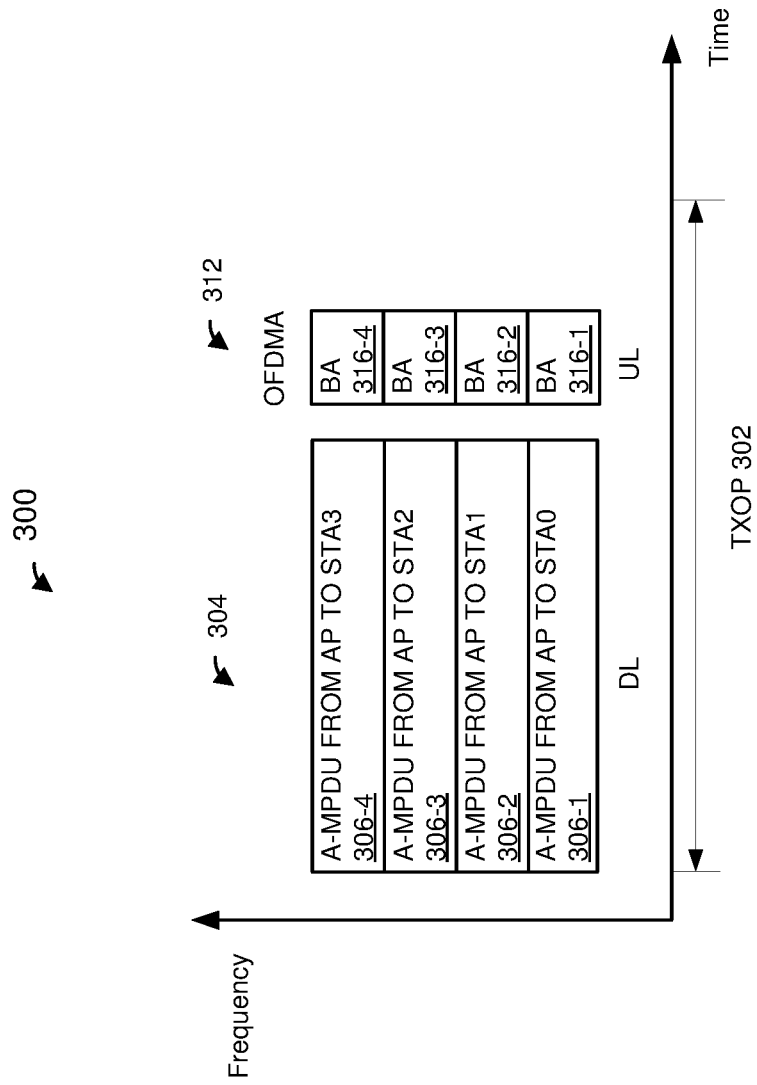
FIG. 3 is a diagram of another example transmission sequence in a WLAN, according to another embodiment.

FIG. 3 is a diagram of an example transmission sequence 300 in a WLAN, such as the WLAN 10 of FIG. 1, according to an embodiment, in which an AP, such as the AP 14, transmits a DL OFDMA communication frame to multiple client stations, such as multiple ones of the client stations 25, during a TXOP 302.

The AP 14 generates and transmits a DL OFDMA communication frame 304, in an embodiment. In an embodiment, the communication frame 304 comprises respective data 306 for multiple client devices. In an illustrative embodiment, the data 306 comprise respective A-MPDUs 306. In an embodiment, the communication frame 304 spans a bandwidth of a primary channel (e.g., a primary 20 MHz channel) of the WLAN 10 and multiple other secondary channels (e.g., 20 MHz channels) of the WLAN 10, i.e., the communication frame 304 spans a bandwidth of a composite channel comprising the primary channel and one or more secondary channels.

In an embodiment, the different data 306 correspond to different positions (in terms of frequency) within the communication frame 304, where each position is indicated by an index. For example, in an embodiment, the index starts at the lowest (in frequency) portion of the aggregate channel and increases as frequency increases. In another embodiment, the index starts at the highest (in frequency) portion of the aggregate channel and decreases as frequency decreases. Referring to the example illustrated in FIG. 3, in an embodiment, A-MPDU 306-1 corresponds to a first position, A-MPDU 306-2 corresponds to a second position, etc. In some embodiments and/or scenarios, each position corresponds to a 20 MHz channel. In other embodiments and/or scenarios, each position may correspond to a single 20 MHz channel or a composite of multiple 20 MHz channels. In other embodiments and/or scenarios, each position may correspond to a single 20 MHz channel, a composite of multiple 20 MHz channels, or different portions of a single 20 MHz channel.

In an embodiment, each client device to which a data transmission 306 corresponds generates and transmits an ACK or BA portion as part of an UL OFDMA transmission 312 responsive to the communication frame 304. For example, in an embodiment, each client device to which a data transmission 306 corresponds generates and transmits an ACK or BA portion 316 a defined time period (e.g., a SIFS or another suitable time period) after the end of the communication frame 304. In an embodiment, each client device generates and transmits an ACK or BA portion 316 in a respective frequency block within a communication channel spanned by the MU DL transmission. Comparing the transmission sequence 300 with the transmission sequence 200 of FIG. 2, it can be seen that the transmission sequence 300 requires less channel overhead for ACKs/BAs from a given number of multiple client stations.

In the example of FIG. 3, each ACK or BA portion 316 has a same duration in time. Thus, in some embodiments, the AP determines the duration of the UL OFDMA transmission 312 and indicates to the client devices the duration of the UL OFDMA transmission 312. Then, each client device generates the respective portion 316 to have the indicated duration.

In the example of FIG. 3, the DL communication frame 304 and the UL ACK transmission 312 are OFDMA transmissions. In some embodiments, one or both of a DL communication frame and a corresponding UL ACK transmission are MU-MIMO transmissions. For example, in an embodiment, the DL communication frame 304 is a MU-MIMO transmission and the UL ACK transmission 312 is a MU-MIMO transmission. As another example, in an embodiment, the DL communication frame 304 is a MU-MIMO transmission and the UL ACK transmission 312 is an OFDMA transmission. As another example, in an embodiment, the DL communication frame 304 is an OFDMA transmission and the UL ACK transmission 312 is a MU-MIMO transmission. Thus, although various examples are described herein in the context of OFDMA transmissions, similar techniques are applicable to MU-MIMO transmissions.

In some embodiments, both i) OFDMA/MU-MIMO ACKs and ii) poll based ACKs are utilized to acknowledge a single MU DL transmission. For instance, in some embodiments, one or more client devices are not configured to transmit UL OFDMA ACKs, and thus the AP polls such clients to prompt those clients to transmit ACKs. In some embodiments, the AP may decide that one or more client devices should not participate in an UL OFDMA ACK, and thus the AP polls such clients to prompt those clients to transmit ACKs. Similarly, in some embodiments, one or more client devices are not configured to transmit UL MU-MIMO ACKs, and thus the AP polls such clients to prompt those clients to transmit ACKs. In some embodiments, the AP may decide that one or more client devices should not participate in an UL MU-MIMO ACK, and thus the AP polls such clients to prompt those clients to transmit ACKs.

Figure 4:
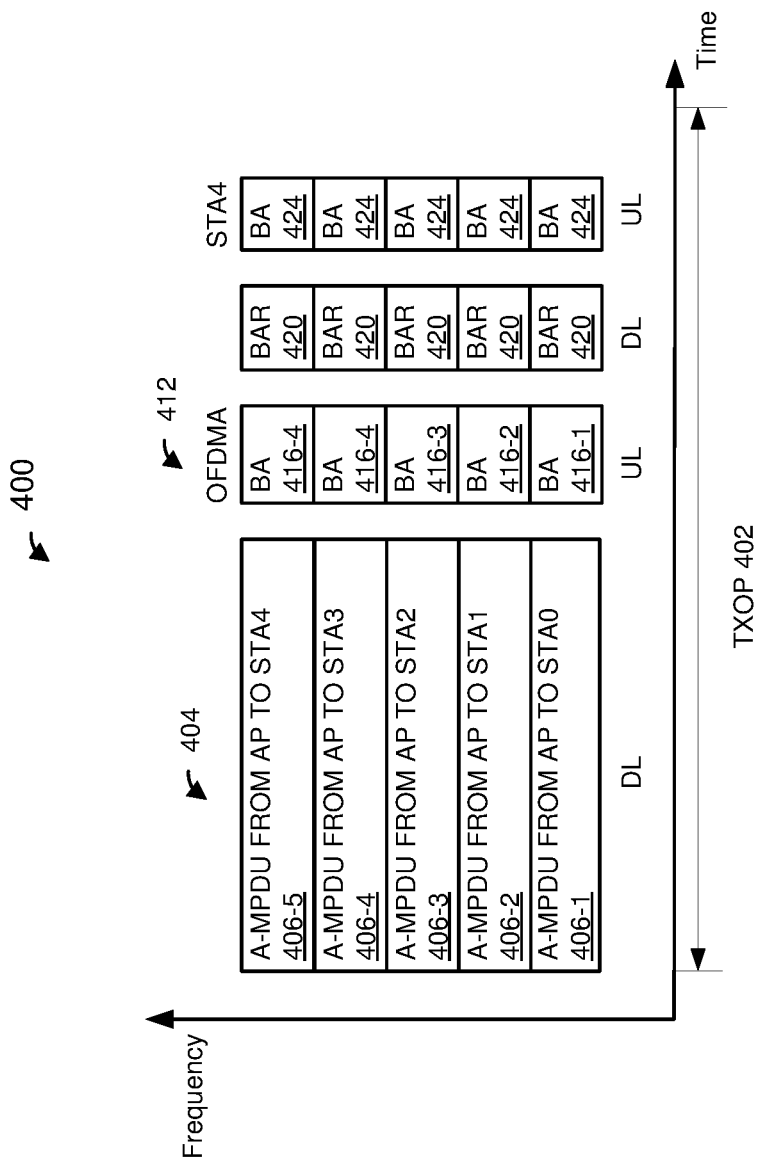
FIG. 4 is a diagram of yet another example transmission sequence in a WLAN, according to an embodiment.

FIG. 4 is a diagram of an example transmission sequence 400 in a WLAN, such as the WLAN 10 of FIG. 1, according to an embodiment, in which an AP, such as the AP 14, transmits a DL OFDMA communication frame to multiple client stations, such as multiple ones of the client stations 25, during a TXOP 402.

The AP 14 generates and transmits a DL OFDMA communication frame 404, in an embodiment. In an embodiment, the communication frame 404 comprises respective data 406 for multiple client devices. In an illustrative embodiment, the data 406 comprise respective A-MPDUs 406. In an embodiment, the communication frame 404 spans a bandwidth of a primary channel (e.g., a primary 20 MHz channel) of the WLAN 10 and multiple other secondary channels (e.g., 20 MHz channels) of the WLAN 10, i.e., the communication frame 404 spans a bandwidth of a composite channel comprising the primary channel and one or more secondary channels.

In an embodiment, the different data 406 correspond to different positions (in terms of frequency) within the communication frame 404, where each position is indicated by an index. For example, in an embodiment, the index starts at the lowest (in frequency) portion of the aggregate channel and increases as frequency increases. In another embodiment, the index starts at the highest (in frequency) portion of the aggregate channel and decreases as frequency decreases. Referring to the example illustrated in FIG. 4, in an embodiment, A-MPDU 406-1 corresponds to a first position, A-MPDU 406-2 corresponds to a second position, etc. In some embodiments and/or scenarios, each position corresponds to a 20 MHz channel. In other embodiments and/or scenarios, each position may correspond to a single 20 MHz channel or a composite of multiple 20 MHz channels. In other embodiments and/or scenarios, each position may correspond to a single 20 MHz channel, a composite of multiple 20 MHz channels, or different portions of a single 20 MHz channel.

In an embodiment, some of the client devices to which data transmissions 406 correspond generates and transmit respective ACK or BA portion as part of an UL OFDMA transmission 412 responsive to the communication frame 404. For example, in an embodiment, some client devices to which data transmissions 406 corresponds generate and transmit respective ACK or BA portions 416 a defined time period (e.g., a SIFS or another suitable time period) after the end of the communication frame 404. In an embodiment, some client devices generate and transmit respective ACK or BA portions 416 in respective frequency block within a communication channel spanned by the MU DL transmission.

In the example of FIG. 4, STA0-STA3 participate in the OFDMA transmission 412, while STA4 does not. STA0 generates and transmits portion 416-1. STA1 generates and transmits portion 416-2. STA2 generates and transmits portion 416-3. STA3 generates portion 416-4, duplicates portion 416-4, and transmits the portion 416-4 and the duplicate of portion 416-4 so that the UL OFDMA transmission 412 spans the bandwidth of the DL OFDMA transmission 404.

After receiving the UL OFDMA transmission 412, the AP generates and transmits a BAR frame to prompt the remaining client device (e.g., STA4) to transmit a BA to acknowledge the DL transmission 404. In an embodiment, the AP generates a BAR frame that spans a 20 MHz channel, duplicates the BAR frame in one or more other 20 MHz channels, and simultaneously transmits the BAR frame and the duplicates of the BAR frame. For instance, in the example of FIG. 4, the AP transmits multiple instances of a BAR frame 420 in multiple 20 MHz channels corresponding to the bandwidth of the communication frame 404. In response to the BAR frame 420, the corresponding client device (e.g., STA4) generates an ACK frame or BA frame that spans a 20 MHz channel, duplicates the ACK/BA frame in one or more other 20 MHz channels, and simultaneously transmits the ACK/BA and the duplicates of the ACK/BA. For instance, in the example of FIG. 4, STA4 transmits multiple instances of a BA frame 424 in multiple 20 MHz channels corresponding to the bandwidth of the communication frame 204.

Figure 5:
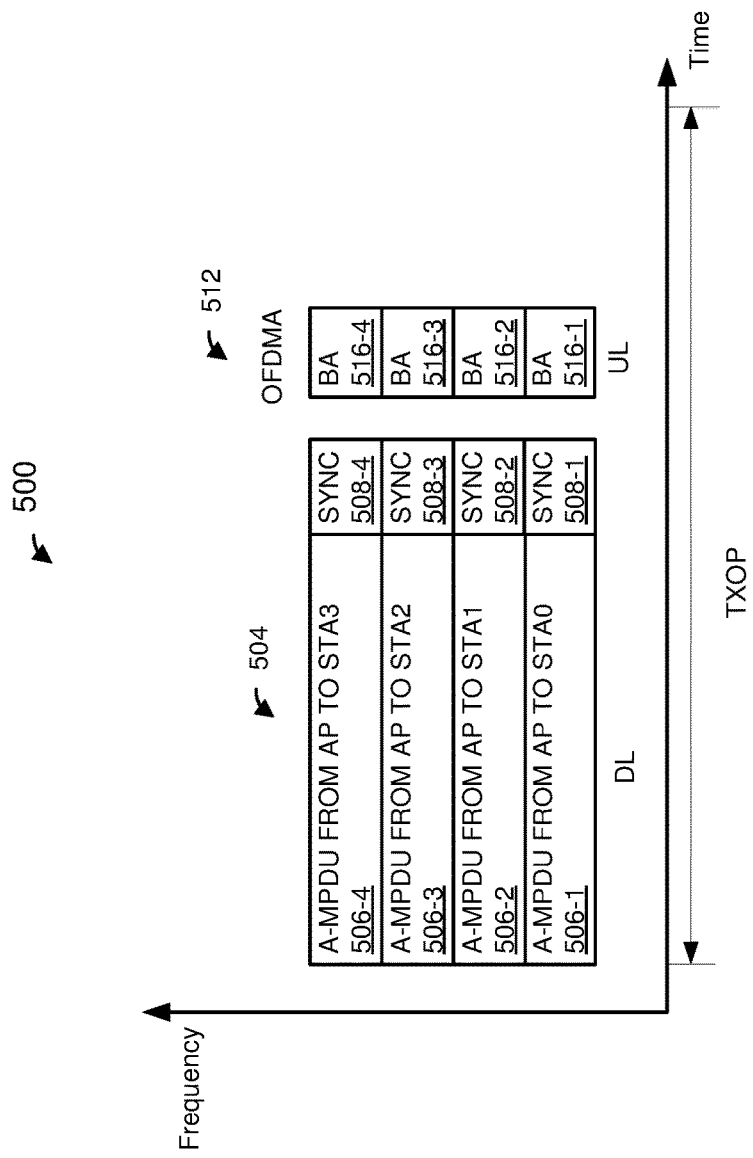
FIG. 5 is a diagram of still another example transmission sequence in a WLAN, according to an embodiment.

FIG. 5 is a diagram of an example transmission sequence 500 in a WLAN, such as the WLAN 10 of FIG. 1, according to an embodiment, in which an AP, such as the AP 14, transmits a DL OFDMA communication frame to multiple client stations, such as multiple ones of the client stations 25, during a TXOP 502.

The AP 14 generates and transmits a DL OFDMA communication frame 504, in an embodiment. In an embodiment, the communication frame 504 comprises respective data 506 for multiple client devices. In an illustrative embodiment, the data 506 comprise respective A-MPDUs 506, where each A-MPDU 506 includes a respective control frame 508 for controlling MU UL transmissions. Control frames such as the control frame 508 are sometimes referred to herein as "SYNC frames" or "trigger frames". In an embodiment, the AP utilizes sync frames 508 to indicate whether the corresponding client devices are to acknowledge the MU DL transmission 504 in an OFDMA ACK/BA or via a poll-based ACK procedure. For example, in an embodiment, if a respective SYNC frame 508 is present in the MU DL transmission 504, this indicates to a corresponding client device that the client device is to transmit as part of an OFDMA ACK/BA; whereas if a respective SYNC frame 508 is not present in the MU DL transmission 504, this indicates to a corresponding client device that the client device should acknowledge the MU DL transmission 504 via a poll-based procedure. In another embodiment, the AP includes information in each sync frame 508 that indicates whether the corresponding client device is to acknowledge the MU DL transmission 504 in an OFDMA ACK/BA or via a poll-based ACK procedure.

In an embodiment, each SYNC frame 508 includes information that indicates a length of the ACK/BA UL OFDMA transmission. For example, in an embodiment, each SYNC frame 508 indicates a number of orthogonal frequency division multiplexing (OFDM) symbols in the ACK/BA UL OFDMA transmission. As another example, in an embodiment, each SYNC frame 508 indicates a modulation and coding scheme (MCS) and a bandwidth to be used by the corresponding client device in the ACK/BA UL OFDMA transmission. For instance, in an embodiment, the MCS and bandwidth are determinative of the duration of the transmission.

In an embodiment, the communication frame 504 spans a bandwidth of a primary channel (e.g., a primary 20 MHz channel) of the WLAN 10 and multiple other secondary channels (e.g., 20 MHz channels) of the WLAN 10, i.e., the communication frame 304 spans a bandwidth of a composite channel comprising the primary channel and one or more secondary channels.

In an embodiment, each client device to which a data transmission 506 corresponds generates and transmits an ACK or BA portion as part of an UL OFDMA transmission 512 responsive to the communication frame 504. For example, in an embodiment, each client device to which a data transmission 506 corresponds generates and transmits an ACK or BA portion 516 a defined time period (e.g., a SIFS or another suitable time period) after the end of the communication frame 504. In an embodiment, each client device generates and transmits an ACK or BA portion 516 in a respective frequency block within a communication channel spanned by the MU DL transmission.

In the example of FIG. 5, each ACK or BA portion 516 has a same duration in time. Thus, in some embodiments, the AP determines the duration of the UL OFDMA transmission 512 and indicates to the client devices the duration of the UL OFDMA transmission 512. Then, each client device generates the respective portion 516 to have the indicated duration. For instance, as described above, the AP includes information indicative of the duration of the UL OFDMA transmission 512 in each SYNC 508, according to an embodiment. As another example, the AP includes information indicative of the duration of the UL OFDMA transmission 512 in a PHY preamble of the MU DL communication frame.

In some embodiments, the position and bandwidth within a MU DL OFDMA transmission of data corresponding to a client device determines the position and bandwidth within a MU UL ACK/BA transmission by the client device. For example, in an embodiment, the client device generates and transmits an ACK/BA at the same position and bandwidth as the position and bandwidth within the MU DL OFDMA transmission of data corresponding to the client device. In some embodiments, the AP determines the position and bandwidth within a MU UL ACK/BA transmission by the client device, and informs the client device. For example, in an embodiment, the AP determines the position and bandwidth within a MU UL ACK/BA transmission by the client device, and includes information indicating the position and bandwidth in the SYNC frame of the MU DL communication frame, in a PHY preamble of the MU DL communication frame, etc. The client devices then utilize the information included in the MU DL communication frame to determine the positions and bandwidths within the MU UL ACK/BA that the client devices are to transmit.

In an embodiment, the SYNC frame 508 includes one or more bits that indicate whether the client device should acknowledge the MU DL transmission 504 in an OFDMA transmission. In an embodiment, the SYNC frame 508 includes one or more bits that indicate whether the client device should acknowledge the MU DL transmission 504 using the same bandwidth, channel position, spatial stream (s), etc., of the portion of the MU DL transmission corresponding to the client device. In an embodiment, if the one or more bits do not indicate that the client device should acknowledge the MU DL transmission 504 using the same bandwidth, channel position, spatial stream, etc., the AP may include indications of the bandwidth, the channel position, the spatial stream(s), etc., to be utilized by the client device in the MU UL ACK/BA transmission.

Figure 6A:
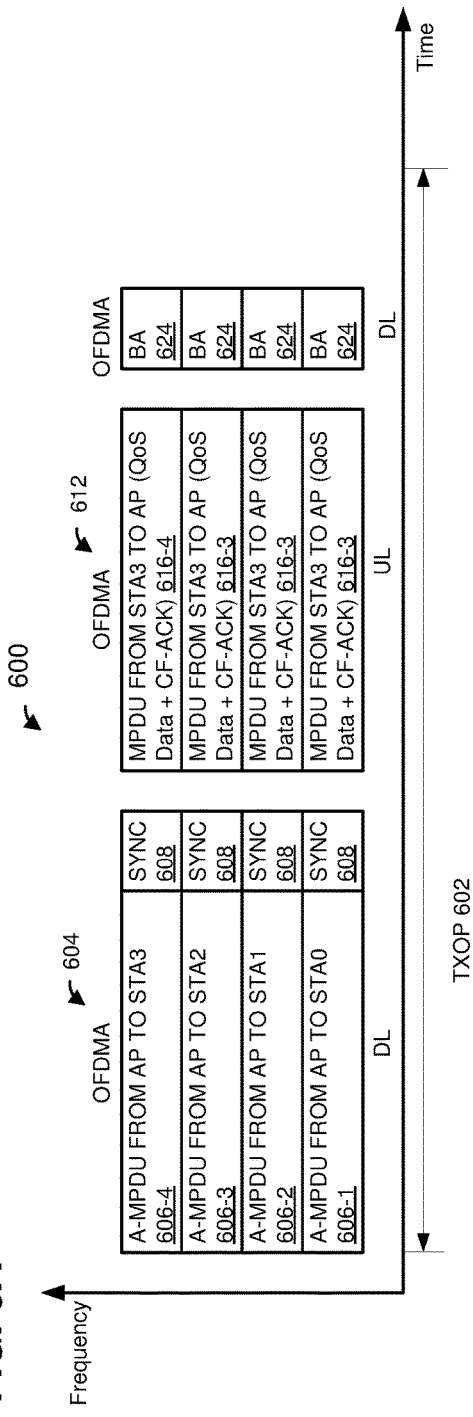
FIG. 6A is a diagram of another example transmission sequence in a WLAN, according to an embodiment.

In some embodiments and/or scenarios, UL ACKs/BAs are incorporated in UL data frames. FIG. 6A is a diagram of an example transmission sequence 600 in a WLAN, such as the WLAN 10 of FIG. 1, according to an embodiment, in which an AP, such as the AP 14, transmits a DL OFDMA communication frame to multiple client stations, such as multiple ones of the client stations 25, during a TXOP 602.

The AP 14 generates and transmits a DL OFDMA communication frame 604, in an embodiment. In an embodiment, the communication frame 604 comprises respective data 606 for multiple client devices. In an illustrative embodiment, the data 606 comprise respective A-MPDUs 606, where each A-MPDU 606 includes a respective control frame 608 for controlling MU UL transmissions.

In an embodiment, the communication frame 604 spans a bandwidth of a primary channel (e.g., a primary 20 MHz channel) of the WLAN 10 and multiple other secondary channels (e.g., 20 MHz channels) of the WLAN 10, i.e., the communication frame 604 spans a bandwidth of a composite channel comprising the primary channel and one or more secondary channels.

In an embodiment, each client device to which a data transmission 606 corresponds generates and transmits data as part of an UL OFDMA transmission 612 responsive to the communication frame 604. For example, in an embodiment, each client device to which a data transmission 606 corresponds generates and transmits a portion 616 a defined time period (e.g., a SIFS or another suitable time period) after the end of the communication frame 604. In an embodiment, each client device generates and transmits a data portion 616 in a respective frequency block within a communication channel spanned by the MU DL transmission. In an embodiment, each portion 616 is a respective quality of service (QoS)+contention free (CF)-ACK (QoS+CF-ACK) frame. Each QoS+CF-ACK frame 616 serves as a respective acknowledgment of the MU DL communication frame 604 from the respective client devices.

In an embodiment, the AP generates and transmits a DL OFDMA transmission 624 acknowledging the MU UL transmission 612.

Figure 6B:
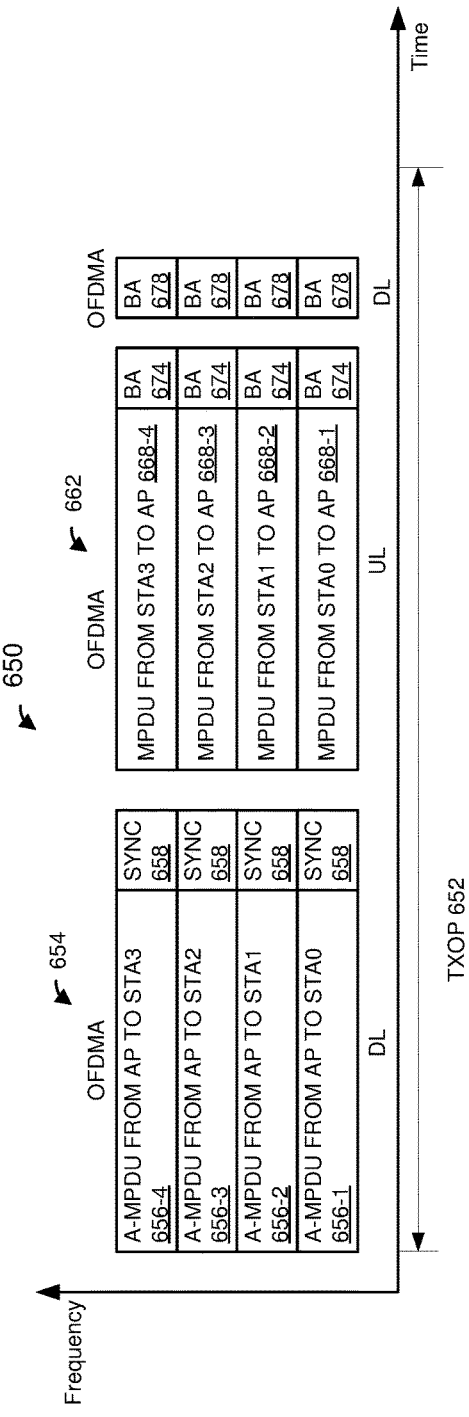
FIG. 6B is a diagram of another example transmission sequence in a WLAN, according to an embodiment.

FIG. 6B is a diagram of an example transmission sequence 650 in a WLAN, such as the WLAN 10 of FIG. 1, according to an embodiment, in which an AP, such as the AP 14, transmits a DL OFDMA communication frame to multiple client stations, such as multiple ones of the client stations 25, during a TXOP 652.

The AP 14 generates and transmits a DL OFDMA communication frame 654, in an embodiment. In an embodiment, the communication frame 654 comprises respective data 656 for multiple client devices. In an illustrative embodiment, the data 656 comprise respective A-MPDUs 656, where each A-MPDU 656 includes a respective control frame 658 for controlling MU UL transmissions.

In an embodiment, the communication frame 654 spans a bandwidth of a primary channel (e.g., a primary 20 MHz channel) of the WLAN 10 and multiple other secondary channels (e.g., 20 MHz channels) of the WLAN 10, i.e., the communication frame 654 spans a bandwidth of a composite channel comprising the primary channel and one or more secondary channels.

In an embodiment, each client device to which a data transmission 656 corresponds generates and transmits data as part of an UL OFDMA transmission 662 responsive to the communication frame 654. For example, in an embodiment, each client device to which a data transmission 656 corresponds generates and transmits a portion 668 a defined time period (e.g., a SIFS or another suitable time period) after the end of the communication frame 654. In an embodiment, each client device generates and transmits a data portion 668 in a respective frequency block within a communication channel spanned by the MU DL transmission. In an embodiment, each portion 668 is a respective MPDU frame with a BA 674. In an embodiment, each portion 668 is a respective A-MPDU with a data first MPDU having data and a second MPDU corresponding to a BA frame.

In an embodiment, the AP generates and transmits a DL OFDMA transmission 678 acknowledging the MU UL transmission 662.

Figure 7:
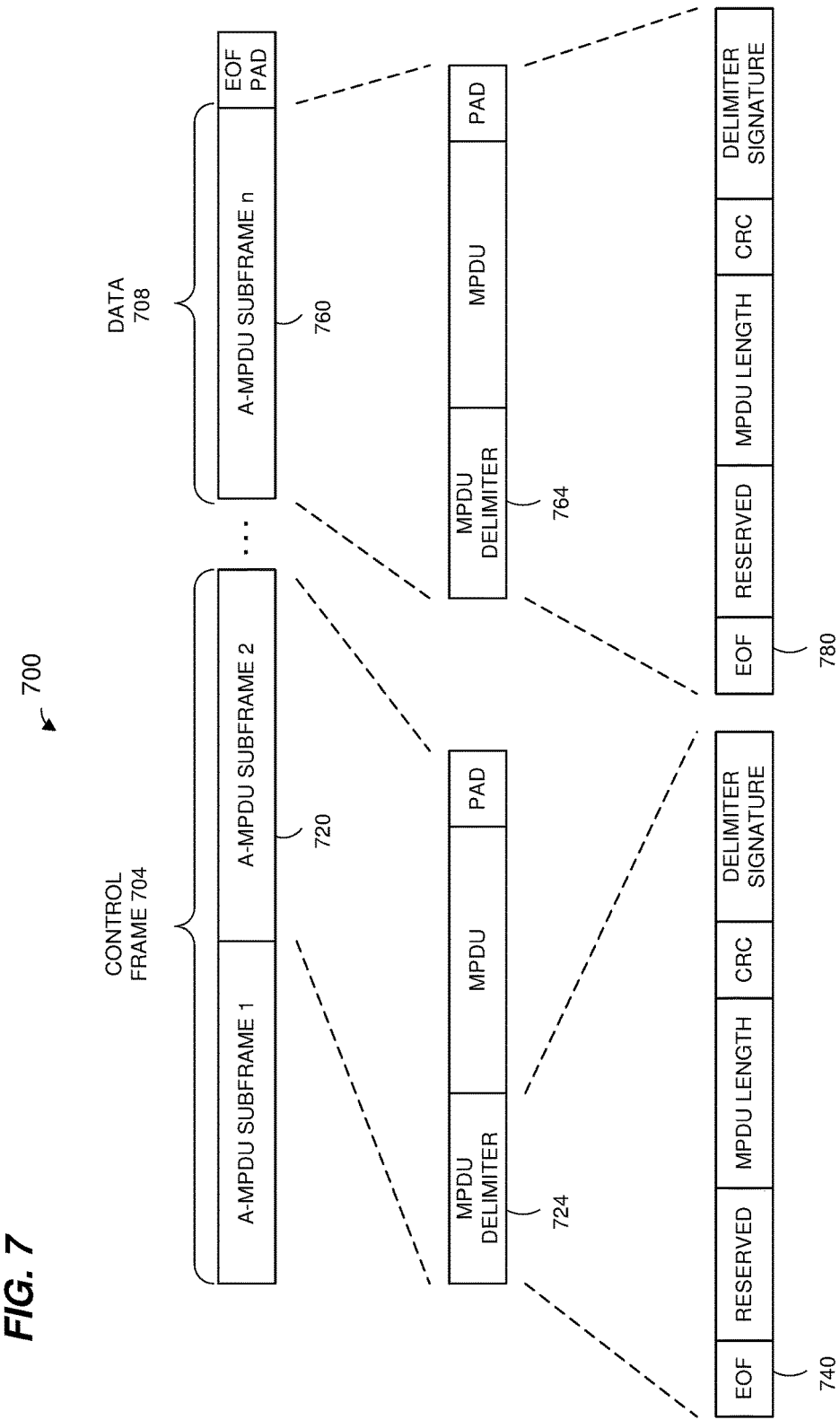
FIG. 7 is a diagram of an example multi-user downlink communication frame, according to an embodiment.

FIG. 7 is a diagram of an example A-MPDU 700 that may be utilized by the AP in MU DL transmissions and/or by a client device in MU UL transmissions, according to some embodiments. Thus, in some embodiments, the network interface device 16 (FIG. 1) (e.g., the MAC processing unit 18) is configured to generate and transmit A-MPDUs such as the A-MPDU 700. Similarly, in some embodiments, the network interface device 27 (FIG. 1) (e.g., the MAC processing unit 28) is configured to generate and transmit A-MPDUs such as the A-MPDU 700.

The A-MPDU 700 is included in an OFDMA PPDU for transmission. Thus, in some embodiments, the network interface device 16 (FIG. 1) (e.g., the PHY processing unit 20) is configured to generate and transmit a PPDU including an A-MPDU such as the A-MPDU 700. Similarly, in some embodiments, the network interface device 27 (FIG. 1) (e.g., the PHY processing unit 29) is configured to generate and transmit a PPDU including an A-MPDU such as the A-MPDU 700.

The A-MPDU 700 includes a control frame portion 704 and a data portion 708. In some embodiments, the control frame portion 704 comprises one or more A-MPDU subframes. In some embodiments, the data portion 708 comprises one or more A-MPDU subframes. In an embodiment, the data portion 708 includes only one A-MPDU subframe, and the A-MPDU 700 is sometimes referred to as a "HEW single data frame". In some embodiments, a communication device that correctly receives a HEW single data frame acknowledges the HEW single data frame with an ACK, a QoS+CF-ACK frame, etc. In some embodiments, a communication device that correctly receives a HEW single data frame acknowledges the HEW single data frame with a BA.

In an embodiment, the control frame portion 704 is at a beginning (in time) of the A-MPDU 700, and the data portion 708 is at an end (in time) of the A-MPDU 700, as illustrated in FIG. 7. In other embodiments, however, the control frame portion 704 is at an end (in time) of the A-MPDU 700, and the data portion 708 is at a beginning (in time) of the A-MPDU 700.

In various embodiments and/or scenarios, the control frame portion 704 includes an ACK, a BA, a BAR, a SYNC, etc. Thus, in some embodiments, at least some of the A-MPDUs illustrated in FIGS. 2-6 have a format the same as or similar to the example A-MPDU 700. In other embodiments, however, at least some of the A-MPDUs illustrated in FIGS. 2-6 have a format different than the example A-MPDU 700.

In an embodiment, each A-MPDU subframe in the A-MPDU 700 includes an MPDU delimiter field, and each MPDU delimiter field includes an end of frame (EOF) flag. For example, the control frame portion 704 includes an A-MPDU subframe 720. The A-MPDU subframe 720 includes a MPDU delimiter field 724 having an EOF flag 740. In an embodiment, the EOF flag 740 is set to a value to indicate that the A-MPDU subframe 720 is not the last subframe in the A-MPDU 700 (e.g., the EOF flag 740 is set to zero). In an embodiment, all EOF flags corresponding to all A-MPDU subframes in the control frame portion 704 are set to a value to indicate that the A-MPDU subframes in the control frame portion 704 are not the last subframe in the A-MPDU 700 (e.g., the EOF flags are set to zero).

The A-MPDU subframe 760 includes a MPDU delimiter field 764 having an EOF flag 780. In an embodiment, the EOF flag 780 is set to a value to indicate that the A-MPDU subframe 760 is the last subframe in the A-MPDU 700 (e.g., the EOF flag 780 is set to one). In an embodiment, EOF flags of other A-MPDU subframes in the data portion 708 prior (in time) to the A-MPDU subframe 760 (if any) are set to a value to indicate that those A-MPDU subframes in the data portion 708 are not the last subframe in the A-MPDU 700 (e.g., the EOF flags are set to zero).

Figure 8A:
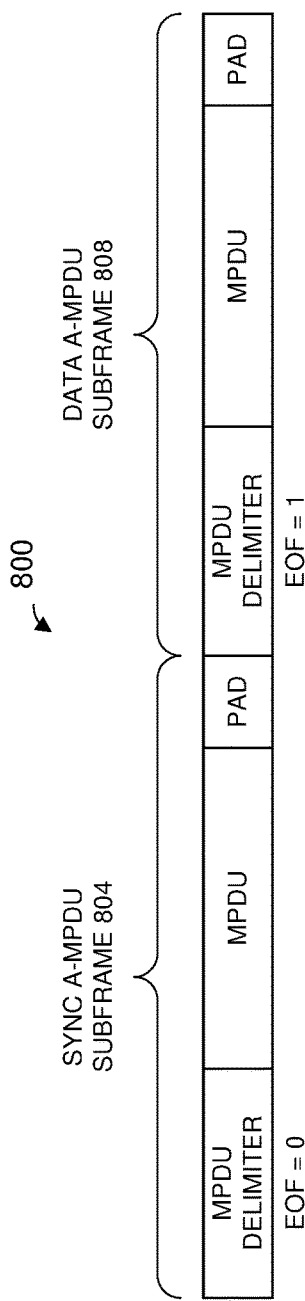
FIG. 8A is a diagram of another example multi-user downlink communication frame, according to an embodiment.
Figure 8B:
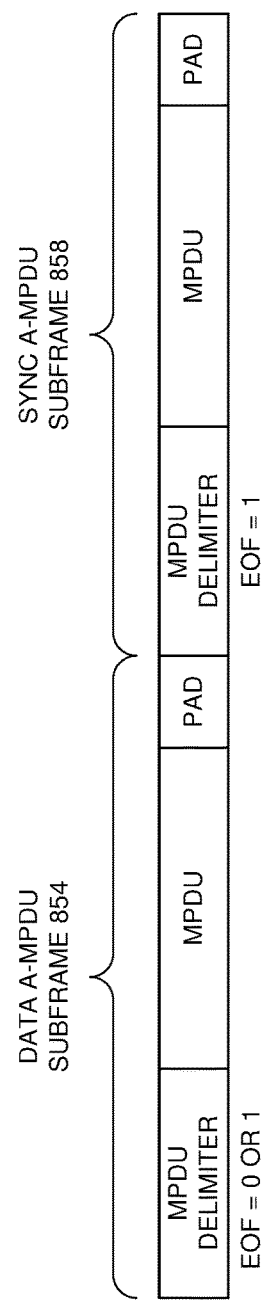
FIG. 8B is a diagram of another example multi-user downlink communication frame, according to an embodiment.

FIGS. 8A and 8B are diagrams of example A-MPDUs that may be utilized by the AP in MU DL transmissions, according to some embodiments. Thus, in some embodiments, the network interface device 16 (FIG. 1) (e.g., the MAC processing unit 18) is configured to generate and transmit A-MPDUs such as the A-MPDU 800 and/or the A-MPDU 804.

The A-MPDU 800/850 is included in an OFDMA PPDU for transmission. Thus, in some embodiments, the network interface device 16 (FIG. 1) (e.g., the PHY processing unit 20) is configured to generate and transmit a PPDU including an A-MPDU such as the A-MPDU 800 and/or the A-MPDU 804.

Referring now to FIG. 8A, the A-MPDU 800 includes an A-MPDU subframe 804 corresponding to a SYNC, and an A-MPDU subframe 808 corresponding to data. In an embodiment, the A-MPDU 800 is an example of a HEW single data frame. In some embodiments, a communication device that correctly receives a HEW single data frame acknowledges the HEW single data frame with an ACK, a QoS+CF-ACK frame, etc. In some embodiments, a communication device that correctly receives a HEW single data frame acknowledges the HEW single data frame with a BA.

In an embodiment, the A-MPDU subframe 804 is at a beginning (in time) of the A-MPDU 800, and the A-MPDU subframe 808 is at an end (in time) of the A-MPDU 800, as illustrated in FIG. 8A.

In some embodiments, at least some of the A-MPDUs illustrated in FIGS. 2-6 transmitted by the AP in a MU DL transmission have a format the same as or similar to the example A-MPDU 800. In other embodiments, however, at least some of the A-MPDUs illustrated in FIGS. 2-6 transmitted by the AP in a MU DL transmission have a format different than the example A-MPDU 800.

In an embodiment, the A-MPDU subframe 804 includes an MPDU delimiter field having an EOF flag set to a value to indicate that the A-MPDU subframe 804 is not the last subframe in the A-MPDU 800 (e.g., the EOF flag is set to zero). The A-MPDU subframe 808 includes a MPDU delimiter field having an EOF flag set to a value to indicate that the A-MPDU subframe 808 is the last subframe in the A-MPDU 800 (e.g., the EOF flag is set to one).

Referring now to FIG. 8B, the A-MPDU 850 includes an A-MPDU subframe 854 corresponding to data, and an A-MPDU subframe 858 corresponding to SYNC. In an embodiment, the A-MPDU 850 is an example of a HEW single data frame. In some embodiments, a communication device that correctly receives a HEW single data frame acknowledges the HEW single data frame with an ACK, a QoS+CF-ACK frame, etc. In some embodiments, a communication device that correctly receives a HEW single data frame acknowledges the HEW single data frame with a BA.

In an embodiment, the A-MPDU subframe 854 is at a beginning (in time) of the A-MPDU 850, and the A-MPDU subframe 858 is at an end (in time) of the A-MPDU 850, as illustrated in FIG. 8B.

In some embodiments, at least some of the A-MPDUs illustrated in FIGS. 2-6 transmitted by the AP in a MU DL transmission have a format the same as or similar to the example A-MPDU 850. In other embodiments, however, at least some of the A-MPDUs illustrated in FIGS. 2-6 transmitted by the AP in a MU DL transmission have a format different than the example A-MPDU 850.

In an embodiment, the A-MPDU subframe 854 includes an MPDU delimiter field having an EOF flag set to a value to indicate that the A-MPDU subframe 854 is not the last subframe in the A-MPDU 850 (e.g., the EOF flag is set to zero). In another embodiment, the A-MPDU subframe 854 includes an MPDU delimiter field having an EOF flag set to a value to indicate that the A-MPDU subframe 854 is the last subframe in the A-MPDU 850 (e.g., the EOF flag is set to one). The A-MPDU subframe 858 includes a MPDU delimiter field having an EOF flag set to a value to indicate that the A-MPDU subframe 858 is the last subframe in the A-MPDU 850 (e.g., the EOF flag is set to one).

In other embodiments, more than one A-MPDU subframe corresponding to data is included in the A-MPDU 800 and/or the A-MPDU 850. For example, in some embodiments, with respect to the example A-MPDU 800, further A-MPDU subframes corresponding to data are included after (in time) the A-MPDU subframe 804 and prior to (in time) the A-MPDU subframe 808, and such further A-MPDU subframes corresponding to data each have an EOF flag set to a value to indicate that the A-MPDU subframe is not the last subframe in the A-MPDU 800 (e.g., the EOF flag is set to zero). As another example, in some embodiments, with respect to the example A-MPDU 850, further A-MPDU subframes corresponding to data are included prior to (in time) the A-MPDU subframe 854, and such further A-MPDU subframes corresponding to data each have an EOF flag set to a value to indicate that the A-MPDU subframe is not the last subframe in the A-MPDU 850 (e.g., the EOF flag is set to zero). In an embodiment, the EOF flag of the A-MPDU subframe 854 includes is set to a value to indicate that the A-MPDU subframe 854 is the last subframe in the A-MPDU 850 (e.g., the EOF flag is set to one).

In some embodiments, a MU DL transmission may utilize both OFDMA and MU-MIMO. In some embodiments, the AP may determine whether client devices are to acknowledge an MU DL transmission that utilizes both OFDMA and MU-MIMO with i) poll-based acknowledgments or ii) OFDMA acknowledgments.

For example, FIGS. 9A and 9B illustrate examples of MU DL transmission that utilize both OFDMA and MU-MIMO. In FIG. 9A, the AP has determined that client devices are to acknowledge an MU DL transmission that utilizes both OFDMA and MU-MIMO with poll-based acknowledgments. Thus, in an embodiment, the MU DL transmission does not include SYNC frames to indicate to the client devices that the client devices are to acknowledge the MU DL transmission with poll-based acknowledgments. On the other hand, in FIG. 9B, the AP has determined that client devices are to acknowledge an MU DL transmission that utilizes both OFDMA and MU-MIMO with an OFDMA acknowledgment. Thus, in an embodiment, the MU DL transmission includes SYNC frames i) to indicate to the client devices that the client devices are to acknowledge the MU DL transmission with an OFDMA acknowledgment, and ii) to prompt the client devices to transmit the OFDMA acknowledgment.

FIG. 9A is a diagram of an example transmission sequence 900 in a WLAN, such as the WLAN 10 of FIG. 1, according to an embodiment, in which an AP, such as the AP 14, transmits a DL OFDMA communication frame to multiple client stations, such as multiple ones of the client stations 25, during a TXOP 902.

The AP 14 generates and transmits a DL OFDMA communication frame 904, in an embodiment. In an embodiment, the communication frame 904 comprises respective data 906 for multiple client devices. In an illustrative embodiment, the data 906 comprise respective A-MPDUs 906. In an embodiment, the communication frame 904 spans a bandwidth of a primary channel (e.g., a primary 20 MHz channel) of the WLAN 10 and multiple other secondary channels (e.g., 20 MHz channels) of the WLAN 10, i.e., the communication frame 904 spans a bandwidth of a composite channel comprising the primary channel and one or more secondary channels.

In an embodiment, the different data 906 correspond to different positions (in terms of frequency) within the communication frame 904, where each position is indicated by an index. For example, in an embodiment, the index starts at the lowest (in frequency) portion of the aggregate channel and increases as frequency increases. In another embodiment, the index starts at the highest (in frequency) portion of the aggregate channel and decreases as frequency decreases. Referring to the example illustrated in FIG. 9A, in an embodiment, A-MPDU 906-1 corresponds to a first position, A-MPDU 906-2 corresponds to a second position, etc. In some embodiments and/or scenarios, each position corresponds to a 20 MHz channel. In other embodiments and/or scenarios, each position may correspond to a single 20 MHz channel or a composite of multiple 20 MHz channels. In other embodiments and/or scenarios, each position may correspond to a single 20 MHz channel, a composite of multiple 20 MHz channels, or different portions of a single 20 MHz channel.

In an embodiment, the A-MPDU 906-2 is a MU-MIMO transmission to STA1 and STA2. In an embodiment, the A-MPDU 906-2 is transmitted in a composite channel composing multiple 20 MHz channels.

Because the MU DL PPDU 904 does not include SYNCs, the client devices (e.g., STA0-STA3) determine that the client devices are to acknowledge the MU DL PPDU 904 using poll-based acknowledgments, according to an embodiment.

In an embodiment, the client device corresponding to the data transmission in the first position (e.g., STA0 corresponding to A-MPDU 906-1) generates and transmits an ACK/BA frame to the AP via an UL channel responsive to the communication frame 904. For example, in an embodiment, the client device corresponding to the data transmission in the first position generates and transmits an ACK frame or BA frame a defined time period (e.g., a SIFS or another suitable time period) after the end of the communication frame 904. In an embodiment, the client device corresponding to the data transmission in the first position generates an ACK frame or BA frame that spans a 20 MHz channel, duplicates the ACK/BA frame in one or more other 20 MHz channels, and simultaneously transmits the ACK/BA and the duplicates of the ACK/BA. For instance, in the example of FIG. 9A, STA0 transmits multiple instances of a BA frame 908 in multiple 20 MHz channels corresponding to the bandwidth of the communication frame 204. In some embodiments, the ACK/BA is formatted according to the HEW protocol. In some embodiments, the ACK/BA is formatted according to a legacy protocol.

After receiving the ACK/BA 908, the AP generates and transmits a BAR frame to prompt another client device (e.g., STA1) to transmit a BA to acknowledge the DL transmission 904. In an embodiment, the AP generates a BAR frame that spans a 20 MHz channel, duplicates the BAR frame in one or more other 20 MHz channels, and simultaneously transmits the BAR frame and the duplicates of the BAR frame. For instance, in the example of FIG. 9A, the AP transmits multiple instances of a BAR frame 912 in multiple 20 MHz channels corresponding to the bandwidth of the communication frame 904. In response to the BAR frame 912, the corresponding client device (e.g., STA1) generates an ACK frame or BA frame that spans a 20 MHz channel, duplicates the ACK/BA frame in one or more other 20 MHz channels, and simultaneously transmits the ACK/BA and the duplicates of the ACK/BA. For instance, in the example of FIG. 9A, STA1 transmits multiple instances of a BA frame 916 in multiple 20 MHz channels corresponding to the bandwidth of the communication frame 904.

After receiving the ACK/BA 916, the AP generates and transmits a BAR frame to prompt another client device (e.g., STA2) to transmit an ACK/BA to acknowledge the DL transmission 904. In an embodiment, the AP generates a BAR frame that spans a 20 MHz channel, duplicates the BAR frame in one or more other 20 MHz channels, and simultaneously transmits the BAR frame and the duplicates of the BAR frame. For instance, in the example of FIG. 9A, the AP transmits multiple instances of a BAR frame 920 in multiple 20 MHz channels corresponding to the bandwidth of the communication frame 904. In response to the BAR frame 920, the corresponding client device (e.g., STA2) generates an ACK frame or BA frame that spans a 20 MHz channel, duplicates the ACK/BA frame in one or more other 20 MHz channels, and simultaneously transmits the ACK/BA and the duplicates of the ACK/BA. For instance, in the example of FIG. 9A, STA2 transmits multiple instances of a BA frame 924 in multiple 20 MHz channels corresponding to the bandwidth of the communication frame 904.

After receiving the ACK/BA 924, the AP generates and transmits a BAR frame to prompt a last client device (e.g., STA3) to transmit an ACK/BA to acknowledge the DL transmission 904. In an embodiment, the AP generates a BAR frame that spans a 20 MHz channel, duplicates the BAR frame in one or more other 20 MHz channels, and simultaneously transmits the BAR frame and the duplicates of the BAR frame. For instance, in the example of FIG. 9A, the AP transmits multiple instances of a BAR frame 928 in multiple 20 MHz channels corresponding to the bandwidth of the communication frame 904. In response to the BAR frame 928, the corresponding client device (e.g., STA3) generates an ACK frame or BA frame that spans a 20 MHz channel, duplicates the ACK/BA frame in one or more other 20 MHz channels, and simultaneously transmits the ACK/BA and the duplicates of the ACK/BA. For instance, in the example of FIG. 9A, STA3 transmits multiple instances of a BA frame 932 in multiple 20 MHz channels corresponding to the bandwidth of the communication frame 904.

In some embodiments, client devices transmit ACKs/BAs for a DL OFDMA/MU-MIMO frame sequentially in a manner similar to FIG. 9A, but without being polled by the AP. For example, in an embodiment, the AP assigns STAs to groups and broadcasts (or multicasts) an indication of group membership by listing association IDs (AIDs) of STAs within the group. In such embodiments, the order of AIDs in the group membership broadcast/multicast indicate an order in which client devices should transmit ACKs/BAs of a DL OFDMA/MU-MIMO frame.

In some embodiments in which a DL OFDMA frame also includes a MU-MIMO transmission (e.g., A-MPDU 906-2 in FIG. 9A and A-MPDU 956-3 in FIG. 9B), the order of AIDs in the group membership broadcast/multicast indicate positions, in frequency, of transmissions within an OFDMA ACK/BA. For instance, in the illustrative example of FIG. 9B, the positions, in frequency, of BA 968-2 and BA 968-3 are determined based on the order of AIDs in the group membership broadcast/multicast, in an embodiment.

In some embodiments in which a DL OFDMA frame includes a MU-MIMO transmission spanning only 20 MHz, recipients of the MU-MIMO transmission acknowledge the MU-MIMO transmission with an UL OFDMA transmission in which different client devices transmit in different groups of OFDM tones (e.g., groups of 26 tones) within the 20 MHz channel. Determining which client devices transmit on which groups of OFDM tones utilize techniques such as described herein, in various embodiments.

In some embodiments in which a DL OFDMA frame includes a MU-MIMO transmission, recipients of the MU-MIMO transmission acknowledge the MU-MIMO transmission with an UL MU-MIMO transmission in which different client devices transmit via different spatial streams. In some embodiments, the AP may assign different client devices to different spatial streams and inform the client devices of the assignments using techniques such as described herein. In some embodiments, client devices may determine the spatial streams to use to acknowledge the DL MU-MIMO transmission as the same spatial streams used by the AP in the DL MU-MIMO transmission. In some embodiments, client devices may determine the spatial streams to use to acknowledge the DL MU-MIMO transmission based on the order of AIDs in the group membership broadcast/multicast.

FIG. 9B is a diagram of an example transmission sequence 950 in a WLAN, such as the WLAN 10 of FIG. 1, according to an embodiment, in which an AP, such as the AP 14, transmits a DL OFDMA communication frame to multiple client stations, such as multiple ones of the client stations 25, during a TXOP 952.

The AP 14 generates and transmits a DL OFDMA communication frame 954, in an embodiment. In an embodiment, the communication frame 544 comprises respective data 956 for multiple client devices. In an illustrative embodiment, the data 956 comprise respective A-MPDUs 956, where each A-MPDU 956 includes a respective control frame 960 for controlling MU UL transmissions. For example, in an embodiment, the AP has determined that client devices are to respond with an OFDMA acknowledgment, and thus the AP includes SYNCs 960 in the MU DL transmission 954. Because the MU DL PPDU 954 includes SYNCs 960, the client devices (e.g., STA0-STA3) determine that the client devices are to acknowledge the MU DL PPDU 954 using an OFDMA acknowledgment, according to an embodiment. Additionally, in an embodiment, the SYNCs 960 prompt the client devices (e.g., STA0-STA3) to transmit the OFDMA acknowledgment.

In an embodiment, each SYNC frame 960 includes information that indicates a length of the ACK/BA UL OFDMA transmission. For example, in an embodiment, each SYNC frame 960 indicates a number of OFDM symbols in the ACK/BA UL OFDMA transmission. As another example, in an embodiment, each SYNC frame 960 indicates an MCS and a bandwidth to be used by the corresponding client device in the ACK/BA UL OFDMA transmission. For instance, in an embodiment, the MCS and bandwidth are determinative of the duration of the transmission.

In an embodiment, the communication frame 954 spans a bandwidth of a primary channel (e.g., a primary 20 MHz channel) of the WLAN 10 and multiple other secondary channels (e.g., 20 MHz channels) of the WLAN 10, i.e., the communication frame 954 spans a bandwidth of a composite channel comprising the primary channel and one or more secondary channels.

In an embodiment, each client device to which a data transmission 956 corresponds generates and transmits an ACK or BA portion as part of an UL OFDMA transmission 964 responsive to the communication frame 954. For example, in an embodiment, each client device to which a data transmission 956 corresponds generates and transmits an ACK or BA portion 968 a defined time period (e.g., a SIFS or another suitable time period) after the end of the communication frame 954. In an embodiment, each client device generates and transmits an ACK or BA portion 968 in a respective frequency block within a communication channel spanned by the MU DL transmission.

In the example of FIG. 9B, each ACK or BA portion 968 has a same duration in time. Thus, in some embodiments, the AP determines the duration of the UL OFDMA transmission 964 and indicates to the client devices the duration of the UL OFDMA transmission 964. Then, each client device generates the respective portion 968 to have the indicated duration. For instance, as described above, the AP includes information indicative of the duration of the UL OFDMA transmission 964 in each SYNC 960, according to an embodiment. As another example, the AP includes information indicative of the duration of the UL OFDMA transmission 964 in a PHY preamble of the MU DL communication frame.

In some embodiments, the AP determines the position and bandwidth within a MU UL ACK/BA transmission by the client device, and informs the client device. For example, in an embodiment, the AP determines the position and bandwidth within a MU UL ACK/BA transmission by the client device, and includes information indicating the position and bandwidth in the SYNC frame of the MU DL communication frame, in a PHY preamble of the MU DL communication frame, etc. The client devices then utilize the information included in the MU DL communication frame to determine the positions and bandwidths within the MU UL ACK/BA that the client devices are to transmit.

In an embodiment, the SYNC frame 960 includes one or more bits that indicate whether the client device should acknowledge the MU DL transmission 954 in an OFDMA transmission. In an embodiment, the AP may include indications of the bandwidth, the channel position, the spatial stream(s), etc., to be utilized by the client device in the MU UL ACK/BA transmission 964.

In various embodiments, each data transmission 956 has a format the same as or similar to the A-MPDU format 700 (FIG. 7), the A-MPDU format 800 (FIG. 8A), the A-MPDU format 850 (FIG. 8B), or another suitable format.

In some embodiments, a client device is not able to transmit across a full composite channel via which the MU DL communication frame is transmitted. As an illustrative example, an AP may be capable of transmitting at a cumulative bandwidth of 80 MHz, 160 MHz, 320, MHz, etc., in various embodiments, but a client device may have a maximum transmission bandwidth capability of only 40 MHz.

Figure 10:
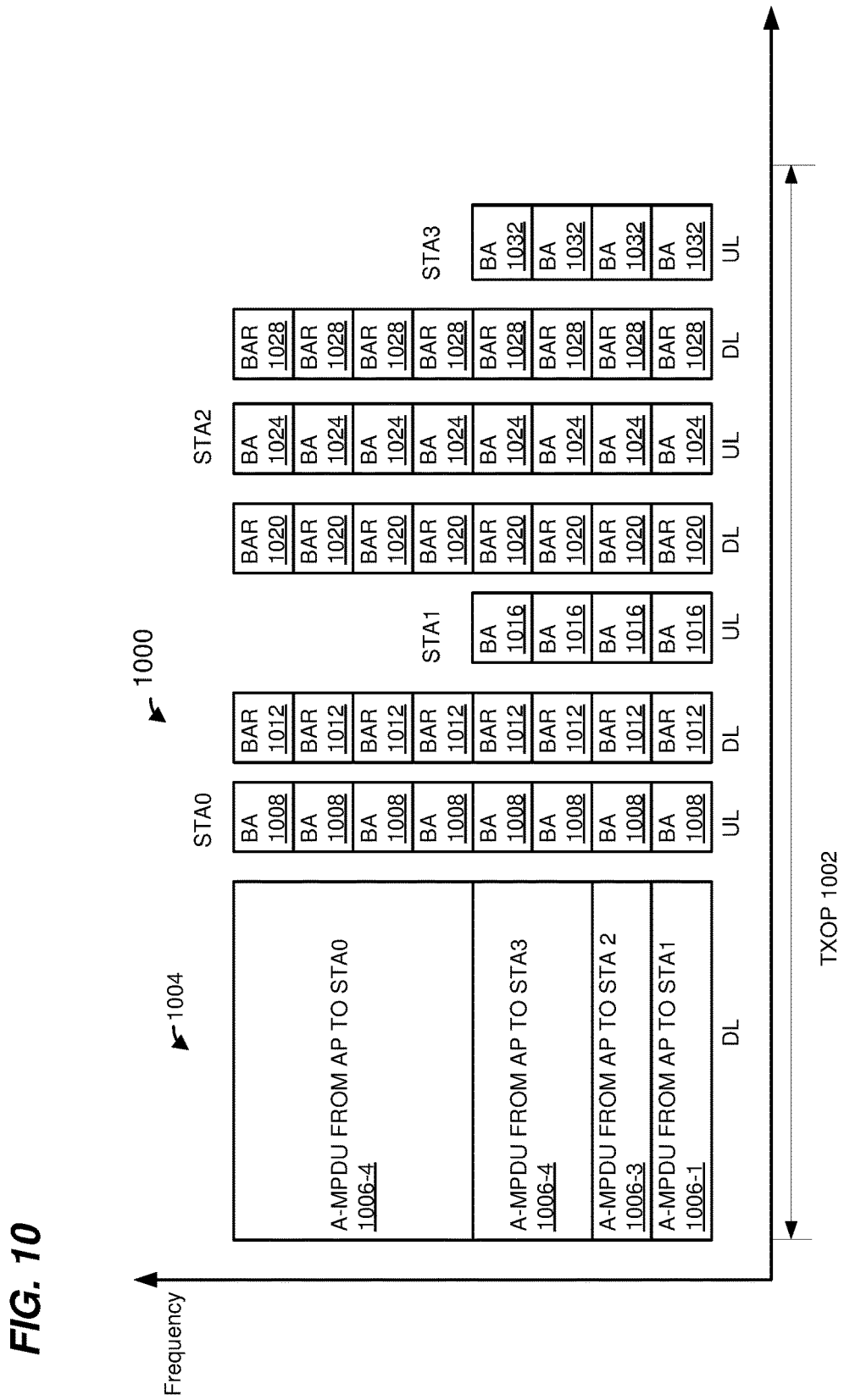
FIG. 10 is a diagram of yet another example transmission sequence in a WLAN, according to an embodiment.

FIG. 10 is a diagram of an example transmission sequence 1000 in a WLAN, such as the WLAN 10 of FIG. 1, according to an embodiment, in which an AP, such as the AP 14, transmits a DL OFDMA communication frame to multiple client stations, such as multiple ones of the client stations 25, during a TXOP 1002.

The AP 14 generates and transmits a DL OFDMA communication frame 1004, in an embodiment. In an embodiment, the communication frame 1004 comprises respective data 1006 for multiple client devices. In an illustrative embodiment, the DL OFDMA communication frame 1004 spans a cumulative bandwidth of 160 MHz. In an embodiment, some client devices (e.g., STA0 and STA2) are capable of transmitting at a cumulative bandwidth of 160 MHz, but other client devices (e.g., STA1 and STA3) have a maximum transmission bandwidth capability of only 80 MHz.

In an embodiment, client devices capable of transmitting at the same bandwidth as the DL OFDMA communication frame 1004 duplicate their BAs to span the entire bandwidth of the DL OFDMA communication frame 1004, whereas client devices not capable of transmitting at the same bandwidth as the DL OFDMA communication frame 1004 duplicate their BAs to span the only a portion of the bandwidth of the DL OFDMA communication frame 1004. For instance, in the example illustrated in FIG. 10, STA0 transmits BAs 1008 spanning the entire bandwidth of the DL OFDMA communication frame 1004, and STA2 transmits BAs 1024 spanning the entire bandwidth of the DL OFDMA communication frame 1004, according to an embodiment. On the other hand, STA1 transmits BAs 1016 spanning only a portion of the bandwidth of the DL OFDMA communication frame 1004, and STA3 transmits BAs 1032 spanning only the portion of the bandwidth of the DL OFDMA communication frame 1004, according to an embodiment. In an embodiment, the bandwidth portion of the BA transmission by the client device is chosen to span at least the bandwidth portion of the data transmission 1006 corresponding to the client device. For instance, in the example of FIG. 10, the bandwidth spanned by BAs 1016 completely overlaps the bandwidth of the data portion 1006-1 in the MU DL transmission 1004. Similarly, the bandwidth spanned by BAs 1032 completely overlaps the bandwidth of the data portion 1006-3 in the MU DL transmission 1004.

In an embodiment, to mitigate hidden node problems, the AP transmits BARs across the entire bandwidth spanned by the MU DL transmission 1004 regardless of the bandwidth capability of the client devices. For instance, in the example of FIG. 10, the AP transmits BARs 1012 spanning the entire bandwidth of the MU DL transmission 1004 even though STA1 is not capable of transmitting BAs 1016 across the entire bandwidth of the MU DL transmission 1004. Similarly, the AP transmits BARs 1028 spanning the entire bandwidth of the MU DL transmission 1004 even though STA3 is not capable of transmitting BAs 1032 across the entire bandwidth of the MU DL transmission 1004.

As discussed above, in some embodiments, not all client devices are capable of transmitting an acknowledgment via OFDMA. Thus, in some embodiments, a combination of OFDMA and poll-based acknowledgments are utilized to acknowledge a single MU DL transmission.

Figure 11:
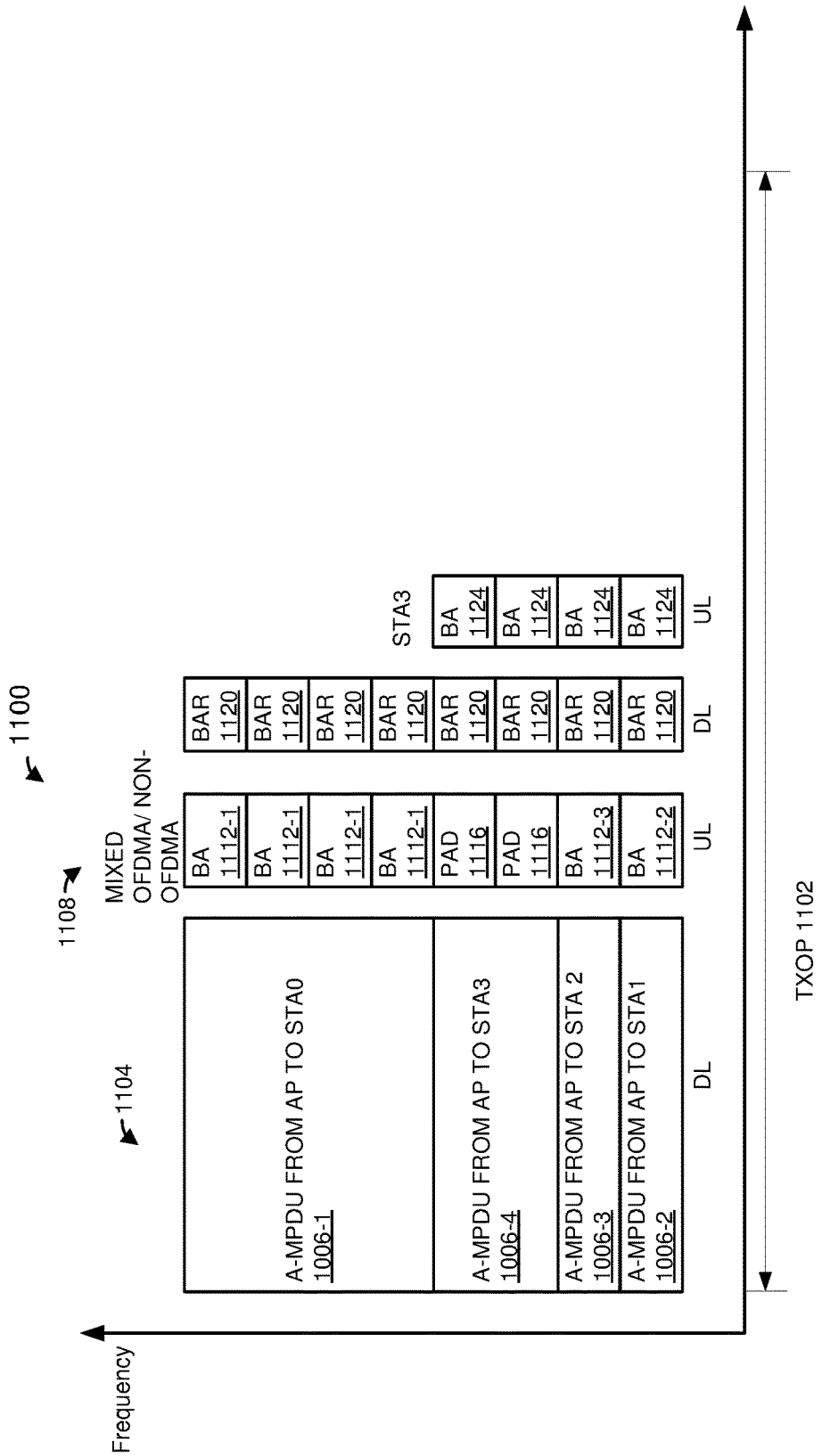
FIG. 11 is a diagram of still another example transmission sequence in a WLAN, according to an embodiment.

FIG. 11 is a diagram of an example transmission sequence 1100 in a WLAN, such as the WLAN 10 of FIG. 1, according to an embodiment, in which an AP, such as the AP 14, transmits a DL OFDMA communication frame to multiple client stations, such as multiple ones of the client stations 25, during a TXOP 1102.

The AP 14 generates and transmits a DL OFDMA communication frame 1104, in an embodiment. In an embodiment, the communication frame 1104 comprises respective data 1106 for multiple client devices. In an illustrative embodiment, the data 1106 comprise respective A-MPDUs 1106. In an embodiment, the communication frame 1104 spans a bandwidth of a primary channel (e.g., a primary 20 MHz channel) of the WLAN 10 and multiple other secondary channels (e.g., 20 MHz channels) of the WLAN 10, i.e., the communication frame 1104 spans a bandwidth of a composite channel comprising the primary channel and one or more secondary channels.

In an embodiment, some of the client devices to which data transmissions 1106 correspond generates and transmit respective ACK or BA portion as part of an UL OFDMA transmission 1108 responsive to the communication frame 1104. For example, in an embodiment, some client devices to which data transmissions 1106 corresponds generate and transmit respective ACK or BA portions 1112 a defined time period (e.g., a SIFS or another suitable time period) after the end of the communication frame 1104. In an embodiment, some client devices generate and transmit respective ACK or BA portions 1112 in respective frequency blocks within a communication channel spanned by the MU DL transmission. On the other hand, some client devices to which data transmissions 1106 corresponds generate and transmit respective non-OFDMA transmissions a defined time period (e.g., a SIFS or another suitable time period) after the end of the communication frame 1104. In an embodiment, some client devices generate and transmit respective non-OFDMA transmissions 1116 in respective frequency blocks within a communication channel spanned by the MU DL transmission.

The non-OFDMA transmissions 1116 may comprise one of or any suitable combination of two or more of padding, padding with an A-MPDU delimiter, a QoS Null frame, a clear-to-send-to-self (CTS-to-self) frame, etc. In an embodiment, a suitable non-OFDMA transmission 1116 is generated in a 20 MHz channel and then duplicated to one or more other 20 MHz channels, if needed.

In the example of FIG. 11, STA0-STA2 participate in the OFDMA transmission 1108, while STA3 transmits a suitable non-OFDMA transmission 1116. STA0 generates and transmits portions 1112-1. STA1 generates and transmits portion 1112-2. STA2 generates and transmits portion 1112-3. STA3 generates a non-OFDMA frame 1116, duplicates the frame 1116, and transmits the frame 1116 and the duplicate of the frame 1116.

After receiving the UL transmission 1116, the AP determines that STA3 is not capable of transmitting as part of the OFDMA ACK transmission 1108. In response, the AP generates and transmits a BAR frame to prompt STA3 to transmit a BA to acknowledge the DL transmission 1104. In an embodiment, the AP generates a BAR frame that spans a 20 MHz channel, duplicates the BAR frame in one or more other 20 MHz channels, and simultaneously transmits the BAR frame and the duplicates of the BAR frame. For instance, in the example of FIG. 11, the AP transmits multiple instances of a BAR frame 1120 in multiple 20 MHz channels corresponding to the bandwidth of the communication frame 1104. In response to the BAR frame 1120, STA3 generates an ACK frame or BA frame that spans a 20 MHz channel, duplicates the ACK/BA frame in one or more other 20 MHz channels, and simultaneously transmits the ACK/BA and the duplicates of the ACK/BA. For instance, in the example of FIG. 11, STA3 transmits multiple instances of a BA frame 1124 in multiple 20 MHz channels that completely overlap with the bandwidth spanned by the DL transmission 1006-4.

As discussed above, in some embodiments, ACK/BA transmissions in an UL OFDMA are permitted to have different time durations. In other embodiments, however, ACK/BA transmissions in an UL OFDMA should have the same time duration or substantially the same duration (e.g., differ by no more than 10%, 5%, 2%, 1%, etc., according to various embodiments).

In some embodiments in which ACK/BA transmissions in an UL OFDMA should have the same time duration or substantially the same duration, the AP provides information indicating a duration (in time) of the ACK/BA transmissions to the client devices so that the client devices can generate ACK/BA transmissions of the indicated duration.

In an embodiment, the AP determines the ACK/BA duration for each client device using any suitable combination of two or more of the following: a known length of the MPDU corresponding to the ACK/BA to be transmitted, an MCS for the ACK/BA, a candidate rate for the ACK/BA, a candidate bandwidth for the ACK/BA, etc. In an embodiment, the AP selects the MCS from a set of candidate MCSs. In an embodiment, the AP selects the maximum MCS from the set of candidate MCSs. In an embodiment, the set of candidate MCSs corresponds to MCSs that are common to receiving MCSs of the AP and transmitting MCSs of the client device. In an embodiment, the set of candidate MCSs includes a basic MCS set of a basic service set (BSSBasicMCSSet) of a BSS served by the AP 14. In an embodiment, the set of candidate MCSs includes mandatory MCSs supported by the PHY processing unit 20 of the AP 14, in an embodiment. In an embodiment, when the BSSBasicMCSSet is empty or idle, the set of candidate MCSs is the set of mandatory MCSs supported by the PHY processing unit 20 of the AP 14, in an embodiment.

After the AP determines the ACK/BA duration for each client device, the AP selects the maximum ACK/BA duration from the determined ACK/BA durations for the client devices as the duration of the OFDMA ACK/BA to be used in the uplink. Then, the AP transmits an indication of the selected ACK/BA duration to the client devices. For example, the indication of the selected ACK/BA duration is included in a SYNC in the MU DL PPDU as discussed above, in some embodiments. As another example, the indication of the selected ACK/BA duration is included in PHY preamble of the MU DL PPDU, in some embodiments.

In an embodiment, each client device uses the indication of the selected ACK/BA duration to select an MCS and adds padding (if necessary) so that a duration of the ACK/BA generated by the client device is substantially the same as the selected ACK/BA duration.

In one embodiment, all client device transmissions constituting an OFDMA acknowledgment are transmitted via a single spatial stream. In another embodiment, each client device uses the smaller of i) the number of transmit spatial streams capacity of the client device, and ii) the spatial stream(s) utilized to transmit to the client device in the MU DL transmission that is being acknowledged.

In one embodiment, each client device transmits for the OFDMA acknowledgment on the same OFDM subchannels utilized for the client device in the MU DL PPDU. In another embodiment, the AP determines the OFDM subchannels to be used by each client device for the OFDMA acknowledgment, and the AP includes indications of determined OFDM subchannels in a SYNC frame, in a PHY preamble of the MU DL PPDU, in another suitable location within the MU DL PPDU, etc.

Figure 12:
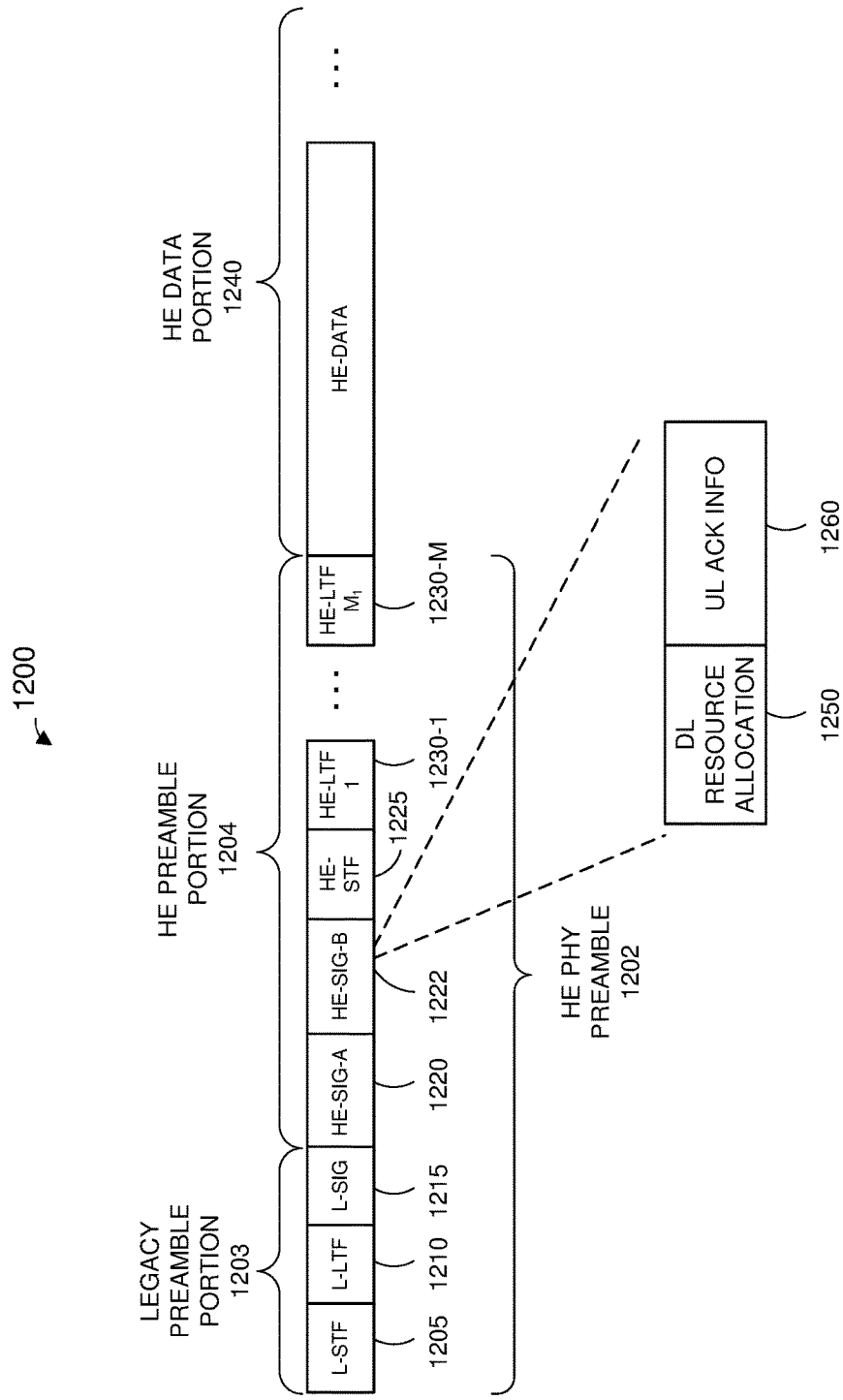
FIG. 12 is a diagram of an example multi-user downlink physical layer protocol data unit, according to an embodiment.

As discussed above, in some embodiments, the AP may include, in a PHY header of a MU DL PPDU, information that provides information to client devices to indicate to the client devices how to generate an OFDMA/MU-MIMO acknowledgment for the MU DL PPDU. FIG. 12 is a diagram of an example MU DL PPDU 1200 (or a portion thereof) that may be utilized by the AP, according to some embodiments. In an embodiment, the AP 14 is configured to generate and transmit to multiple client stations using OFDMA and/or MU-MIMO, according to an embodiment. The data unit 1200 conforms to the HE communication protocol and occupies a suitable bandwidth such as 20 MHz, 40 MHz, 80 MHz, 160 MHz, 320 MHz, 640 MHz, for example, or other suitable bandwidths, in other embodiments.

The data unit 1200 includes a PHY preamble 1202 having a legacy preamble portion 1203 and an HE preamble portion 1204. The HE PHY preamble 1202 includes a legacy short training field (L-STF) 1205, a legacy long training field (L-LTF) 1210, an L-SIG 1215, a first HE signal field (HE-SIG-A) 1220, a second HE signal field (HE-SIG-B)

1222, an HE short training field (HE-STF) 1225, and M HE long training fields (HE-LTFs) 1230, where M is an integer. In some embodiments and/or scenarios, the PHY preamble 1202 omits one or more of the fields 1205-1235. In some embodiments, the preamble 1202 includes additional fields not illustrated in FIG. 12. For example, in some embodiments, the PHY preamble 1202 includes a third HE signal field (HE-SIG-C) after the HE-LTFs 1230 or at another suitable location in the preamble 1202.

The data unit 1200 also includes a data portion 1240.

Each of the L-STF 1205, the L-LTF 1210, the L-SIG 1215, the HE-SIG-A 1220, the HE-SIG-B 1222, the HE-STF 1225, and the M HE-LTFs 1230 comprises an integer number of one or more OFDM symbols. As merely an example, in an embodiment, the HE-SIG-A 1220 comprises only two OFDM symbols, and the HE-SIG-B 1222 comprises only one OFDM symbol. As merely another example, in another embodiment, the HE-SIG-A 1220 comprises only one OFDM symbol, and the HE-SIG-B 1222 comprises only two OFDM symbols. In other embodiments, the HE-SIG-A 1220 and the HE-SIG-B 1222 comprises other suitable numbers of OFDM symbols.

In some embodiments, the data unit 1200 occupies a cumulative bandwidth greater than 20 MHz, and each of the L-STF 1205, the L-LTF 1210, the L-SIG 1215, the HE-SIG-A 1220, and the HE-SIG-B 1222 is repeated over a corresponding number of 20 MHz sub-bands of the whole bandwidth of the data unit, in an embodiment. For example, in an embodiment, the data unit occupies an 80 MHz bandwidth and, accordingly, includes four of each of the L-STF 1205, the L-LTF 1210, the L-SIG 1215, the HE-SIG-A 1220, and the HE-SIG-B 1235. In some embodiments, the modulation of different 20 MHz sub-bands signals is rotated by different angles. For example, in one embodiment, all OFDM tones within a first subband are rotated 0-degrees, all OFDM tones within a second subband is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced PAPR of OFDM symbols in the data unit 300, in at least some embodiments and/or scenarios. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, and the HE data portion occupy the corresponding whole bandwidth of the data unit.

With continued reference to FIG. 12, each of the HE-SIG-A 1220 and the HE-SIG-B 1222 generally carries information about the format of the data unit 1200, such as information needed to properly decode at least a portion of the data unit 1200, in an embodiment. In some embodiments, HE-SIG-A 1220 additionally includes information for client stations 25 that are not intended receivers of the data unit 1200, such as information needed for medium protection from the client stations 25 that are not intended receivers of the data unit 1200. On the other hand, HE-SIG-B 1222 carries user-specific information individually needed by each client station 25 that is an intended recipient of the data unit 1200, in an embodiment. In an embodiment, HE-SIG-A 1220 includes information needed to properly decode HE-SIG-B 1222, and HE-SIG-B 1222 includes information needed to properly decode data streams in the data portion 1240 of the data unit 1200, in an embodiment. In some embodiments and/or scenarios, however, HE-SIG-A field 1220 includes at least some of the information needed to decode the data portion 1240.

In some embodiments, HE-SIG-B 1222 includes DL resource allocation information 1250 and UL ACK information 1260. In some embodiments, the UL ACK information 1260 is included in a single field or is spread amongst several fields within the HE-SIG-B 1222. In some embodiments and/or scenarios, the UL ACK information 1260 includes an indication of a duration (in time) of an OFDMA/MU-MIMO transmission in the UL that is to be used by client devices to acknowledge the MU DL PPDU 1200. In some embodiments and/or scenarios, the UL ACK information 1260 also includes indication(s) of subchannels to be used by multiple client devices to generate the OFDMA/MU-MIMO transmission in the UL that is to be used by client devices to acknowledge the MU DL PPDU 1200. In some embodiments and/or scenarios, the UL ACK information 1260 also includes indication(s) of MCSs to be used by multiple client devices to generate the OFDMA/MU-MIMO transmission in the UL that is to be used by client devices to acknowledge the MU DL PPDU 1200.

Figure 13:
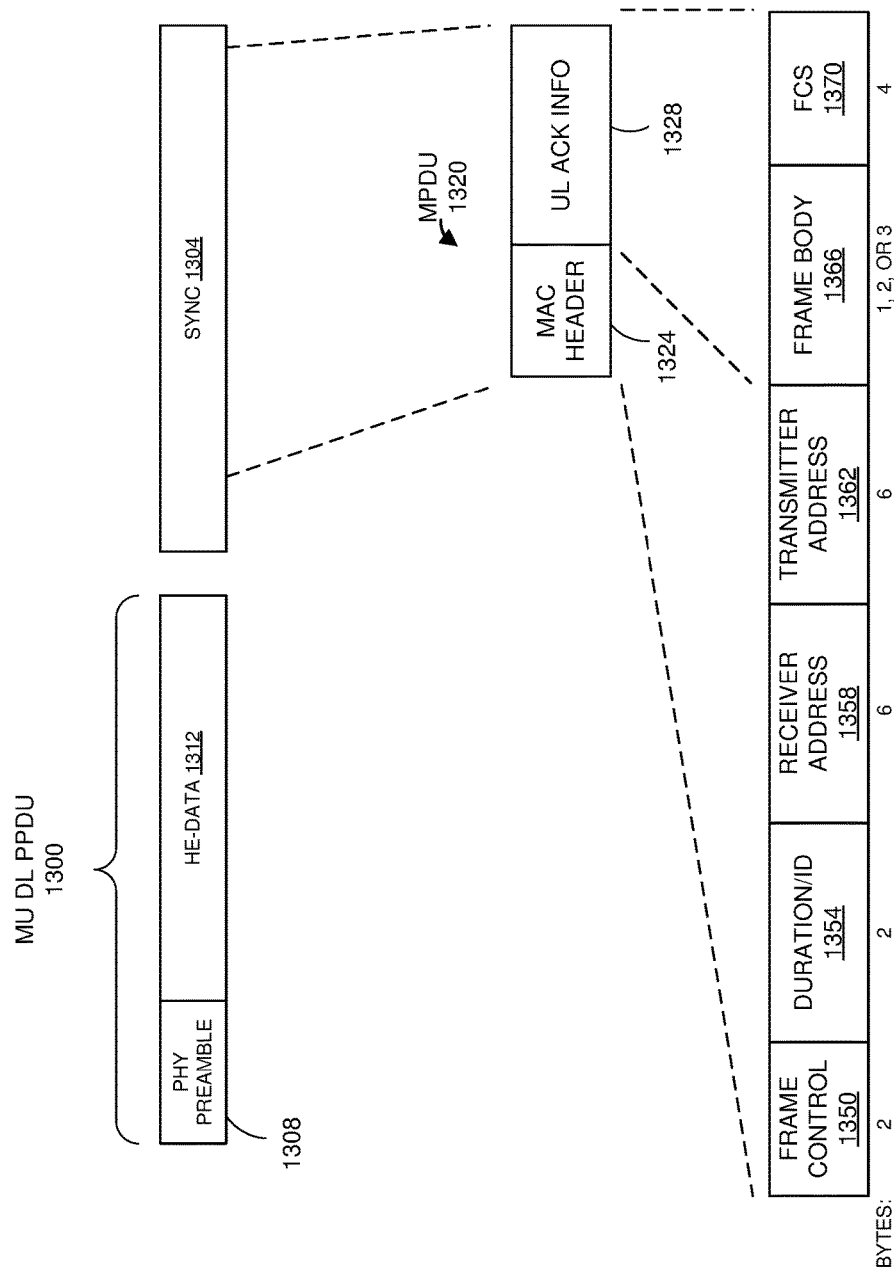
FIG. 13 is a diagram of an example transmission sequence in a WLAN, according to an embodiment.

As discussed above, in some embodiments, the AP may include, in a control frame included in or associated with a MU DL PPDU, information that provides information to client devices to indicate to the client devices how to generate an OFDMA/MU-MIMO acknowledgment for the MU DL PPDU. FIG. 13 is a diagram of an example MU DL PPDU 1300 and an associated sync frame 1304 that may be utilized by the AP, according to some embodiments. In an embodiment, the AP 14 is configured to generate and transmit to multiple client stations using OFDMA and/or MU-MIMO, according to an embodiment. The data unit 1300 conforms to the HE communication protocol and occupies a suitable bandwidth such as 20 MHz, 40 MHz, 80 MHz, 160 MHz, 320 MHz, 640 MHz, for example, or other suitable bandwidths, in other embodiments.

The MU DL PPDU 1300 includes a PHY preamble 1308 and a PHY data portion 1312. The SYNC frame 1304 includes an MPDU 1320. The MPDU 1320 includes a MAC header 1324 and UL ACK information 1328.

In some embodiments, the UL ACK information 1328 is included in a single field or is spread amongst several fields within the MPDU 1320. In some embodiments and/or scenarios, the UL ACK information 1328 includes an indication of a duration (in time) of an OFDMA/MU-MIMO transmission in the UL that is to be used by client devices to acknowledge the MU DL PPDU 1300. In some embodiments and/or scenarios, the UL ACK information 1328 also includes indication(s) of subchannels to be used by multiple client devices to generate the OFDMA/MU-MIMO transmission in the UL that is to be used by client devices to acknowledge the MU DL PPDU 1300. In some embodiments and/or scenarios, the UL ACK information 1328 also includes indication(s) of MCSs to be used by multiple client devices to generate the OFDMA/MU-MIMO transmission in the UL that is to be used by client devices to acknowledge the MU DL PPDU 1300.

In an embodiment, the UL ACK information 1328 is included in a MAC data portion of the MPDU 1320. In another embodiment, the UL ACK information 1328 is included in the MAC header 1324.

In an embodiment, the SYNC frame 1304 is included in a PPDU separate from the MU DL PPDU 1300. In another embodiment, the SYNC frame 1304 is included in the MU DL PPDU 1300. For example, in an embodiment, the SYNC frame 1304 is included in an A-MPDU within the PHY data 1312. In various embodiments, the A-MPDU has a format such as discussed above with respect to FIGS. 7, 8A, and 8B.

In some embodiments, the MAC header 1324 includes a frame control field 1350, a duration/ID field 1354, a receiver address field 1358, and a transmitter address field. In various embodiments, any one of, or any combination of two or more of, the following fields are omitted from the MAC header 1324: the duration/ID field, the receiver address field 1358, and/or the transmitter address field 1362.

The MPDU 1320 also includes a frame body 1366 that includes the UL ACK information field 1328, in an embodiment. The MPDU 1320 also includes a frame check sequence field 1320, in an embodiment.

In FIG. 13, example lengths of the fields of the MPDU 1320 are illustrated. In other embodiments, other suitable lengths are utilized.

Figure 14:
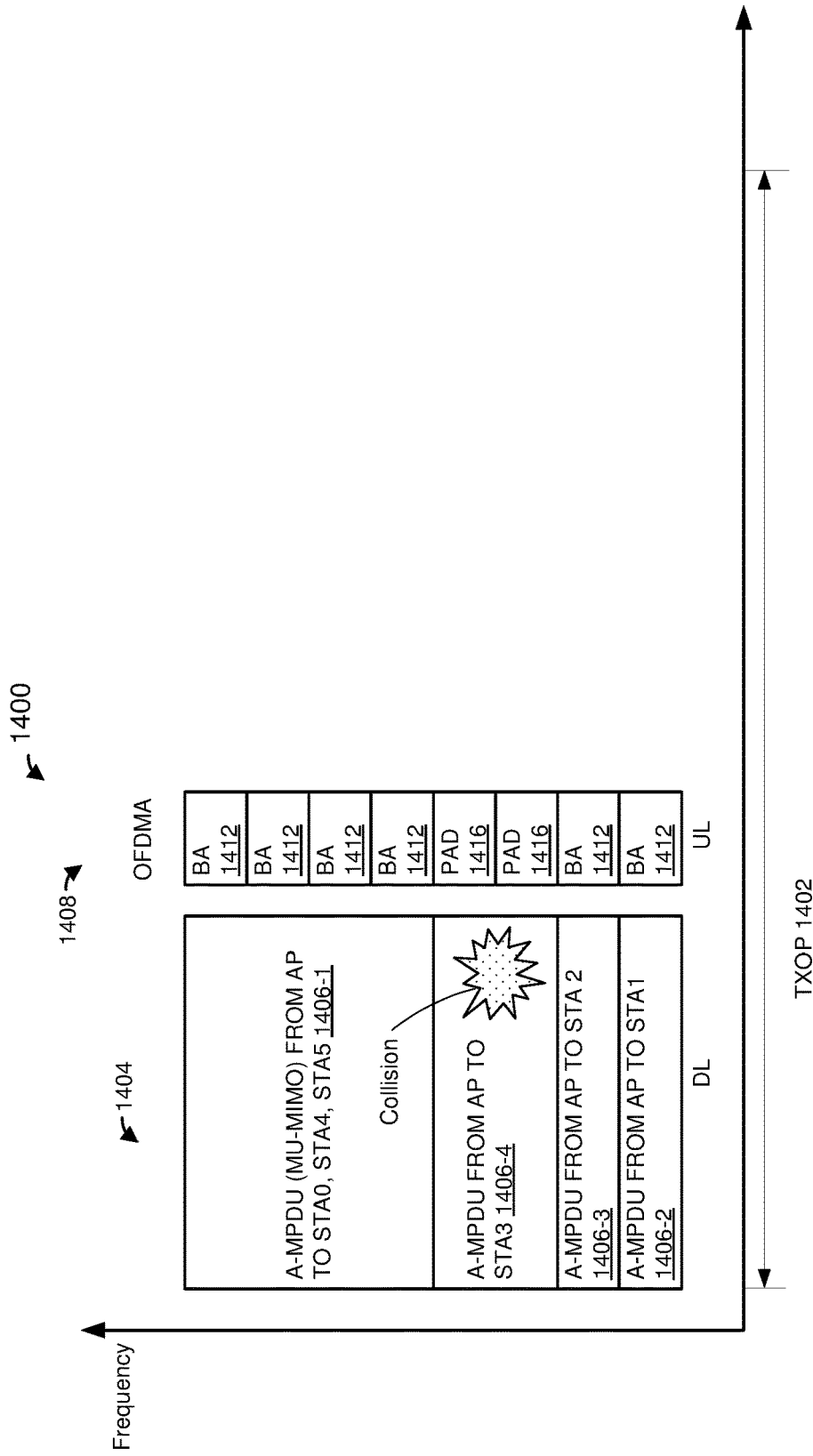
FIG. 14 is a diagram of another example transmission sequence in a WLAN, according to an embodiment.

FIG. 14 is a diagram of an example transmission sequence 1400 in a WLAN, such as the WLAN 10 of FIG. 1, according to an embodiment, in which an AP, such as the AP 14, transmits a DL OFDMA communication frame to multiple client stations, such as multiple ones of the client stations 25, during a TXOP 1402.

The AP 14 generates and transmits a DL OFDMA/MU-MIMO communication frame 1404, in an embodiment. In an embodiment, the communication frame 1404 comprises respective data 1406 for multiple client devices. In an illustrative embodiment, the data 1106 comprise respective A-MPDUs 1406. In an embodiment, the communication frame 1404 spans a bandwidth of a primary channel (e.g., a primary 20 MHz channel) of the WLAN 10 and multiple other secondary channels (e.g., 20 MHz channels) of the WLAN 10, i.e., the communication frame 1404 spans a bandwidth of a composite channel comprising the primary channel and one or more secondary channels.

In an embodiment, some of the client devices to which data transmissions 1406 correspond generates and transmit respective ACK or BA portion as part of an UL OFDMA transmission 1408 responsive to the communication frame 1404. For example, in an embodiment, some client devices to which data transmissions 1406 corresponds generate and transmit respective ACK or BA portions 1412 a defined time period (e.g., a SIFS or another suitable time period) after the end of the communication frame 1404. In an embodiment, some client devices generate and transmit respective ACK or BA portions 1412 in respective frequency blocks within a communication channel spanned by the MU DL transmission.

On the other hand, the transmission corresponding to A-MPDU 1406-4 to STA3 experiences and therefore STA3 does not receive the A-MPDU 1406-4 correctly. In some scenarios, STA3 may receive the PHY header corresponding to the MU DL PPDU 1404 correctly, but does not a data portion of the MU DL PPDU 1404 correctly due to a collision that occurs after receive of the PHY header, for example. In an embodiment, when a STA3 receives at least the HE-SIGB of the MU DL PPDU 1404 correctly, the STA3 transmits an indication 1416 during the OFDMA ACK transmission 1408, where the indication 1416 indicates to the AP that the STA3 received at least the HE-SIGB of the MU DL PPDU 1404 correctly. This may indicate to the AP, for example, that the MCS utilized by the AP to transmit to the STA3 is appropriate, in some embodiments.

The indication 1416 may comprise one of or any suitable combination of two or more of padding, padding with an A-MPDU delimiter, a QoS Null frame, etc. In an embodiment, a suitable indicator 1416 is generated in a 20 MHz channel and then duplicated to one or more other 20 MHz channels, if needed.

In the example of FIG. 14, STA0-STA2, STA4, and STA5 participate in the OFDMA transmission 1408, while STA3 transmits a suitable indication 1416.

After receiving the UL transmission 1416, the AP determines that STA3 received at least the HE-SIGB of the MU DL 1404 correctly, but did not receive the A-MPDU 1406-4 correctly.

In some embodiments, each client device determines which OFDM subchannels on which to transmit as part of the OFDMA acknowledgment based on the subchannels corresponding to the client used in the MU DL transmission.

In an embodiment, if the number of client devices in the MU DL transmission (Num_STA) is less than or equal to the number of 20 MHz channels used in the MU DL transmission (Num_20 MHz), the following procedure is utilized by each client device to determine on which 20 MHz channel to transmit as part of the OFDMA acknowledgment. An integer part (n) of dividing Num_20 MHz by Num_STA is determined. A remainder (r) of dividing Num_20 MHz by Num_STA is determined. For client devices for which a position within the MU DL transmission (x) is smaller than r, the client device utilizes, in the OFDMA acknowledgment, 20 MHz channels at positions x*(n+1) to (x+1)*(n+1)−1. For client devices for which a position within the MU DL transmission (x) is greater than or equal to r, the client device utilizes, in the OFDMA acknowledgment, 20 MHz channels at positions r*(n+1)+(x−r)*n to r*(n+1)+(x+1−r)*n−1.

In another embodiment, if the Num_STA is less than or equal to Num_20 MHz, each client device utilizes the same bandwidth as used for transmitting to the client in the MU DL transmission.

In an embodiment, if Num_20 MHz=1 and Num_STA>1, then the 20 MHz channel is allocated into nine groups of 26 OFDM subchannels, and the nine groups of subchannels are assigned to the client devices utilizing a suitable technique. For example, in an embodiment, the nine groups of subchannels are assigned to the client devices in a manner similar to the technique for allocating 20 MHz channels when Num_STA is less than or equal to Num_20 MHz as discussed above.

In an embodiment, if Num_STA is greater than Num_20 MHz, the following procedure is utilized by each client device to determine on which OFDM channels to transmit as part of the OFDMA acknowledgment. An integer part (n) of dividing Num_STA by Num_20 MHz is determined. A remainder (r) of dividing Num_STA by Num_20 MHz is determined.

Client devices are assigned to 20 MHz channels. For example, for a 20 MHz channel at position x, if x<r, a client device is assigned to the channel at position x if the position of the client device within the MU DL transmission (p) satisfies: p>=x*(n+1) and p<(x+1)*(n+1)−1. If x>=r, a client device is assigned to the channel at position x if the position of the client device within the MU DL transmission (p) satisfies: p>=r*(n+1)+(x−r)*n and p<r*(n+1)+(x+1−r)*n−1.

In an embodiment, after client devices are assigned to 20 MHz channels, the client devices assigned to each 20 MHz channel are assigned to groups of 26 OFDM subchannels within the 20 MHz channel using a technique such as discussed above when Num_20 MHz=1 and Num_STA>1.

As discussed above, in some embodiments, the AP may include, in a control frame included in or associated with a MU DL PPDU, information that indicates to the client devices how to generate an OFDMA/MU-MIMO acknowledgment for the MU DL PPDU. For example, as discussed with reference to FIG. 12, such information may be included in a PHY header (e.g., in the HE-SIGB field or another suitable field) of a downlink data unit, according to some embodiments. As another example, as discussed with reference to FIG. 13, such information may be included in a SYNC frame, according to some embodiments. In some embodiments, the SYNC frame may be included in an A-MPDU along with data and/or other control frames. In some embodiments, the SYNC frame may be in a separate broadcast SYNC, or trigger frame.

Figure 15:
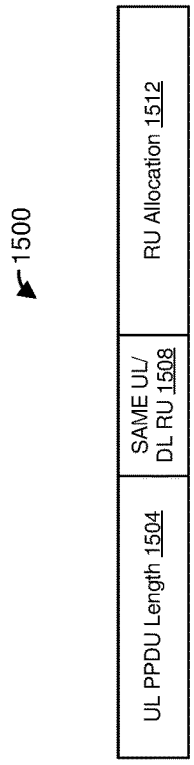
FIG. 15 is a diagram of an example information element that may be included in a downlink transmission, where the information element includes information that indicates to the client devices how to generate an OFDMA/MU-MIMO acknowledgment for an MU DL PPDU, according to an embodiment.

FIG. 15 is a diagram of an example information element 1500 that may be included in a downlink transmission, where the information element 1500 includes information that indicates to the client devices how to generate an OFDMA/MU-MIMO acknowledgment for the MU DL PPDU, according to an embodiment. In some embodiments, the information element 1500 is included in a PHY header (e.g., in the HE-SIGB field or another suitable field) of a downlink data unit. In some embodiments, the information element 1500 is included in a SYNC frame, which in turn is included in an A-MPDU along with data and/or other control frames. In some embodiments, the information element 1500 is included in a separate broadcast SYNC or trigger frame.

The information element 1500 includes a field 1504 that indicates a length of the UL PPDU acknowledgment data unit. In an embodiment, the field 1504 indicates a number of OFDM symbols. The information element 1500 also includes a field 1508 that indicates whether client devices should use the same resource allocation (e.g., OFDM subcarriers, subchannels, etc.) for the acknowledgment as was assigned for the DL transmission that is to be acknowledged, in an embodiment. The information element 1500 also includes a field 1512 that indicates the resource allocation (e.g., OFDM subcarriers, subchannels, etc.) for a client device to use for the acknowledgment, in an embodiment. In an embodiment, the resource allocation field 1512 indicates i) a start location of a resource unit (RU) (e.g., a starting OFDM subcarrier index, an edge of a subchannel, etc.) and ii) a width of the RU (e.g., a number of OFDM subcarriers, a bandwidth, etc.).

In an embodiment, the field 1504 is five bits in length. In other embodiments, the field 1504 is a different suitable number of bits (e.g., 2, 3, 4, 6, 7, 8, 9, 10, 11, 12. etc.). In an embodiment, the field 1508 is one bit. In other embodiments, the field 1508 is a different suitable number of bits (e.g., 2, 3, 4, 5, 6, etc.). In an embodiment, the field 1512 is ten bits in length. In other embodiments, the field 1504 is a different suitable number of bits (e.g., 11, 12, 13, 14, 15, 16, 17, 18, 19, 20, etc.).

Figure 16:
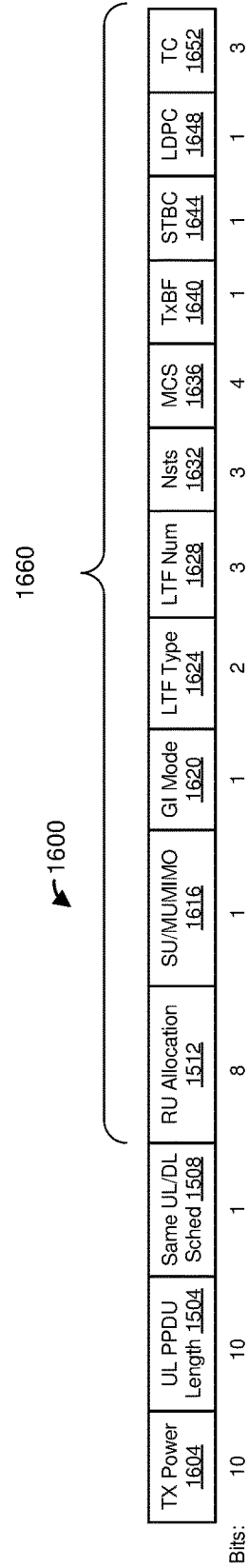
FIG. 16 is a diagram of an example resource allocation information element that includes information to indicate to the client devices how to generate an OFDMA/MU-MIMO acknowledgment for an MU DL PPDU, according to an embodiment.

In some embodiments, the fields illustrated in FIG. 15 are included in an information element having additional information. For example, FIG. 16 is a diagram of an example resource allocation information element 1600, according to an embodiment. The information element 1600 includes a transmit power field 1604 that includes an indication of a transmit power to be used by a client device during an UL OFDMA transmission. The information element 1600 also includes the fields 1504, 1508, and 1512 discussed above with reference to FIG. 15. The information element 1600 further includes: a SU/MU-MIMO field 1616 that indicates whether the transmission is utilize MU MIMO; a guard interval (GI) mode field 1620 that indicates a GI mode to be utilized; an LTF type field 1624 that indicates a type of LTF to be used; an LTF number field 1628 that indicates a number of LTFs to be included; a number of spatial streams (Nsts) field 1632 that indicates a number of spatial streams to be used; an MCS field 1636 specifying an MCS to be used; a transmit beamforming (TxBF) field 1640 that indicates whether TxBF is to be used; a space-time stream block coding (STBC) field 1644 that indicates whether STBC is to be utilized; a low density parity check (LDPC) field 1648 that indicates whether LDPC is to be utilized; and a traffic class (TC) field 1652 that indicates a TC to be included in the transmission.

In some embodiments, some of the parameters indicated in the information element 1600 can be implicitly determined by a client device based on the downlink transmission that is to be acknowledged. For example, in an embodiment, each client device receiving a MU DL transmission are aware of the RUs allocated to all of the client devices of the MU DL transmission and the MCSs used for all of the client devices in the MU DL transmission. In such an embodiment, each client device can determine the longest acknowledgment transmission amongst all of the client devices that are to acknowledge the MU DL transmission because the MCS (s) for the UL acknowledgements are restricted by the MCS(s) used in the MU DL transmission.

In an embodiment, a subset 1660 of fields is omitted from the information element when the field 1508 is set to indicate that, for each client device, the same RU used in the MU DL is to be used when acknowledging the MU DL. In an embodiment, the field 1508 also indicates that, for each client device, other parameters used in the MU DL are to be the same when acknowledging the MU DL (e.g., MCS, number of spatial streams, GI mode, other parameters specified in the subset 1660, etc.).

Although FIG. 16 illustrates example numbers of bits for each field in the information element 1600, other suitable numbers of bits may be utilized. For example, in an embodiment, the TX power field 1604 is a suitable number of bits other than ten. As another example, in an embodiment, the field 1624 is a suitable number of bits other than two. As another example, in an embodiment, the field 1632 is a suitable number of bits other than three.

In an embodiment, the MCS field 1636 is omitted. For example, in some embodiments, a client device determines an MCS to use based on the UL PPDU length (field 1504) and the bandwidth.

Figure 17A:
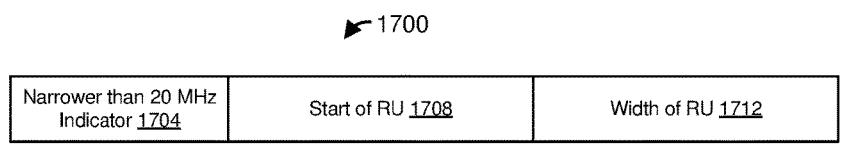
FIG. 17A is a diagram of an example field that is used to indicate a sub-band within an OFDMA transmission, where the sub-band corresponds to a transmission to/from a client device, according to an embodiment.

FIG. 17A is a diagram of an example field 1700 that is used to indicate a sub-band within an OFDMA transmission, where the sub-band corresponds to a transmission to/from a client device, according to an embodiment. In some embodiments, UL acknowledgment information discussed above includes the field 1700. For instance, in some embodiments, the field 1512 discussed above includes the field 1700. In some embodiments, the field 1250 and/or the field 1260 (FIG. 12) includes the field 1700. In some embodiments, the field 1328 (FIG. 13) includes the field 1700.

The field 1700 includes a field 1704 to indicate whether the sub-band is less (sometimes referred to as an RU) than 20 MHz. In an embodiment, the field 1704 is one bit. In other embodiments, the field is a suitable size larger than 1 bit (e.g., 2, 3, 4, 5, etc., bits).

The field 1700 includes a field 1708 to indicate a start location of an RU, and a field 1712 to indicate a width of the RU. In an embodiment, fields 1708 and 1712 are interpreted differently depending on whether field 1704 indicates that the RU is less than 20 MHz or greater than 20 MHz. In one embodiment, the field 1708 is seven bits and the field 1712 is two bits. In other embodiments, the field 1708 is another suitable size (e.g., 5, 6, 8, 9, 10, etc., bits) and/or the field 1712 is another suitable size (e.g., 3, 4, 5, etc., bits). Table 1 is an example of encodings of the fields 1708 and 1712 according to an illustrative embodiment. In other embodiments, other suitable encodings are utilized.

TABLE 1

| | 0 | 1 |
|---|---|---|
| Field 1704 | (RU is greater than or equal to 20 MHz) | (RU is less than 20 MHz) |
| Start of RU field 1708 | 3 most significant bits indicate 20 MHz channel in which RU starts. 4 least significant bits are set to zero, | 3 most significant bits indicate 20 MHz channel in which RU is included. 4 least significant bits indicate group of 26-tones in which RU starts. |
| Width of RU field 1712 | 00 = 20 MHz 01 = 40 MHz 10 = 60 MHz 11 = 80 MHz | 00 = 26 OFDM tones 01 = 52 OFDM tones 10 = 78 OFDM tones 11 = 104 OFDM tones |

Figure 17B:
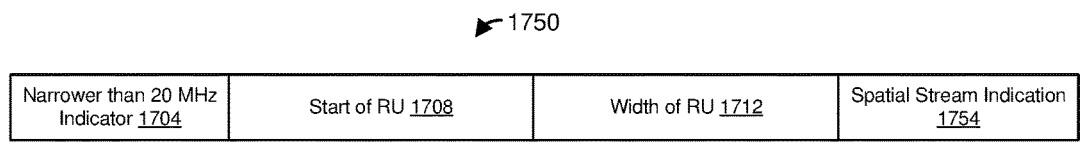
FIG. 17B is a diagram of is a diagram of an example field that is used to indicate a sub-band within an OFDMA transmission and also one or more spatial streams, according to an embodiment.

FIG. 17B is a diagram of an example field 1750 that is used to indicate a sub-band within an OFDMA transmission and also one or more spatial streams, according to an embodiment. The field 1750 is similar to the field 1700 of FIG. 17A, and like-numbered elements are not discussed for purposes of brevity.

In some embodiments, UL acknowledgment information discussed above includes the field 1750. For instance, in some embodiments, the field 1512 discussed above includes the field 1750. In some embodiments, the field 1250 and/or the field 1260 (FIG. 12) includes the field 1750. In some embodiments, the field 1328 (FIG. 13) includes the field 1750.

The field 1750 includes a spatial stream indication field 1754. For example, in some embodiments in which a DL OFDMA frame includes a MU-MIMO transmission, recipients of the MU-MIMO transmission acknowledge the MU-MIMO transmission with an UL MU-MIMO transmission in which different client devices transmit via different spatial streams. In some embodiments, the AP may assign different client devices to different spatial streams and inform the client devices of the assignments using the field 1754.

Figure 18A:
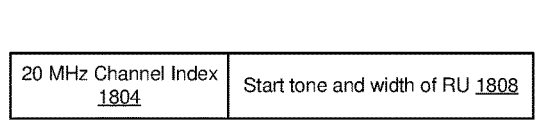
FIG. 18A is a diagram of another example field that is used to indicate a sub-band within an OFDMA transmission, where the sub-band corresponds to a transmission to/from a client device, according to an embodiment.

FIG. 18A is a diagram of another example field 1800 that is used to indicate a sub-band within an OFDMA transmission, where the sub-band corresponds to a transmission to/from a client device, according to an embodiment. In some embodiments, UL acknowledgment information discussed above includes the field 1800. For instance, in some embodiments, the field 1512 discussed above includes the field 1800. In some embodiments, the field 1250 and/or the field 1260 (FIG. 12) includes the field 1800. In some embodiments, the field 1328 (FIG. 13) includes the field 1800.

The field 1800 includes a field 1804 to indicate a 20 MHz channel in which an RU is located (if the RU is less than 20 MHz) or a 20 MHz channel that is the start of the RU (if the RU is greater than or equal to 20 MHz). The field 1800 also includes a field 1808 to indicate a width of the RU and/or a starting group of 26 OFDM tones within a 20 MHz channel. In one embodiment, the field 1808 is set to an index value that indicates an RU from a set of allowable RUs for a given starting 20 MHz channel. For example, FIG. 19 is a diagram of an example set of allowable RUs for a given starting 20 MHz channel, according to an embodiment. Thus, in an embodiment, the field 1808 is an index value indicating one of a plurality RUs, including RUs of different bandwidths and RUs having different positions within a 20 MHz communication channel (e.g., the allowable RUs illustrated in FIG. 19 or another suitable set of allowable RUs), given the 20 MHz channel indicated by the field 1804. Although FIGS. 18 and 19 were discussed in the context of a 20 MHz communication channel being indicated by the field 1804 and groups of 26 OFDM tones, communication channels of a suitable bandwidth other than 20 MHz and/or suitable groups of OFDM tones other than 26 are used in other embodiments.

In one embodiment, the field 1804 is three bits and the field 1808 is five bits. In other embodiments, the field 1804 is another suitable size (e.g., 2, 4, 5, 6, 8, 9, 10, etc., bits) and/or the field 1808 is another suitable size (e.g., 3, 4, 6, 7, 8, 9, 10, etc., bits). Table 2 is an example of encodings of the fields 1804 and 1808 according to an illustrative embodiment. In other embodiments, other suitable encodings are utilized.

TABLE 2

| | |
|---|---|
| Channel Index field 1804 | Indicates 20 MHz channel in which an RU is located (if the RU is less than 20 MHz) or a 20 MHz channel that is the start of the RU (if the RU is greater than or equal to 20 MHz) |
| Start tone and width of RU field 1808 | Index indicating RU from set of allowable RUs |

Figure 18B:
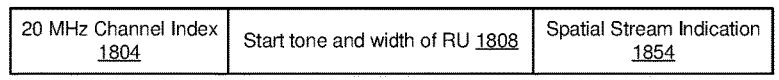
FIG. 18B is a diagram of an example field that is used to indicate a sub-band within an OFDMA transmission and also one or more spatial streams, according to an embodiment.
Figure 19:
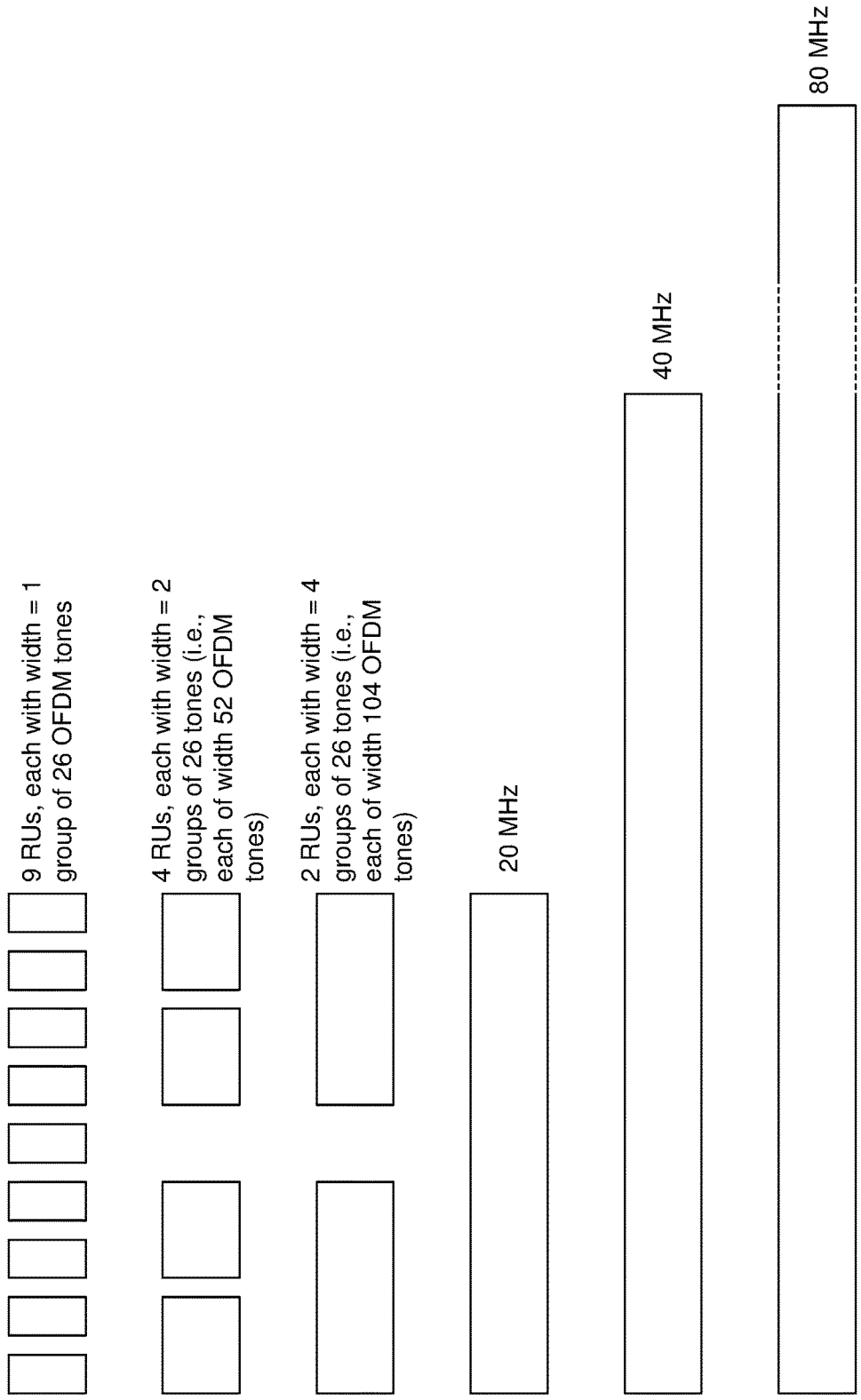
FIG. 19 is a diagram of an example set of allowable resource units for a given starting 20 MHz channel, according to an embodiment.

FIG. 18B is a diagram of an example field 1850 that is used to indicate a sub-band within an OFDMA transmission and also one or more spatial streams, according to an embodiment. The field 1850 is similar to the field 1800 of FIG. 18A, and like-numbered elements are not discussed for purposes of brevity.

In some embodiments, UL acknowledgment information discussed above includes the field 1850. For instance, in some embodiments, the field 1512 discussed above includes the field 1850. In some embodiments, the field 1250 and/or the field 1260 (FIG. 12) includes the field 1850. In some embodiments, the field 1328 (FIG. 13) includes the field 1850.

The field 1850 includes a spatial stream indication field 1854. For example, in some embodiments in which a DL OFDMA frame includes a MU-MIMO transmission, recipients of the MU-MIMO transmission acknowledge the MU-MIMO transmission with an UL MU-MIMO transmission in which different client devices transmit via different spatial streams. In some embodiments, the AP may assign different client devices to different spatial streams and inform the client devices of the assignments using the field 1854.

In some embodiments, A-MPDUs are used in OFDMA transmissions, and A-MPDUs include only one control frame or may aggregate one or more control frames. For instance, FIG. 20A illustrates an example A-MPDU 2000 that includes an ACK frame 2004, according to an embodiment. FIG. 20B illustrates an example A-MPDU 2020 that includes an ACK frame 2024 and a resource request frame 2028, according to an embodiment. FIG. 20C illustrates an example A-MPDU 2040 that includes an ACK frame 2044 and a sync or trigger frame 2048, according to an embodiment.

In some embodiments, ACKs and/or BAs of OFDMA/MU-MIMO transmissions may be shortened to reduce channel overhead. For example, in some embodiments, the receiver of an ACK/BA may already know a length of the ACK/BA. For example, in some embodiments, an A-MPDU delimiter can be omitted with an ACK/BA. As another example, a duration field is omitted when a duration field is includes in a PHY preamble (e.g., in an HE-SIG field), in some embodiments. In some embodiments, one or more addresses are omitted and/or shortened. For example, in some embodiments, a receiver address (RA) is omitted. In some embodiments, a transmitter address is shortened, such as by replacing an MAC address with an AID. In some embodiments, an identifier of the frame or frames being acknowledged (e.g., a sequence number, a scramble seed-FCS combination, etc.) may replace an address field.

Figure 21A:
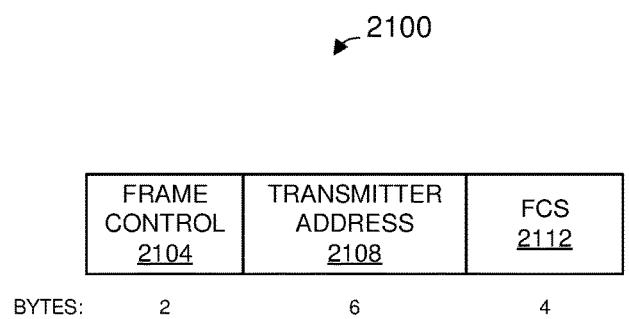
FIGS. 21A and 21B are diagrams of example shortened A-MPDUs that omit fields of a regular A-MPDU, according to some embodiments.

FIG. 21A is a diagram of an example ACK frame 2100 that is utilized in some embodiments. The ACK frame 2100 includes a frame control field 2104, a transmitter address field 2108, and an FCS field 2112. Thus, in an embodiment, the ACK frame 2100 omits an A-MPDU delimiter, a duration/ID field, and a receiver address field. In an embodiment, the transmitter address field 2108 includes a MAC address of the transmitter. In another embodiment, the transmitter address field 2108 includes an AID of the transmitter. Although FIG. 21A illustrates example field sizes, in other embodiments, other suitable field sizes are utilized.

Figure 21B:
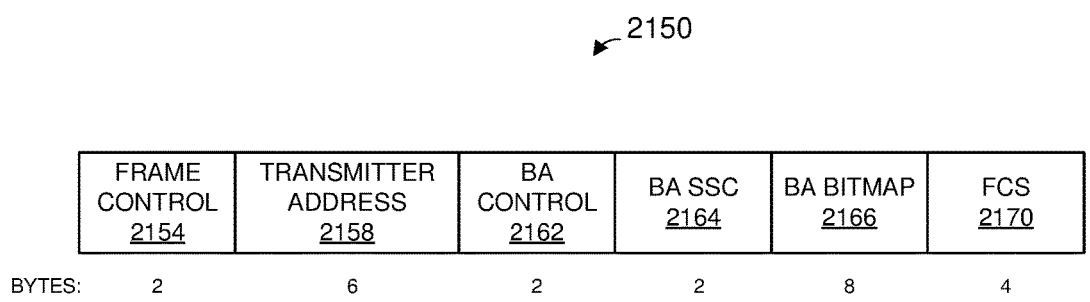

FIG. 21B is a diagram of an example BA frame 2150 that is utilized in some embodiments. The BA frame 2150 includes a frame control field 2154, a transmitter address field 2158, a BA control field 2162, a BA SSC field 2164, a BA bitmap field 2166, and an FCS field 2170. Thus, in an embodiment, the ACK frame 2150 omits an A-MPDU delimiter, a duration/ID field, and a receiver address field. In an embodiment, the transmitter address field 2158 includes a MAC address of the transmitter. In another embodiment, the transmitter address field 2158 includes an AID of the transmitter. Although FIG. 21B illustrates example field sizes, in other embodiments, other suitable field sizes are utilized.

Figure 22:
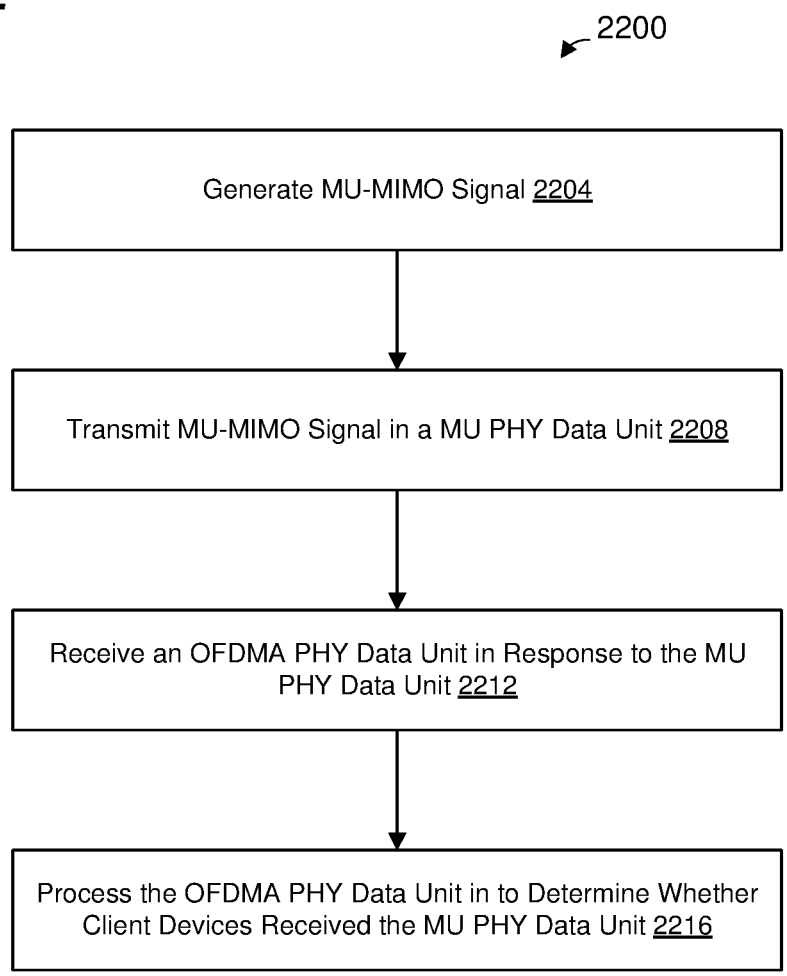
FIG. 22 is a flow diagram of an example method of transmitting a MU transmission, according to an embodiment.

FIG. 22 is a flow diagram of an example method 2200 for transmitting a MU DL transmission, according to an embodiment. In some embodiments, the method 2200 is implemented by the AP 14 (FIG. 1). For example, in some embodiments, the network interface device 16 is configured to implement the method 2200. In other embodiments, another suitable network interface device is configured to implement the method 2200.

At block 2204, an MU-MIMO signal is generated, where MU-MIMO includes independent data for multiple second communication devices modulated on different spatial streams. In an embodiment, the MU-MIMO is signal is a MU DL signal.

At block 2208, the MU-MIMO signal is included in a MU PHY data unit and the MU PHY data unit is transmitted to multiple communication devices. For example, in an embodiment, the MU-MIMO signal is included in a DL MU-MIMO PHY data unit. As another example, in an embodiment, the MU-MIMO signal is included in a DL OFDMA PHY data unit.

At block 2212, OFDMA PHY data unit is received from the multiple communication devices, the OFDMA PHY data unit corresponding to an acknowledgment of the MU PHY data unit by the multiple communication devices.

At block 2216, the OFDMA PHY data unit is processed to determine whether the multiple communication devices received the multi-user PHY data unit.

In some embodiments, different frequency portions of the OFDMA PHY data unit correspond to different second communication devices, and the method 2200 further comprises determining which frequency portions correspond to which communication devices, and including in the MU PHY data unit information that indicates which frequency portions correspond to which communication devices so that each communication device can determine in which frequency portion the communication device is to transmit as part of the OFDMA.

In some embodiments, the method 2200 further comprises determining, prior to receiving the OFDMA PHY data unit, a duration of the OFDMA PHY data unit, and including in the MU PHY data unit information that indicates the duration of the OFDMA PHY data unit so that each communication device can generate a respective portion of the OFDMA PHY data unit so that the respective portion has a respective duration substantially equal to the indicated duration.

Figure 23:
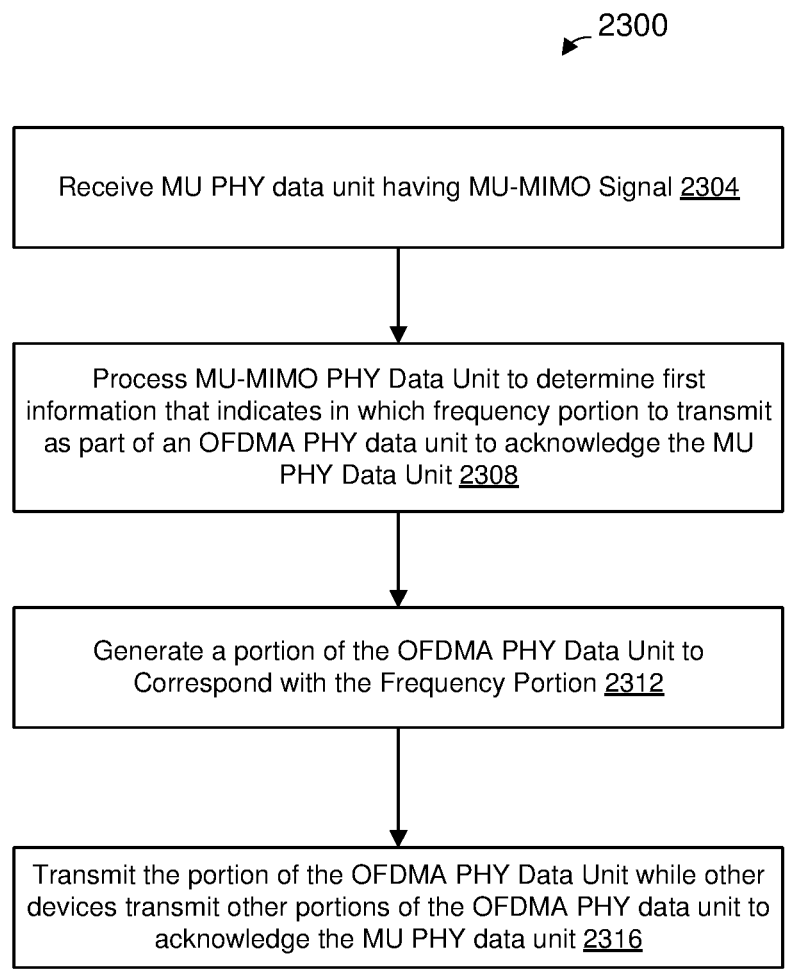
FIG. 23 is a flow diagram of an example method of receiving a MU transmission, according to an embodiment.

FIG. 23 is a flow diagram of an example method 2300 for receiving a MU DL transmission, according to an embodiment. In some embodiments, the method 2300 is implemented by a client device 25 (FIG. 1). For example, in some embodiments, the network interface device 27 is configured to implement the method 2300. In other embodiments, another suitable network interface device is configured to implement the method 2300.

At block 2304, an MU PHY data unit is received, the MU PHY data unit including an MU-MIMO signal with independent data for multiple communication devices. In an embodiment, the MU PHY data unit is a MU DL signal. In an embodiment, the MU PHY data unit is a DL MU-MIMO PHY data unit. As another example, in an embodiment, the MU PHY data unit is a DL OFDMA PHY data unit.

At block 2308, the MU PHY data unit received at block 2304 is processed to determine first information, in the MU PHY data unit, that indicates in which frequency portion to transmit, as part of an OFDMA PHY data unit, that the multiple communication devices are to transmit in order to acknowledge the MU PHY data unit received at block 2304.

At block 2312, a portion of the OFDMA PHY data unit is generated so that the portion of the OFDMA PHY data unit corresponds to the frequency portion indicated by the first information in the MU PHY data unit.

At block 2316, the portion of the OFDMA PHY data unit is transmitted while the other communication devices transmit one or more other portions of the OFDMA PHY data unit to acknowledge the MU PHY data unit.

In some embodiments, the method further comprises processing the MU PHY data unit to determine second information, in the MU PHY data unit, that indicates a duration of the OFDMA PHY data unit that the multiple communication devices are to transmit to acknowledge the MU PHY data unit. In such embodiments, the portion of the OFDMA PHY data unit is generated at block 2312 so that the duration is substantially equal to the duration indicated by the second information in the MU PHY data unit.

Figure 24:
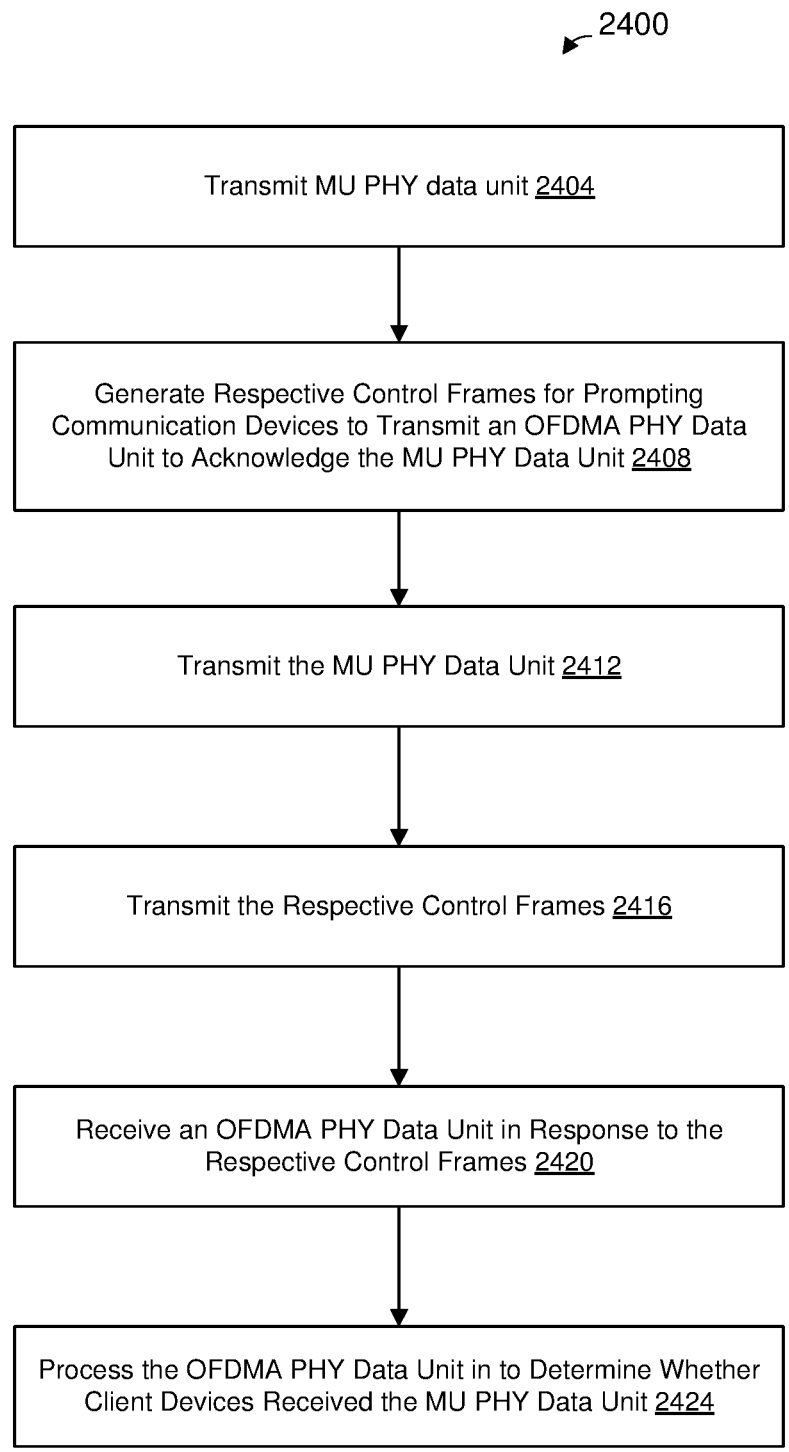
FIG. 24 is a flow diagram of an example method of transmitting a MU transmission, according to an embodiment.

FIG. 24 is a flow diagram of an example method 2400 for transmitting a MU DL transmission, according to an embodiment. In some embodiments, the method 2400 is implemented by the AP 14 (FIG. 1). For example, in some embodiments, the network interface device 16 is configured to implement the method 2400. In other embodiments, another suitable network interface device is configured to implement the method 2400.

At block 2404, an MU PHY data unit is generated, where MU PHY data unit includes independent data for multiple communication devices. In an embodiment, the MU PHY data unit is signal is a DL OFDMA PHY data unit. In an embodiment, the DL OFDMA PHY data unit includes an MU-MIMO transmission. In an embodiment, the MU PHY data unit is signal is a DL MU-MIMO PHY data unit.

At block 2208, respective control frames corresponding to at least some of the communication devices are generated, wherein the respective control frames are configured to prompt the at least some of the communication devices to transmit an OFDMA PHY data unit to acknowledge that the at least some of the communication devices received the MU PHY data unit.

At block 2412, the MU PHY data unit is transmitted to the multiple communication devices.

At block 2416, the respective control frames are transmitted to the multiple communication devices. In an embodiment, the respective control frames are included in the MU PHY data unit, and block 2412 includes block 2416. In an embodiment, the respective control frames are included in a PHY data unit separate from the MU PHY data unit.

At block 2420, OFDMA PHY data unit is received from the multiple communication devices, the OFDMA PHY data unit corresponding to an acknowledgment of the MU PHY data unit by the multiple communication devices.

At block 2424, the OFDMA PHY data unit is processed to determine whether the multiple communication devices received the multi-user PHY data unit.

In some embodiments, different frequency portions of the OFDMA PHY data unit correspond to different second communication devices, and the method 2400 further comprises determining which frequency portions correspond to which communication devices, and including in the respective control frames information that indicates which frequency portions correspond to which communication devices so that each communication device can determine in which frequency portion the communication device is to transmit as part of the OFDMA.

In some embodiments, the method 2400 further comprises determining, prior to receiving the OFDMA PHY data unit, a duration of the OFDMA PHY data unit, and including in the respective control frames information that indicates the duration of the OFDMA PHY data unit so that each communication device can generate a respective portion of the OFDMA PHY data unit so that the respective portion has a respective duration substantially equal to the indicated duration.

Figure 25:
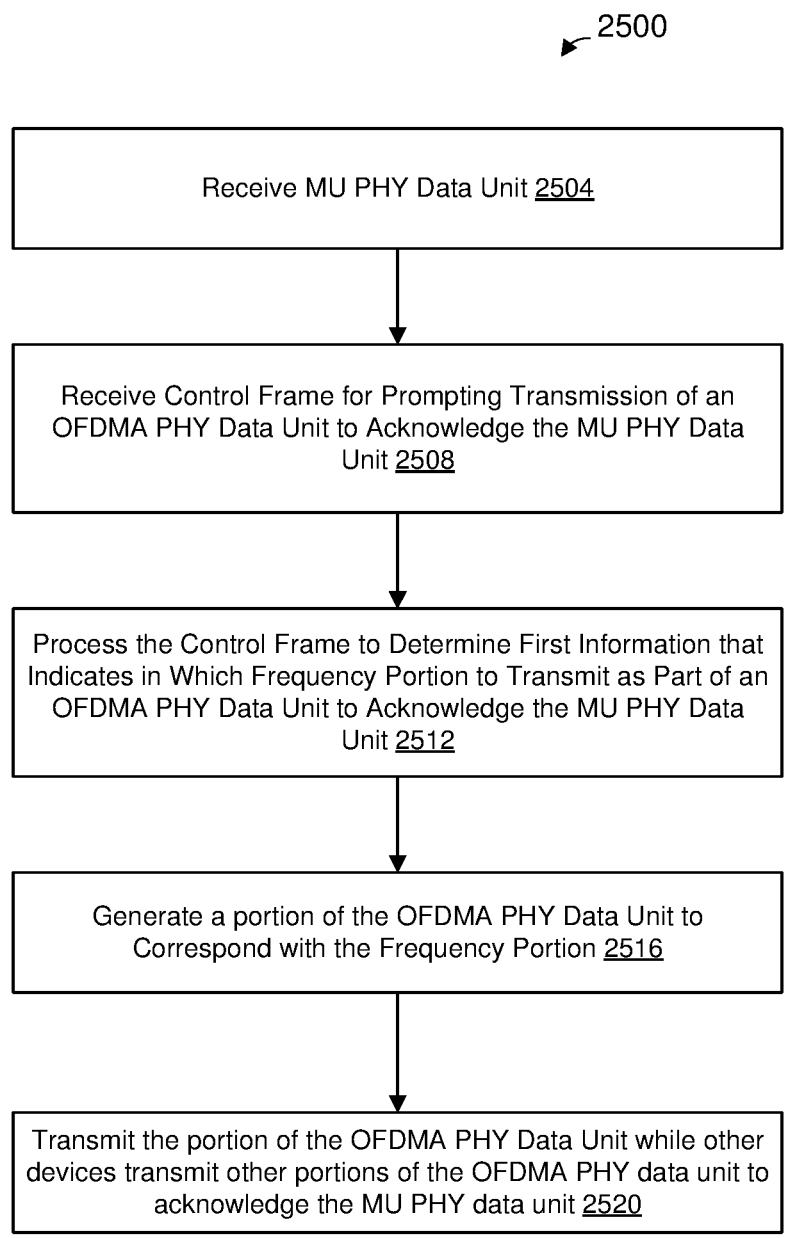
FIG. 25 is a flow diagram of an example method of receiving a MU transmission, according to an embodiment.

FIG. 25 is a flow diagram of an example method 2500 for receiving a MU DL transmission, according to an embodiment. In some embodiments, the method 2500 is implemented by a client device 25 (FIG. 1). For example, in some embodiments, the network interface device 27 is configured to implement the method 2500. In other embodiments, another suitable network interface device is configured to implement the method 2500.

At block 2504, an MU PHY data unit is received, the MU PHY data unit including independent data for multiple communication devices. In an embodiment, the MU PHY data unit is a MU DL signal. In an embodiment, the MU PHY data unit is a DL MU-MIMO PHY data unit. As another example, in an embodiment, the MU PHY data unit is a DL OFDMA PHY data unit. In an embodiment, the DL OFDMA PHY data unit includes an MU-MIMO transmission.

At block 2508, a control frame is received, the control frame for prompting transmission of an OFDMA PHY Data Unit to acknowledge the MU PHY data unit received at block 2504. In an embodiment, the control frame is included in the MU PHY data unit received at block 2504, and thus block 2504 includes block 2508. In other embodiments, the control frame is received in a PHY data unit separate from the MU PHY data unit received at block 2504.

At block 2512, the control frame received at block 2508 is processed to determine first information that indicates in which frequency portion to transmit, as part of an OFDMA PHY data unit, that the multiple communication devices are to transmit in order to acknowledge the MU PHY data unit received at block 2504.

At block 2516, a portion of the OFDMA PHY data unit is generated so that the portion of the OFDMA PHY data unit corresponds to the frequency portion indicated by the first information in the control frame.

At block 2520, the portion of the OFDMA PHY data unit is transmitted while the other communication devices transmit one or more other portions of the OFDMA PHY data unit to acknowledge the MU PHY data unit.

In some embodiments, the method further comprises processing the control frame to determine second information that indicates a duration of the OFDMA PHY data unit that the multiple communication devices are to transmit to acknowledge the MU PHY data unit. In such embodiments, the portion of the OFDMA PHY data unit is generated at block 2516 so that the duration is substantially equal to the duration indicated by the second information in the MU PHY data unit.

Figure 26:
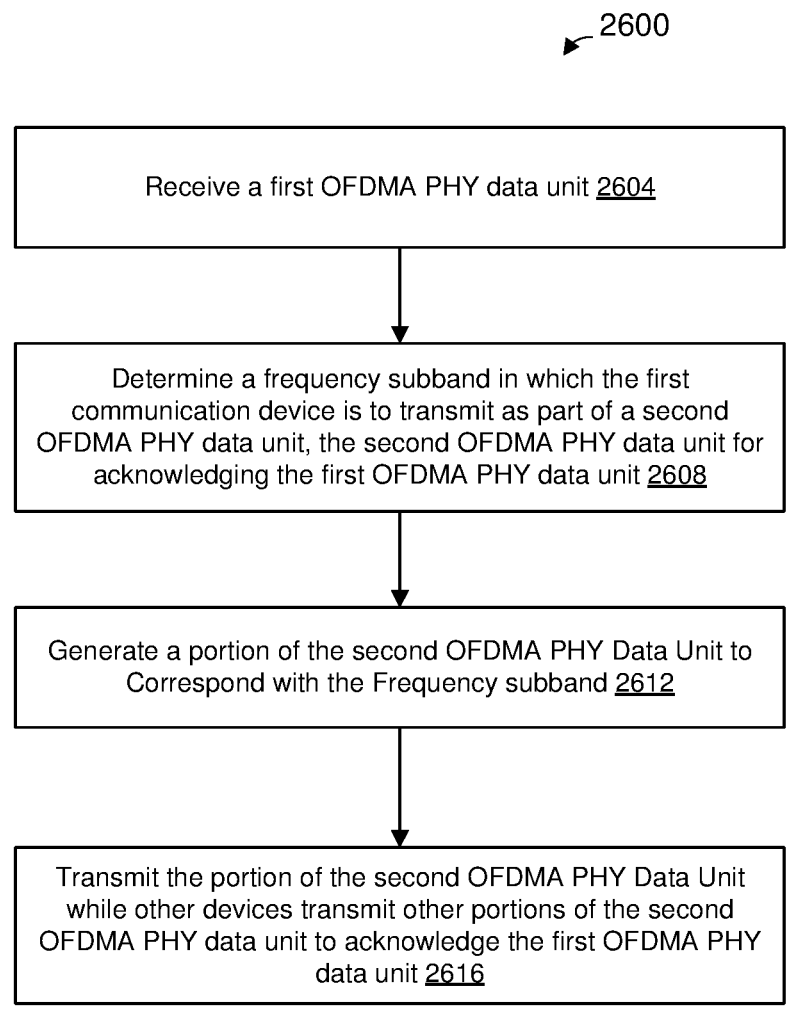
FIG. 26 is a flow diagram of an example method of receiving a MU transmission, according to an embodiment.

FIG. 26 is a flow diagram of an example method 2600 for receiving a MU DL transmission, according to an embodiment. In some embodiments, the method 2600 is implemented by a client device 25 (FIG. 1). For example, in some embodiments, the network interface device 27 is configured to implement the method 2600. In other embodiments, another suitable network interface device is configured to implement the method 2600.

At block 2604, a first OFDMA PHY data unit is received, the first OFDMA PHY data unit including independent data for multiple communication devices, including a first communication device. In an embodiment, data corresponding to the first communication device is in included in the first OFDMA PHY data unit in a first frequency subband within a communication channel spanned by the first OFDMA PHY data unit. In an embodiment, the OFDMA PHY data unit is a MU DL signal. In an embodiment, the DL OFDMA PHY data unit includes an MU-MIMO transmission.

At block 2608, a second frequency subband in which the first communication device is to transmit as part of a second OFDMA PHY data unit is determined, the second OFDMA PHY data unit for acknowledging, by the first communication device and one or more second communication devices, the first OFDMA PHY data unit, wherein the second frequency subband is determined based on i) a number of the first communication device and the one or more second communication devices, and ii) a number of component communication channels spanned by the first OFDMA PHY data unit.

In some embodiments, the second frequency subband is determined further based on a position of the first frequency subband within the communication channel spanned by the first OFDMA PHY data unit. In some embodiments, the integer part and the remainder of the division of i) the number of component communication channels spanned by the first OFDMA PHY data unit by ii) the number of the first communication device and the one or more second communication devices is determined when the number of component communication channels spanned by the first OFDMA PHY data unit is greater than or equal to the number of the first communication device and the one or more second communication devices.

In some embodiments, determining the second frequency subband includes: determining an integer part of a division of i) the number of component communication channels spanned by the first OFDMA PHY data unit by ii) the number of the first communication device and the one or more second communication devices; and determining a remainder of the division; wherein the second frequency subband is determined using the integer part of the division and the remainder.

In some embodiments, determining the second frequency subband includes: determining an integer part of a division of i) the number of the first communication device and the one or more second communication devices by ii) the number of component communication channels spanned by the first OFDMA PHY data unit; and determining a remainder of the division; wherein the second frequency subband is determined using the integer part of the division and the remainder. In some embodiments, the integer part and the remainder of the division of i) the number of the first communication device and the one or more second communication devices by ii) the number of component communication channels spanned by the first OFDMA PHY data unit is determined when the number of component communication channels spanned by the first OFDMA PHY data unit is less than the number of the first communication device and the one or more second communication devices.

At block 2612, a portion of the second OFDMA PHY data unit is generated so that the portion of the second OFDMA PHY data unit corresponds to the second frequency subband.

At block 2616, the portion of the second OFDMA PHY data unit is transmitted while the other communication devices transmit one or more other portions of the OFDMA PHY data unit to acknowledge the first OFDMA PHY data unit.

In some embodiments, the method further comprises processing the control frame to determine second information that indicates a duration of the OFDMA PHY data unit that the multiple communication devices are to transmit to acknowledge the MU PHY data unit. In such embodiments, the portion of the OFDMA PHY data unit is generated at block 2516 so that the duration is substantially equal to the duration indicated by the second information in the MU PHY data unit.

In various embodiments, techniques, PHY data unit formats, fields, etc., described above are utilized with one or more of the methods described with reference to FIGS. 22-26.

In an embodiment, a method for communicating in a wireless communication network includes: generating, at a first communication device, a multi-user multiple input-multiple output (MU-MIMO) signal having independent data for multiple second communication devices; transmitting, with the first communication device, the MU-MIMO signal in a multi-user physical layer (PHY) data unit to the multiple second communication devices; receiving, at the first communication device, an orthogonal frequency division multiple access (OFDMA) PHY data unit from the multiple second communication devices, the OFDMA PHY data unit corresponding to an acknowledgment of the multi-user PHY data unit by the multiple second communication devices; and processing, at the first communication device, the OFDMA PHY data unit to determine that the multiple second communication devices received the multi-user PHY data unit.

In other embodiments, the method includes any suitable combination of one or more of the following features.

Respective frequency portions of the OFDMA PHY data unit correspond with respective second communication devices; the method further comprises determining, at the first communication device, which frequency portions correspond to which second communication devices; and generating the MU PHY data unit comprises including in the MU PHY data unit information that indicates which frequency portions correspond to which second communication devices so that each second communication device can determine in which frequency portion the second communication device is to transmit.

The method further comprises determining, at the first communication device and prior to receiving the OFDMA PHY data unit, a duration of the OFDMA PHY data unit; and wherein generating the MU PHY data unit comprises including in the MU PHY data unit information that indicates duration of the OFDMA PHY data unit so that each second communication device can generate a respective portion of the OFDMA PHY data unit so that the respective portion has a respective duration substantially equal to the indicated duration.

The MU PHY data unit is a DL OFDMA data unit that includes the MU-MIMO signal.

The MU PHY data unit is a MU-MIMO PHY data unit.

In another embodiment, an apparatus comprises a network interface device having one or more integrated circuits configured to: generate a multi-user multiple input-multiple output (MU-MIMO) signal having independent data for multiple communication devices, transmit the MU-MIMO signal in a multi-user physical layer (PHY) data unit to the multiple communication devices, receive an orthogonal frequency division multiple access (OFDMA) PHY data unit from the multiple communication devices, the OFDMA PHY data unit corresponding to an acknowledgment of the multi-user PHY data unit by the multiple communication devices, and process the OFDMA PHY data unit to determine that the multiple communication devices received the multi-user PHY data unit.

In other embodiments, the apparatus includes any suitable combination of one or more of the following features.

Respective frequency portions of the OFDMA PHY data unit correspond with respective second communication devices; and the one or more integrated circuits configured to determine which frequency portions correspond to which second communication devices, and include in the MU PHY data unit information that indicates which frequency portions correspond to which second communication devices so that each second communication device can determine in which frequency portion the second communication device is to transmit.

The one or more integrated circuits configured to: determine, prior to receiving the OFDMA PHY data unit, a duration of the OFDMA PHY data unit; and include in the MU PHY data unit information that indicates duration of the OFDMA PHY data unit so that each second communication device can generate a respective portion of the OFDMA PHY data unit so that the respective portion has a respective duration substantially equal to the indicated duration.

The MU PHY data unit is a DL OFDMA data unit that includes the MU-MIMO signal.

The MU PHY data unit is a MU-MIMO PHY data unit.

In another embodiment, a method for acknowledging a multi-user multiple input-multiple output (MU-MIMO) transmission includes: receiving, at a first communication device, a MU physical layer (PHY) data unit, the MU PHY data unit including an MU-MIMO signal with independent data for the first communication device and one or more second communication devices, the MU PHY data unit having been transmitted by a third communication device; processing, at the first communication device, the MU PHY data unit to determine first information, in the MU PHY data unit, that indicates in which frequency portion the first communication device is to transmit as part of an orthogonal frequency division multiple access (OFDMA) PHY data unit that the first communication device and the one or more second communication devices are to transmit to the third communication device in order to acknowledge the MU PHY data unit; generating, at the first communication device, a portion of the OFDMA PHY data unit so that the portion of the OFDMA PHY data unit corresponds to the frequency portion indicated by the first information in the MU PHY data unit; and transmitting, at the first communication device, the portion of the OFDMA PHY data unit while the one or more second communication devices transmit one or more other portions of the OFDMA PHY data unit to acknowledge the MU PHY data unit.

In other embodiments, the method includes any suitable combination of one or more of the following features.

The method further comprises: processing, at the first communication device, the MU PHY data unit to determine second information, in the MU PHY data unit, that indicates a duration of the OFDMA PHY data unit that the first communication device and the one or more second communication devices are to transmit to the third communication device to acknowledge the MU PHY data unit; wherein the first communication device generates the portion of the OFDMA PHY data unit so that the portion of the OFDMA PHY data unit has a duration substantially equal to the duration indicated by the second information in the MU PHY data unit.

The MU PHY data unit includes an aggregated media access control (MAC) protocol data unit (A-MPDU); and the first information and the second information are included in a control frame within the A-MPDU.

The MU PHY data unit is a DL OFDMA data unit that includes the MU-MIMO signal.

The MU PHY data unit is a MU-MIMO PHY data unit.

In another embodiment, an apparatus comprises a network interface device having one or more integrated circuit devices configured to receive a multi-user (MU) physical layer (PHY) data unit, the MU PHY data unit including an MU-MIMO signal with independent data for a first communication device and one or more second communication devices, the MU PHY data unit having been transmitted by a third communication device, process the MU PHY data unit to determine first information, in the MU PHY data unit, that indicates in which frequency portion the first communication device is to transmit as part of an orthogonal frequency division multiple access (OFDMA) PHY data unit that the first communication device and the one or more second communication devices are to transmit to the third communication device in order to acknowledge the MU PHY data unit, generate a portion of the OFDMA PHY data unit so that the portion of the OFDMA PHY data unit corresponds to the frequency portion indicated by the first information in the MU PHY data unit, and transmit the portion of the OFDMA PHY data unit while the one or more second communication devices transmit one or more other portions of the OFDMA PHY data unit to acknowledge the MU PHY data unit.

In other embodiments, the apparatus includes any suitable combination of one or more of the following features.

The one or more integrated circuits are configured to: process the MU PHY data unit to determine second information, in the MU PHY data unit, that indicates a duration of the OFDMA PHY data unit that the first communication device and the one or more second communication devices are to transmit to the third communication device to acknowledge the MU PHY data unit; generate the portion of the OFDMA PHY data unit so that the portion of the OFDMA PHY data unit has a duration substantially equal to the duration indicated by the second information in the MU PHY data unit.

The MU PHY data unit includes an aggregated media access control (MAC) protocol data unit (A-MPDU); and the first information and the second information are included in a control frame within the A-MPDU.

The MU PHY data unit is a DL OFDMA data unit that includes the MU-MIMO signal.

The MU PHY data unit is a MU-MIMO PHY data unit.

In another embodiment, a method for communicating in a wireless communication network includes: generating, at a first communication device, a multi-user (MU) physical layer (PHY) data unit having independent data for multiple second communication devices; generating, at the first communication device, respective control frames corresponding to at least some of the second communication devices, wherein the respective control frames are configured to prompt the at least some of the second communication devices to transmit an orthogonal frequency division multiple access (OFDMA) PHY data unit to acknowledge that the at least some of the second communication devices received the MU PHY data unit; transmitting, with the first communication device, the MU PHY data unit to the multiple second communication devices; transmitting, with the first communication device, the respective control frames to the multiple second communication devices; receiving, at the first communication device, the OFDMA PHY data unit from the at least some of the second communication devices, the OFDMA PHY data unit corresponding to an acknowledgment of the single MU PHY data unit by the at least some of the second communication devices; and processing, at the first communication device, the OFDMA PHY data unit to determine that the at least some of the multiple second communication devices received the single MU PHY data unit.

In other embodiments, the method includes any suitable combination of one or more of the following features.

The single MU PHY data unit is an OFDMA PHY data unit.

The single MU PHY data unit is a multi-user multiple input, multiple output (MU-MIMO) data unit.

Generating the MU PHY data unit comprises including in the MU PHY data unit the respective control frames; and transmitting the MU PHY data unit includes transmitting the respective control frames within the MU PHY data unit.

Respective frequency portions of the OFDMA PHY data unit correspond with respective second communication devices; the method further comprises determining, at the first communication device, which frequency portions correspond to which second communication devices; and generating the respective control frames comprises including, in the respective control frames, information that indicates which frequency portions correspond to which second communication devices so that each second communication device among the at least some of the second communication devices can determine in which frequency portion the second communication device is to transmit.

The method further comprises: determining, at the first communication device and prior to receiving the OFDMA PHY data unit, a duration of the OFDMA PHY data unit; and wherein generating the respective control frames comprises including in the respective control frames information that indicates a duration of the OFDMA PHY data unit so that each second communication device among the at least some of the second communication devices can generate a respective portion of the OFDMA PHY data unit so that the respective portion has a respective duration substantially equal to the indicated duration.

An apparatus comprising: a network interface device having one or more integrated circuit devices configured to: generate a multi-user (MU) physical layer (PHY) data unit having independent data for multiple communication devices, generate respective control frames corresponding to at least some of the second communication devices, wherein the respective control frames are configured to prompt the at least some of the second communication devices to transmit an orthogonal frequency division multiple access (OFDMA) PHY data unit to acknowledge that the at least some of the communication devices received the MU PHY data unit, transmit the MU PHY data unit to the multiple communication devices, transmit the respective control frames to the multiple communication devices, receive the OFDMA PHY data unit from the at least some of the communication devices, the OFDMA PHY data unit corresponding to an acknowledgment of the single MU PHY data unit by the at least some of the communication devices, and process the OFDMA PHY data unit to determine that the at least some of the multiple communication devices received the single MU PHY data unit.

In other embodiments, the apparatus includes any suitable combination of one or more of the following features.

The single MU PHY data unit is an OFDMA PHY data unit.

The single MU PHY data unit is a multi-user multiple input, multiple output (MU-MIMO) data unit.

The one or more integrated circuit devices are configured to: include in the MU PHY data unit the respective control frames; and transmit the respective control frames within the MU PHY data unit.

Respective frequency portions of the OFDMA PHY data unit correspond with respective second communication devices; the one or more integrated circuit devices are configured to determine which frequency portions correspond to which second communication devices, and include, in the respective control frames, information that indicates which frequency portions correspond to which second communication devices so that each second communication device among the at least some of the communication devices can determine in which frequency portion the second communication device is to transmit.

The one or more integrated circuit devices are configured to: determine, prior to receiving the OFDMA PHY data unit, a duration of the OFDMA PHY data unit; and include in the respective control frames information that indicates a duration of the OFDMA PHY data unit so that each communication device among the at least some of the communication devices can generate a respective portion of the OFDMA PHY data unit so that the respective portion has a respective duration substantially equal to the indicated duration.

In another embodiment, a method for acknowledging a first orthogonal frequency division multiple access (OFDMA) physical layer (PHY) data unit includes: receiving, at a first communication device, the first OFDMA PHY data unit, the first OFDMA PHY data unit having independent data for the first communication device and one or more second communication devices, the first OFDMA PHY data unit having been transmitted by a third communication device, wherein data corresponding to the first communication device is in included in the first OFDMA PHY data unit in a first frequency subband within a communication channel spanned by the first OFDMA PHY data unit; determining, at the first communication device, a second frequency subband in which the first communication device is to transmit as part of a second OFDMA PHY data unit, the second OFDMA PHY data unit for acknowledging, by the first communication device and one or more second communication devices, the first OFDMA PHY data unit, wherein the second frequency subband is determined based on i) a number of the first communication device and the one or more second communication devices, and ii) a number of component communication channels spanned by the first OFDMA PHY data unit; generating, at the first communication device, a portion of the second OFDMA PHY data unit so that the portion of the second OFDMA PHY data unit corresponds to the second frequency subband; and transmitting, at the first communication device, the portion of the second OFDMA PHY data unit while the one or more second communication devices transmit one or more other portions of the second OFDMA PHY data unit to acknowledge the first OFDMA PHY data unit.

In other embodiments, the method includes any suitable combination of one or more of the following features.

The second frequency subband is determined further based on a position of the first frequency subband within the communication channel spanned by the first OFDMA PHY data unit.

Determining the second frequency subband comprises: determining an integer part of a division of i) the number of component communication channels spanned by the first OFDMA PHY data unit by ii) the number of the first communication device and the one or more second communication devices; and determining a remainder of the division; wherein the second frequency subband is determined using the integer part of the division and the remainder.

The integer part and the remainder of the division of i) the number of component communication channels spanned by the first OFDMA PHY data unit by ii) the number of the first communication device and the one or more second communication devices is determined when the number of component communication channels spanned by the first OFDMA PHY data unit is greater than or equal to the number of the first communication device and the one or more second communication devices.

Determining the second frequency subband comprises: determining an integer part of a division of i) the number of the first communication device and the one or more second communication devices by ii) the number of component communication channels spanned by the first OFDMA PHY data unit; and determining a remainder of the division; wherein the second frequency subband is determined using the integer part of the division and the remainder.

The integer part and the remainder of the division of i) the number of the first communication device and the one or more second communication devices by ii) the number of component communication channels spanned by the first OFDMA PHY data unit is determined when the number of component communication channels spanned by the first OFDMA PHY data unit is less than the number of the first communication device and the one or more second communication devices.

In another embodiment, an apparatus comprises: a network interface device having one or more integrate circuits configured to: receive a first OFDMA PHY data unit, the first OFDMA PHY data unit having independent data for a first communication device and one or more second communication devices, the first OFDMA PHY data unit having been transmitted by a third communication device, wherein data corresponding to the first communication device is in included in the first OFDMA PHY data unit in a first frequency subband within a communication channel spanned by the first OFDMA PHY data unit, determine a second frequency subband in which the first communication device is to transmit as part of a second OFDMA PHY data unit, the second OFDMA PHY data unit for acknowledging, by the first communication device and one or more second communication devices, the first OFDMA PHY data unit, wherein the second frequency subband is determined based on i) a number of the first communication device and the one or more second communication devices, and ii) a number of component communication channels spanned by the first OFDMA PHY data unit, generate a portion of the second OFDMA PHY data unit so that the portion of the second OFDMA PHY data unit corresponds to the second frequency subband, and transmit the portion of the second OFDMA PHY data unit while the one or more second communication devices transmit one or more other portions of the second OFDMA PHY data unit to acknowledge the first OFDMA PHY data unit.

In other embodiments, the apparatus includes any suitable combination of one or more of the following features.

The one or more integrated circuit devices are configured to: determine the second frequency subband further based on a position of the first frequency subband within the communication channel spanned by the first OFDMA PHY data unit.

The one or more integrated circuit devices are configured to: determine an integer part of a division of i) the number of component communication channels spanned by the first OFDMA PHY data unit by ii) the number of the first communication device and the one or more second communication devices; determine a remainder of the division; and determine the second frequency subband using the integer part of the division and the remainder.

The integer part and the remainder of the division of i) the number of component communication channels spanned by the first OFDMA PHY data unit by ii) the number of the first communication device and the one or more second communication devices is determined when the number of component communication channels spanned by the first OFDMA PHY data unit is greater than or equal to the number of the first communication device and the one or more second communication devices.

The one or more integrated circuit devices are configured to: determine an integer part of a division of i) the number of the first communication device and the one or more second communication devices by ii) the number of component communication channels spanned by the first OFDMA PHY data unit; determine a remainder of the division; and determine the second frequency subband using the integer part of the division and the remainder.

The integer part and the remainder of the division of i) the number of the first communication device and the one or more second communication devices by ii) the number of component communication channels spanned by the first OFDMA PHY data unit is determined when the number of component communication channels spanned by the first OFDMA PHY data unit is less than the number of the first communication device and the one or more second communication devices.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable medium, or media, such as a magnetic disk, an optical disk, a RAM, a ROM, a flash memory, a magnetic tape, etc. The software or firmware instructions may include machine readable instructions that, when executed by one or more processors, cause the one or more processors to perform various acts.

When implemented in hardware, the hardware may comprise one or more of discrete components, one or more integrated circuits, one or more application-specific integrated circuits (ASICs), one or more programmable logic devices (PLDs), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a wireless communication network, the method comprising:
    generating, at a first communication device, respective media access control (MAC) protocol data units (MPDUs), each MPDU including respective data for a respective second communication device among a plurality of second communication devices;
    determining, at the first communication device, respective resource units (RUs) via which at least some of the second communication devices are to transmit as part of an uplink (UL) orthogonal frequency division multiple access (OFDMA) physical layer (PHY) transmission to respectively acknowledge receipt of the respective MPDUs, wherein the respective RUs correspond to respective frequency portions of a communication channel;
    generating, at the first communication device, respective control frames corresponding to at least some of the second communication devices, wherein the respective control frames are configured to prompt the at least some of the second communication devices to transmit the UL OFDMA PHY transmission, and wherein the control frames include indicators of the RUs via which the at least some of the second communication devices are to transmit as part of the UL OFDMA PHY transmission;
    generating, at the first communication device, a single multi user (MU) PHY data unit that includes i) the MPDUs, and ii) the control frames;
    transmitting, by the first communication device and to the plurality of second communication devices, the single MU PHY data unit;
    receiving, at the first communication device, the UL OFDMA PHY transmission from the at least some of the second communication devices, the UL OFDMA PHY transmission corresponding to an acknowledgment of at least some of the MPDUs by the at least some of the second communication devices, wherein the UL OFDMA PHY transmission includes respective transmissions from respective second communication devices via respective RUs indicated by the control frames in the single MU PHY data unit; and
    processing, at the first communication device, the UL OFDMA PHY data unit to determine whether the at least some of the second communication devices received the respective MPDUs.

2. The method of claim 1, wherein the single MU PHY data unit is a downlink (DL) OFDMA PHY data unit.

3. The method of claim 1, wherein the single MU PHY data unit is a downlink multi-user multiple input, multiple output (MU-MIMO) data unit.

4. The method of claim 1, further comprising:
generating, at the first communication device, respective aggregate MPDUs (A-MPDUs) corresponding to the at least some of the second communication devices, wherein each A-MPDU includes i) the respective MPDU for the respective second communication device, and ii) the respective control frames;
wherein the single MU PHY data unit is generated to include the A-MPDUs.

5. The method of claim 4, wherein:
each A-MPDU is generated to include the respective control frame at a beginning of the A-MDPU, and to include the respective MPDU after the control frame.

6. The method of claim 1, further comprising:
determining, at the first communication device and prior to receiving the UL OFDMA PHY transmission, a duration of the OFDMA PHY transmission; and
wherein generating the respective control frames comprises including in the respective control frames information that indicates the determined duration of the OFDMA PHY transmission so that each second communication device among the at least some of the second communication devices can generate a respective portion of the OFDMA PHY transmission so that the respective portion has a respective duration substantially equal to the indicated duration.

7. An apparatus, comprising:
a network interface device associated with a first communication device, wherein the network interface device comprises one or more integrated circuit (IC) devices configured to:
generate respective media access control (MAC) protocol data units (MPDUs), each MPDU including respective data for a respective second communication device among a plurality of second communication devices,
determine respective resource units (RUs) via which at least some of the second communication devices are to transmit as part of an uplink (UL) orthogonal frequency division multiple access (OFDMA) physical layer (PHY) transmission to respectively acknowledge receipt of the respective MPDUs, wherein the respective RUs correspond to respective frequency portions of a communication channel,
generate respective control frames corresponding to at least some of the second communication devices, wherein the respective control frames are configured to prompt the at least some of the second communication devices to transmit the UL OFDMA PHY transmission, and wherein the control frames include indicators of the RUs via which the at least some of the second communication devices are to transmit as part of the UL OFDMA PHY transmission,
generate a single multi user (MU) PHY data unit that includes i) the MPDUs, and ii) the control frames,
transmit, to the plurality of second communication devices, the single MU PHY data unit,
receive the UL OFDMA PHY transmission from the at least some of the second communication devices, the UL OFDMA PHY transmission corresponding to an acknowledgment of at least some of the MPDUs by the at least some of the second communication devices, wherein the UL OFDMA PHY transmission includes respective transmissions from respective second communication devices via respective RUs indicated by the control frames in the single MU PHY data unit, and
process the UL OFDMA PHY data unit to determine whether the at least some of the second communication devices received the respective MPDUs.

8. The apparatus of claim 7, wherein the single MU PHY data unit is a downlink (DL) OFDMA PHY data unit.

9. The apparatus of claim 7, wherein the single MU PHY data unit is a downlink multi-user multiple input, multiple output (MU-MIMO) data unit.

10. The apparatus of claim 7, wherein the one or more IC devices are further configured to:
generate respective aggregate MPDUs (A-MPDUs) corresponding to the at least some of the second communication devices, wherein each A-MPDU includes i) the respective MPDU for the respective second communication device, and ii) the respective control frames; and
generate the single MU PHY data unit to include the A-MPDUs.

11. The apparatus of claim 10, wherein the one or more IC devices are further configured to:
generate each A-MPDU to include the respective control frame at a beginning of the A-MDPU, and to include the respective MPDU after the control frame.

12. The apparatus of claim 7, wherein the one or more IC devices are further configured to:
determine, prior to receiving the UL OFDMA PHY transmission, a duration of the OFDMA PHY transmission; and
include in the respective control frames information that indicates the determined duration of the OFDMA PHY transmission so that each second communication device among the at least some of the second communication devices can generate a respective portion of the OFDMA PHY transmission so that the respective portion has a respective duration substantially equal to the indicated duration.

13. The apparatus of claim 7, wherein:
the network interface device comprises a PHY processor implemented on the one or more IC devices; and
the PHY processor is configured to:
generate the single MU PHY data unit, and
transmit the single MU PHY data unit.

14. A method, comprising:
receiving, at a first communication device and from a second communication device, i) a media access control (MAC) protocol data unit (MPDU) and ii) a control frame, wherein the MPDU and the control frame are included in a single downlink (DL) multi-user (MU) physical layer (PHY) data unit, wherein the control frame is configured to prompt the first communication devices to transmit as part of an uplink (UL) orthogonal frequency division multiple access (OFDMA) physical layer (PHY) transmission by the first communication device and one or more third communication devices, wherein the control frame includes an indicator of a resource unit (RU) via which the first communication device is to transmit as part of the UL OFDMA PHY transmission, and wherein the RU corresponds to a frequency portion of a communication channel;
determining, at the first communication device, a frequency subband in which the first communication device is to transmit an acknowledgment frame as part of the UL OFDMA PHY transmission, the acknowledgment frame for acknowledging the MPDU from the second communication device, wherein determining the frequency subband is performed using the indicator of the RU in the control frame;

generating, at the first communication device, a UL PHY data unit that includes the acknowledgment frame; and transmitting, by the first communication device, the UL PHY data unit as part of the UL OFDMA PHY transmission.

15. The method of claim 14, wherein:

the single DL MU PHY data unit also includes i) one or more respective other MPDUs for the one or more third communication devices, and ii) one or more other control frames; and the one or more other control frames include one or more other indicators of one or more other respective RUs via which the one or more third communication devices are to transmit as part of the UL OFDMA PHY transmission.

16. The method of claim 14, wherein:

the control frame also includes an indicator of a duration of the UL OFDMA PHY transmission; and the first communication device generates the UL PHY data unit to have the indicated duration.

17. The method of claim 14, wherein:

the control frame also includes an indicator of a modulation and coding scheme (MCS) that the first communication device is to use for the UL PHY data unit; and the first communication device generates the UL PHY data unit using the indicated MCS.

18. The method of claim 14, wherein the MPDU and the control frame are included in an aggregate MPDU (A-MPDU).

19. The method of claim 18, wherein the control frame is at a beginning of the A-MDPU, and the MPDU follows the control frame in the A-MPDU.

20. An apparatus, comprising:

a network interface device associated with a first communication device, the network interface device having one or more integrate circuit (IC) devices configured to:
  receive, from a second communication device, i) a media access control (MAC) protocol data unit (MPDU) and ii) a control frame, wherein the MPDU and the control frame are included in a single downlink (DL) multi-user (MU) physical layer (PHY) data unit, wherein the control frame is configured to prompt the first communication devices to transmit as part of an uplink (UL) orthogonal frequency division multiple access (OFDMA) physical layer (PHY) transmission by the first communication device and one or more third communication devices, wherein the control frame includes an indicator of a resource unit (RU) via which the first communication device is to transmit as part of the UL OFDMA PHY transmission, and wherein the RU corresponds to a frequency portion of a communication channel,
  determine a frequency subband in which the first communication device is to transmit an acknowledgment frame as part of the UL OFDMA PHY transmission, the acknowledgment frame for acknowledging the MPDU from the second communication device, wherein determining the frequency subband is performed using the indicator of the RU in the control frame,
  generate a UL PHY data unit that includes the acknowledgment frame, and
  transmit the UL PHY data unit as part of the UL OFDMA PHY transmission.

21. The apparatus of claim 20, wherein:

the single DL MU PHY data unit also includes i) one or more respective other MPDUs for the one or more third communication devices, and ii) one or more other control frames; and the one or more other control frames include one or more other indicators of one or more other respective RUs via which the one or more third communication devices are to transmit as part of the UL OFDMA PHY transmission.

22. The apparatus of claim 20, wherein:

the control frame also includes an indicator of a duration of the UL OFDMA PHY transmission; and the one or more IC devices are configured to generate the UL PHY data unit to have the indicated duration.

23. The apparatus of claim 20, wherein:

the control frame also includes an indicator of a modulation and coding scheme (MCS) that the first communication device is to use for the UL PHY data unit; and the one or more IC devices are configured to generate the UL PHY data unit using the indicated MCS.

24. The apparatus of claim 20, wherein the MPDU and the control frame are included in an aggregate MPDU (A-MPDU).

25. The apparatus of claim 24, wherein the control frame is at a beginning of the A-MDPU, and the MPDU follows the control frame in the A-MPDU.

26. The apparatus of claim 20, wherein:

the network interface device comprises a PHY processor implemented on the one or more IC devices; and the PHY processor is configured to:
  generate the UL PHY data unit, and
  transmit the UL PHY data unit.

* * * * *